United States Patent [19]
Yamaguchi et al.

[11] Patent Number: 5,500,686
[45] Date of Patent: Mar. 19, 1996

[54] MOTION ADAPTIVE LUMINANCE SIGNAL/CHROMINANCE SIGNAL SEPARATION FILTER

[75] Inventors: Noriyuki Yamaguchi; Takuji Kurashita; Mitsuru Ishizuka; Junko Kijima, now by change of name from Junko Taniguchi; Masaharu Yao, all of Nagaokakyo, Japan

[73] Assignee: Mitsubishi Denki Kabushiki Kaisha, Tokyo, Japan

[21] Appl. No.: 255,797

[22] Filed: Jun. 7, 1994

Related U.S. Application Data

[63] Continuation of Ser. No. 939,437, Sep. 4, 1992, abandoned, which is a continuation of Ser. No. 675,269, Mar. 26, 1991, abandoned.

[30] Foreign Application Priority Data

| Mar. 27, 1990 | [JP] | Japan | 2-77596 |
| Jul. 16, 1990 | [JP] | Japan | 2-189930 |
| Feb. 20, 1991 | [JP] | Japan | 3-026290 |

[51] Int. Cl.⁶ .................................................. H04N 9/78
[52] U.S. Cl. .................... 348/663; 348/712; 348/713; 348/664; 348/665; 348/669
[58] Field of Search .................................. 348/663, 664, 348/665, 668, 669, 670, 630, 712, 713; 358/31, 39, 40, 105, 37; H04N 9/78

[56] References Cited

U.S. PATENT DOCUMENTS

| 4,617,589 | 10/1986 | Weckenbrock | 358/31 |
| 4,733,297 | 3/1988 | Katsumata | 358/105 |
| 4,754,322 | 6/1988 | Okuda | 358/31 |
| 4,987,489 | 1/1991 | Hurley | 358/105 |
| 5,146,318 | 9/1992 | Ishizuka | 358/31 |

OTHER PUBLICATIONS

The article entitled "Development of 3-Dimensional High Quality Digital Color Decoder" to Dubious et al.

The article entitled "Cooperative Processing for Improved NTSC Chrominance/Luminance Separation" to Strolle, SMPTE Journal, Aug. 1986.

Primary Examiner—Victor R. Kostak
Assistant Examiner—Sherrie Hsia

[57] ABSTRACT

A filter for motion adaptive Y/C separation, which is capable of obtaining image of high resolution and little picture quality degradation in the case where an image is switched from static one to motion one or vice-versa, is provided with a filter for extracting Y signal outputting Y signal and a filter for extracting C signal outputting C signal, by detecting whether image is motion one or static one by a motion detecting unit, and when motion image is detected, by detecting partially interframe correlation or correlation in three fields, and according to the detection result, by adaptively switching a plurality of processings for extracting intraframe Y signal and a plurality of processings for extracting intraframe C signal.

43 Claims, 60 Drawing Sheets

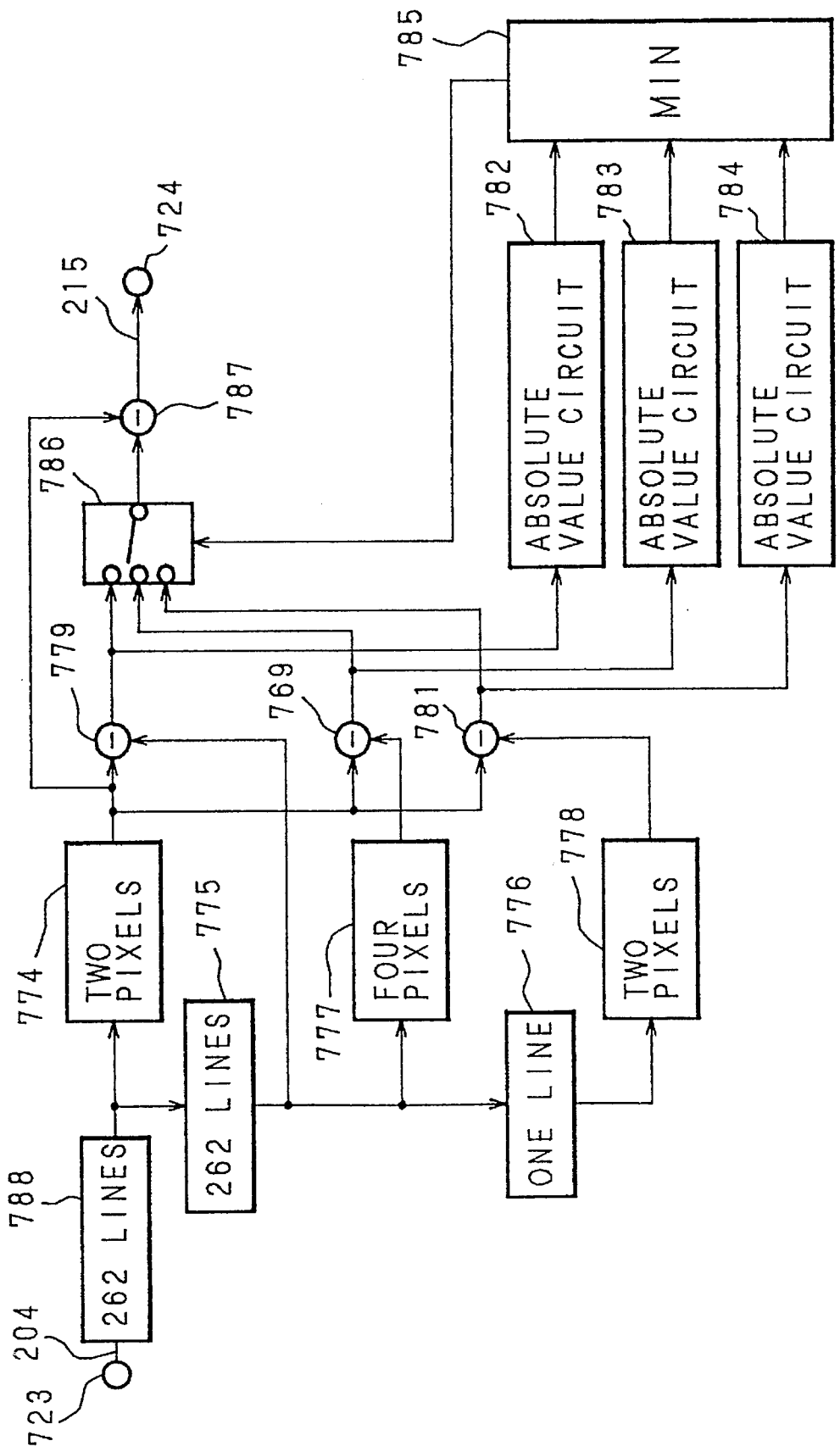

MOTION ADAPTIVE LUMINANCE SIGNAL/CHROMINANCE SIGNAL SEPARATION FILTER

This application is a continuation, of application Ser. No. 07/939,437 filed on Sep. 4, 1992, now abandoned, which is a continuation of Ser. No. 07/675,269 filed on Mar. 26, 1991, now abandoned.

BACKGROUND OF THE INVENTION

1. Field of the Invention

The present invention relates to a luminance signal/chrominance signal separation filter which separates luminance signal (hereinafter to be called Y signal or simply Y) and chrominance signal (hereinafter to be called C signal or simply C) independently from composite video signal (hereinafter to be called V signal) which is obtained by frequency-multiplexing C signal in high frequency band of Y signal, particularly to a Y/C separation filter which is adaptive to motion image.

2. Related Art of the Invention

A motion-adaptive Y/C separation filter judges partially whether an image is static or moving and carries out Y/C separation suitable for pixel signal of the respective portions. The present filtering of NTSC signal uses a V signal which is a composite signal obtained by frequency-multiplexing C signal in high frequency band of Y signal. Therefore, a receiver is necessary to undergo Y/C separation, and incomplete separation causes picture quality degradation such as cross color or cross luminance. Accordingly, various kinds of signal processing circuits for improving picture quality such as motion-adaptive Y/C separation ion utilizing a delay circuit having delay time being equal to or higher than vertical scanning frequency (hereinafter, to be called simply a delay circuit) have been proposed. This depends upon the fact that a memory of vast capacity has been developed and utilized for image processing.

FIG. 1 is a block circuit diagram showing an example of a conventional motion-adaptive Y/C separation filter.

In FIG. 1, to an input terminal 1, V signal 201 of NTSC method is inputted to be given to respective input terminals of a filter 4 for extracting an intrafield Y signal, a filter 5 for an extracting interframe Y signal, a color demodulation circuit 6 and a motion detecting circuit 11 for Y signal.

Y signal 202 by intrafield Y/C separation which has undergone Y/C separation by the filter 4 for extracting intrafield Y signal is inputted into a first input terminal of a mixing circuit 14 for Y signal, and Y signal 203 by interframe Y/C separation which has undergone Y/C separation by the filter 5 for extracting interframe Y signal is inputted to a second input terminal of the mixing circuit 14 for Y signal.

In addition, V signal is color-demodulated into two kinds of color difference signals, that is, R-Y signal and B-Y signal. The two kinds of color difference signals are time-divisionally multiplexed by the frequency of a time divisional multiplexer 7. The frequency band of the output signal of the time divisional multiplexer 7 is band-limited by a low-pass filter 8 (hereinafter, to be called LPF) which allows a band lower than 1.5 MHz to be passed. A color difference signal 204 which is band-limited is inputted to respective input terminals of a filter 9 for extracting C intrafield signal, a filter 10 for extracting interframe C signal, and a motion detecting circuit 12 for C signal.

C signal 205 by intrafield Y/C separation which has undergone Y/C separation by the filter 9 for extracting intrafield C signal is inputted to a first input terminal of a C signal mixing circuit 15. In addition, C signal 206 by Y/C separation in a frame which has undergone Y/C separation by the filter 10 for extracting interframe C signal is inputted to a second input terminal of the mixing circuit 15 For C signal.

On the other hand, a signal 207 showing the amount of motion of Y signal detected by the motion detecting circuit 11 for Y signal is inputted to one input terminal of a synthesizer 13, and a signal 208 showing the amount of motion of C signal detected by the motion detecting circuit 12 for C signal is inputted to the other input terminal of the synthesizer 13.

A motion detecting signal 209 which has been synthesized by the synthesizer 13 is inputted to a third input terminal of the mixing circuit 14 for a Y signal and to a third input terminal of the mixing circuit 15 for a C signal respectively, and a motion detecting unit 80 is composed of the motion detecting circuit 11 for Y signal, motion detecting circuit 12 for C signal and synthesizer 13. A Y signal 210 by motion adaptive Y/C separation which is an output of the mixing circuit 14 for Y signal is outputted From an output terminal 2, and a C signal 211 by motion adaptive Y/C separation which is an output of the mixing circuit 15 for C signal is outputted from an outpost terminal 3.

Next, explanation will be given of the operation. In separating a V signal 201, the motion detecting unit 80 judges whether V signal 201 is a signal showing a static image or a moving image by synthesizing respective outputs of the motion detecting circuit 11 for Y signal and the motion detecting circuit 12 for C signal by the synthesizer 13.

The motion detecting circuit 11 for Y signal, as shown in FIG. 2 for example, subtracts at a subtracter 83 a signal which has been obtained by making the V signal 201 inputted from an input terminal 21 to be delayed by one frame at one-frame delay circuit 82 from the directly inputted V signal 201 to calculate one-frame difference, and passes it through a LPF 84 which allows band lower than 2.1 MHz to be passed, then calculates the absolute value thereof at an absolute value circuit 85 and changes it into a signal 207 showing the amount of motion of low frequency component of Y signal at a non-linear transform circuit 86 to output it to an output terminal 81.

The motion detecting circuit 12 for C signal, as shown in FIG. 3 for example, subtracts at a subtracter 89 a signal which has been obtained by making the band-limited color difference signal 204 inputted from the input terminal 23 to be delayed by two frames at a two-frame delay circuit 88 from the directly inputted color difference signal 204 to calculate a two-frame difference, and calculates the absolute value at an absolute value circuit 90. Then the absolute value is changed at a non-linear transform circuit 91 to the signal 208 showing the amount of motion of C signal to be outputted from an output terminal 87.

The synthesizer 13 is so constructed, for example, as to select the larger value between the amount of motion of Y signal 207 and that of C signal 208 and output it. The result of discrimination is expressed by motion coefficient K ($0 \leq K \leq 1$). For example, in the case where an image is discriminated as a complete static image, K=0, and in the case where an image is discriminated as a complete motion image, K=1. It is given as a control signal 209.

Generally, in the case where an image is a static one. Y/C separation is carried out by the filter 5 for extracting interframe Y signal and the filter 10 for extracting interframe C signal utilizing interframe correlation to separate Y signal from C signal.

The filter 5 for extracting interframe Y signal, as shown in FIG. 4 for example, adds at an adder 94 a signal which has been obtained by making the V signal 201 inputted From the input terminal 21 to be delayed by one-frame at a one-frame delay circuit 93 to the directly inputted V signal 201 to calculate a one-frame sum, then extract YF signal 203 to output it to an output terminal 92.

The filter 10 for extracting an interframe C signal, as shown in FIG. 5 for example, adds at an adder 100 a signal which has been obtained by making the color difference signal 204 inputted from the input terminal 23 to be delayed by one-frame at a one-frame delay circuit 99 to the directly inputted color difference signal 204 to calculate a one-frame sum, then extract CF signal 206 to output it to an output terminal 98.

In addition, in the case where an image is a moving one, Y/C separation a is carried out to separate Y signal from C signal by the filter 4 for extracting intrafield Y signal and the filter 9 for extracting intrafield C signal utilizing intrafield correlation.

The filter 4 for extracting intrafield Y signal, as shown in FIG. 6 for example, adds at an adder 97 a signal which has been obtained by making the V signal 201 inputted from the input terminal 21 to be delayed by one-line at a one-line delay circuit 96 to the directly inputted V signal 201 to calculate one-line sum, then extracts Yf signal 202 to output it from an output terminal 95.

The filter 9 for extracting intrafield C signal, as shown in FIG. 7 for example, adds at an adder 103 a signal which has been obtained by making the color difference signal 204 inputted from the input terminal 23 to be delayed by one-line at a one-line delay circuit 102 to the directly inputted color difference signal 204 to calculate one-line sum, then extracts the Cf signal 205 to output it from an output terminal 101.

In a motion-adaptive Y/C separation filter, such filters as the filter 4 for extracting intrafield Y signal and filter 5 for extracting interframe Y signal are juxtaposed and outputs Y signal 210 by motion adaptive Y/C separation from an output terminal 2 by making the mixing circuit 14 for Y signal carry out the following operation according to a control signal 209 being a motion coefficient K synthesized by the motion detecting circuit 12 for C signal.

$$Y=kYf+(1-k)YF$$

Here,

Yf : output 202 of Y signal by intrafield Y/C separation

YF: output 203 of Y signal by interframe Y/C separation.

In the above filter, the filter 9 For extracting intrafield C signal and the filter 10 for extracting interframe C signal are juxtaposed in the same way, and outputs C signal 211 by motion adaptive Y/C separation from the output terminal 3 by making the mixing circuit 15 for C signal carry out the following operation according to the control signal 209.

$$C=kCf+(1-k)CF$$

Here,

Cf: output of C signal by intrafield Y/C separation

CF: output 206 of C signal by interframe Y/C separation

As the conventional motion-adaptive Y/C separation filter is so constructed as the above, Yf signal by the filter 4 for extracting intrafield Y signal and the YF signal by the filter 5 for extracting interframe Y signal are to be mixed according to of the synthesized amount of motion detected respectively by the motion detecting circuit 11 for Y signal and the motion detecting circuit 12 for C signal. In the same way, Cf signal by the filter 9 for extracting intrafield C signal and CF signal by the filter 10 for extracting interframe C signal are to be mixed according to the synthesized amount of motion.

Accordingly, as there is an excessive change in resolution in the case where an image changes to a motion one from static one, or vice versa because a filter characteristic of static image is totally different from that of motion one, there has been a problem that picture quality degradation in processing motion image is prominent.

SUMMARY OF THE INVENTION

The present invention has been devised in order to solve the above-mentioned problem, and the object thereof is to provide a motion-adaptive Y/C separation filter capable of reproducing image which is high in resolution and low in picture quality degradation, even when dealing with an image that must, be switched many times as above-mentioned.

In the present invention, a circuit, which carries out intraframe Y/C separation by undergoing separation utilizing intrafield correlation, is provided in the case where motion image is detected as first means, and a circuit, which carries out Y/C separation in three fields by undergoing separation utilizing intrafield correlation, is provided in the case where motion image is detected as second means.

The separated Y signal and C signal are respectively mixed with Y signal and C signal which have been separated by undergoing interframe Y/C separation to be used.

The above and further objects and features of the invention will more fully be apparent from the following detailed description with accompanying drawings.

BRIEF DESCRIPTION OF THE DRAWINGS

FIG. 44 is a block diagram of a filter for extracting intraframe C signal.

DETAILED DESCRIPTION OF PREFERRED EMBODIMENTS

In the following explanation will be given on the invention referring to drawings.

Figure 1:
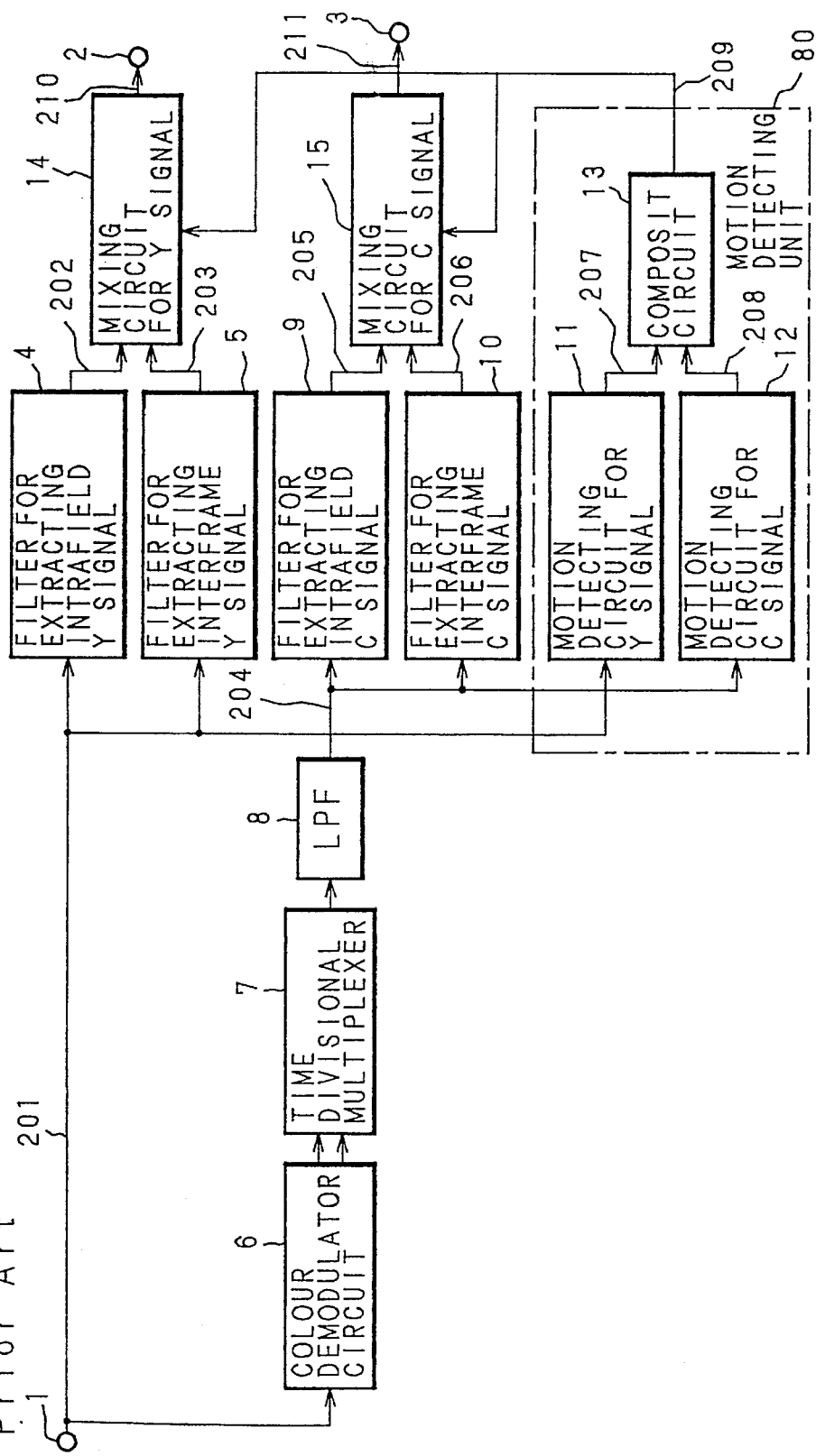
FIG. 1 is a block diagram of a conventional Y/C separation filter.
Figure 2:
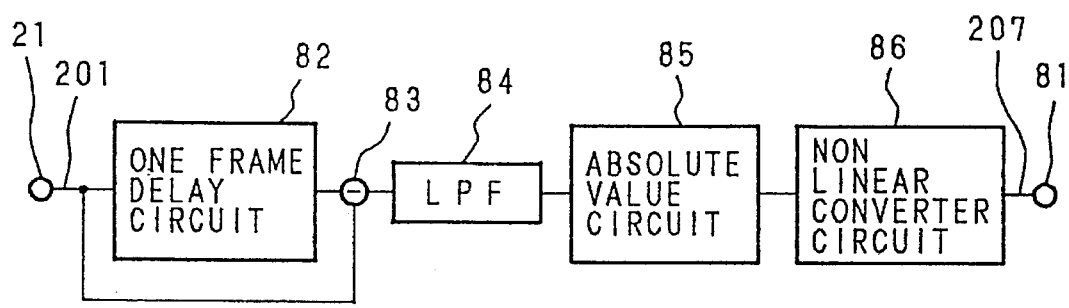
FIG. 2 is a block diagram of a motion detecting circuit for Y signal.
Figure 3:
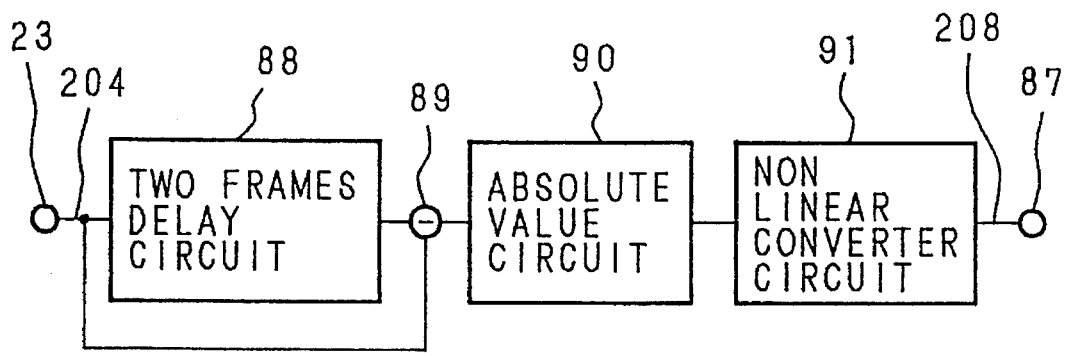
FIG. 3 is a block diagram of a motion detecting circuit for C signal.
Figure 4:
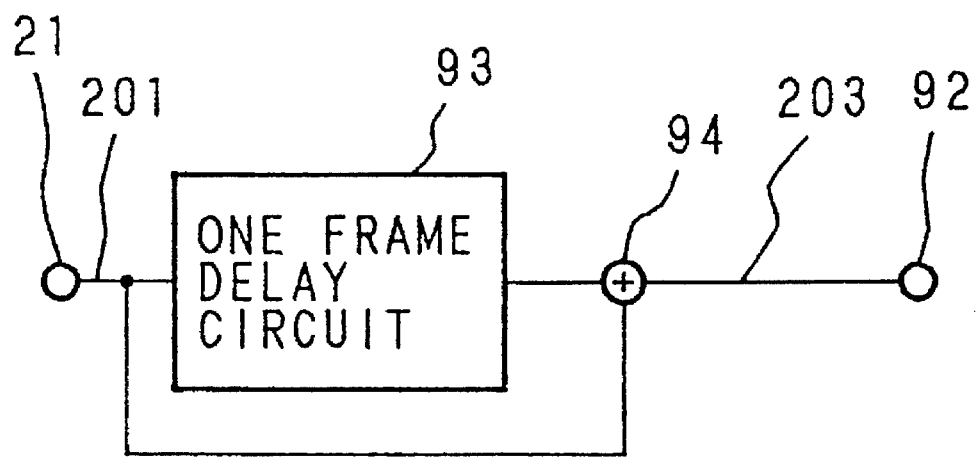
FIG. 4 is a block diagram of a filter for extracting interframe Y signal.
Figure 5:
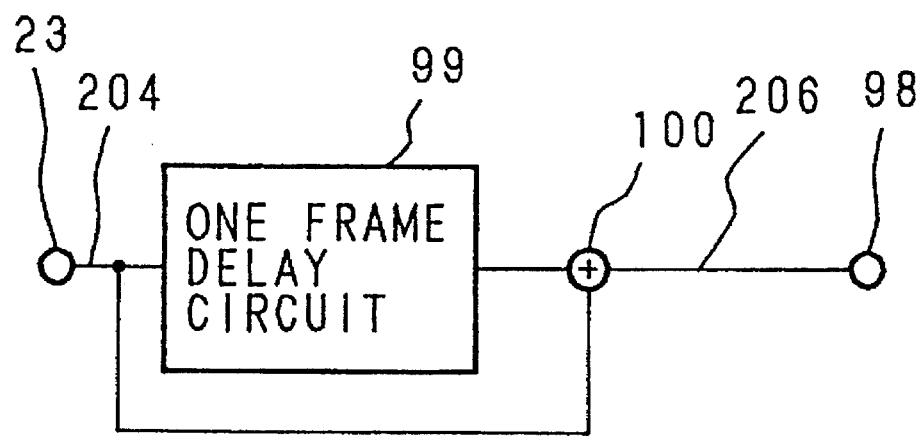
FIG. 5 is a block diagram of a filter for extracting interframe C signal.
Figure 6:
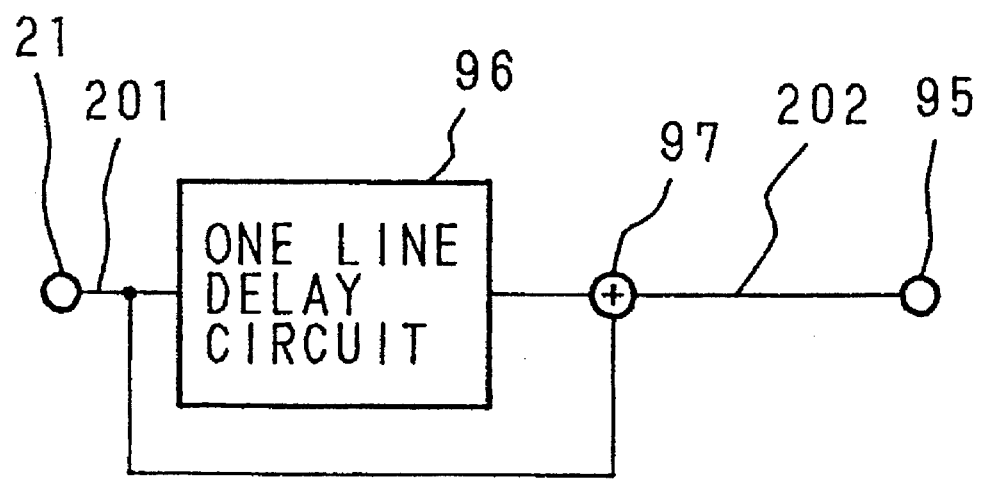
FIG. 6 is a block diagram of a filter for extracting intrafield Y signal.
Figure 7:
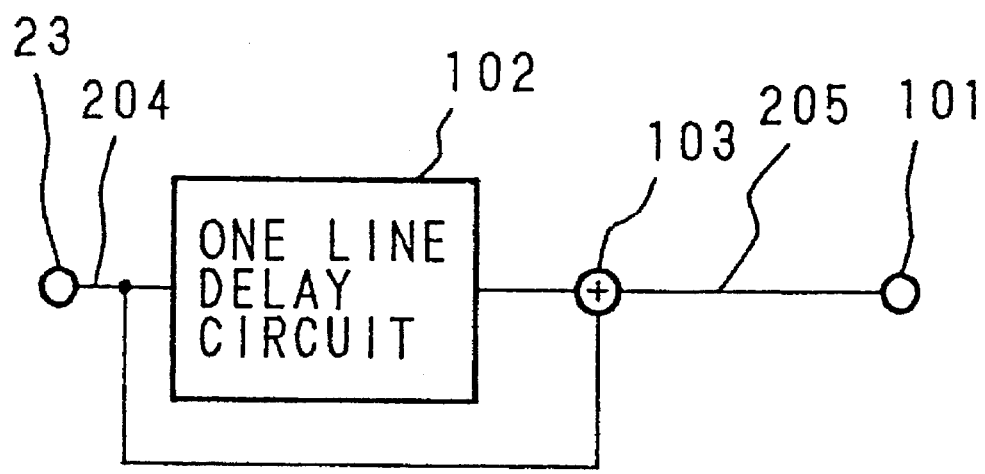
FIG. 7 is a block diagram of a filter for extracting intrafield C signal.
Figure 8:
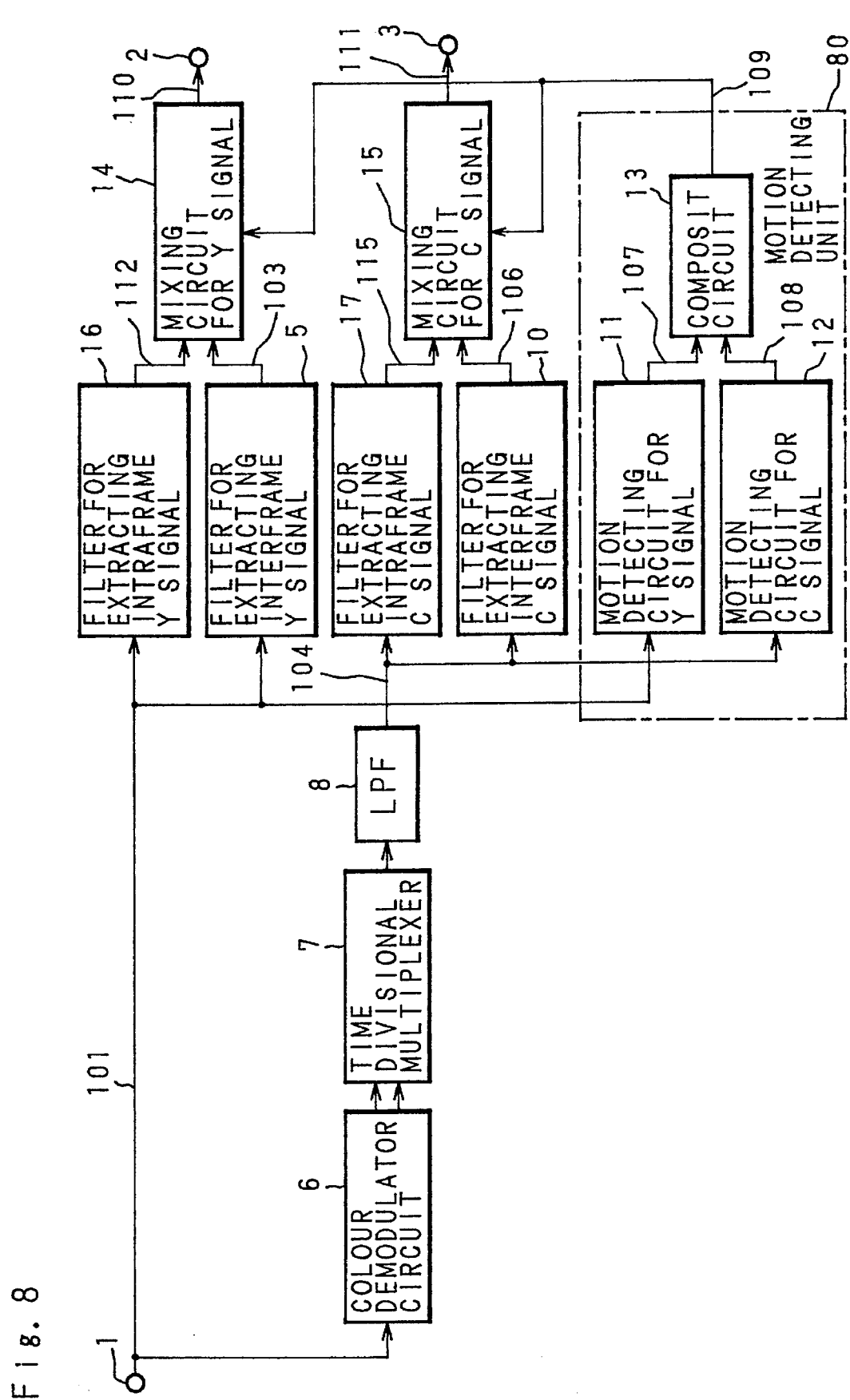
FIG. 8 is a block diagram of a first embodiment of Y/C separation filter of the present invention.
Figure 9:
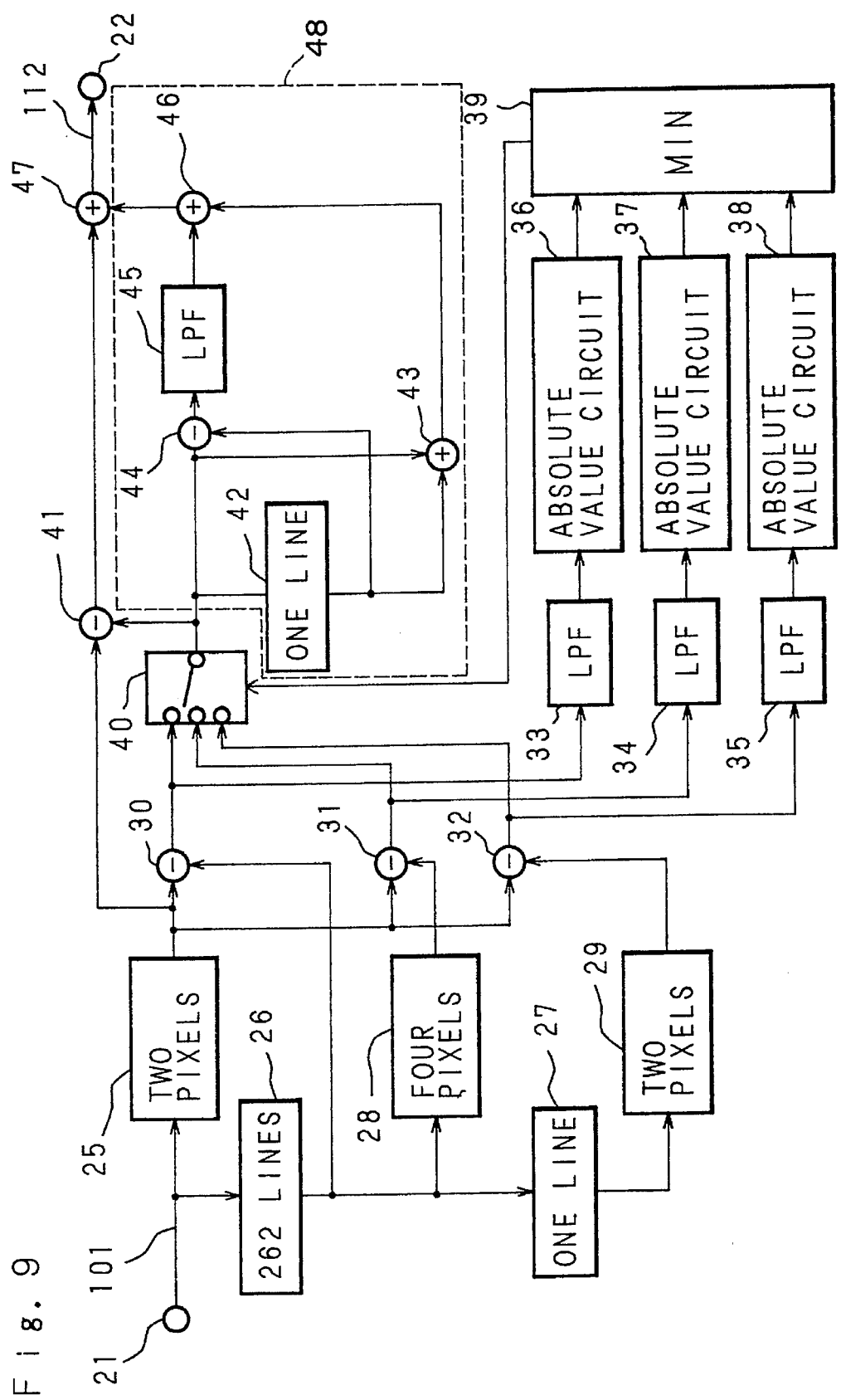
FIG. 9 is a block diagram of a first embodiment of a filter for extracting intraframe Y signal.

FIG. 8 is a block diagram showing an embodiment of a motion-adaptive Y/C separation filter of the invention. This figure shows that the filter 4 for extracting intrafield Y signal shown in FIG. 1 is replaced by a filter 16 for extracting intraframe Y signal and the filter 9 for extracting intrafield C signal by a filter 17 for extracting intraframe C signal, and explanation of the others will be omitted as they have been explained in the conventional example. FIG. 9 is a detailed block diagram of the first embodiment of the filter 16 for extracting intraframe Y signal shown in FIG. 8.

As the figure shows, the V signal 101 is inputted to terminal 21. The V signal 101 is inputted to the respective input terminals of a two-pixel delay circuit 25 and a 262-line delay circuit 26.

The signal which has been delayed by two pixels by the two-pixel delay circuit 25 is inputted to respective first input, terminals of subtracters 30, 31, 32 and 41.

The V signal which has been delayed by 262 lines by the 262-line delay circuit 26 is inputted to input terminals of an one-line delay circuit 27 and a four-pixel delay circuit 28, and to a second input terminal of the subtracter 30.

The V signal which has been delayed by one line by the one-line delay circuit 27 is inputted to an input terminal of a two-pixel delay circuit 29. The V signal which has been delayed by four pixels by the four-pixel delay circuit 28 is inputted to a second input terminal of the subtracter 31. The V signal which has been delayed by two pixels by the two-pixel delay circuit 29 is inputted to a second input terminal of the subtracter 32. The output signal of the subtracter 30 is inputted to a first input terminal of a signal selecting circuit 40 and an input of a LPF 33. The output signal of the subtracter 31 is inputted to a second input terminal of a signal selecting circuit 40 and an input terminal of a LPF 34. The output signal of the subtracter 32 is inputted to a third input terminal of the signal selecting circuit 40 and an input terminal of a LPF 35.

The output of the LPF 33 is inputted to an input terminal of an absolute value circuit 36, the output of the LPF 34 is inputted to an input terminal of an absolute value circuit 37, and the output of the LPF 35 is inputted to an input terminal of an absolute value circuit 38, respectively.

The output of the absolute value circuit 36 is inputted to a first input terminal of a minimum value selecting circuit 39, the output of the absolute value circuit 37 is inputted to a second input terminal of the minimum value selecting circuit 39, and the output of the absolute value circuit 38 is inputted to a third input terminal of the minimum value selecting circuit 39, respectively.

The output, of the minimum selecting circuit 39 is inputted to a fourth input terminal of the signal selecting circuit 40, thereby selecting and controlling inputs from the first to the third.

The output of the signal selecting circuit 40 is inputted to an input terminal of an one-line delay circuit 42, a second input terminal of the subtracter 41, and first input terminals of an adder 43 and a subtracter 44, respectively. The output of the one-line delay circuit 42 is inputted to second input terminals of the adder 43 and the subtracter 44. The output of the adder 43 is inputted to a first, input terminal of an adder 46. The output of the subtracter 44 is inputted to an input terminal of a LPF 45. The output of the LPF 45 is inputted to a second input terminal and an adder 46. The output of the subtracter 41 is inputted to a first input terminal of an adder 47 and the output of the adder 46 is inputted to a second input terminal of the adder 47.

The output of the adder 47 is outputted from an output terminal 22 as Y signal 112 by intraframe extracting Y signal.

Next, explanation will be given of the operation.

When taking x-axis in the horizontal direction of an image plane, y-axis in the vertical direction thereof, and t-axis being a time base in the vertical direction against the plane, a three-dimensional space time can be thought of.

Figure 10:
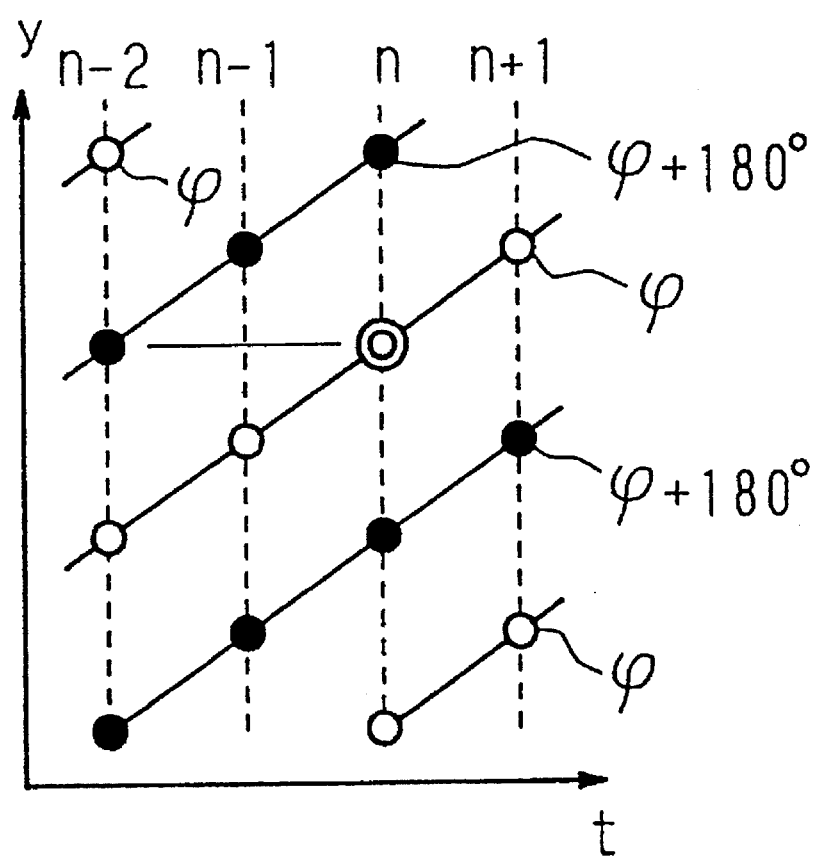
FIG. 10 is a t-y view showing array of V signal.
Figure 11:
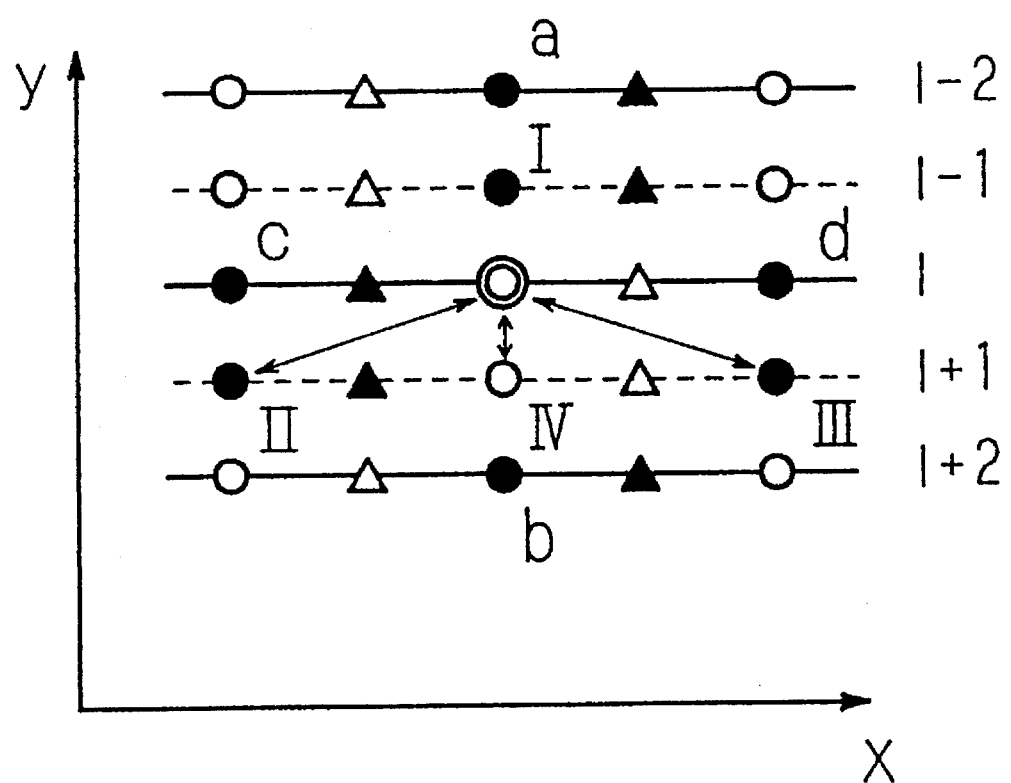
FIG. 11 is a x-y view showing array of V signal.

FIG. 10 and 11 are views showing a three-dimensional space time. FIG. 10 is a plane comprising t-axis and y-axis, and FIG. 11 is a plane comprising x-axis and y-axis. In FIG. 10, a broken line shows a field, and a solid line shows that a color sub carrier is the same. And at the intersecting points thereof, pixels ○ and ● are shown. Symbols n−2 ... n+1 are field numbers.

In addition, solid lines and broken lines in FIG. 11 respectively show scanning lines of n-th field and n−1-th field respectively, and four kinds of symbols ⌞○⌉, ⌞●⌉, ⌞△⌉, and ⌞▲⌉ show sampled points of a same phase of the color sub carrier by using the same symbols when the V signal is digitized at four times of the color sub carrier fsc (=3.58 MHz), 1−2 ... 1+2 show line numbers. In addition, in FIG. 10 and 11, ○ and ┼, △ and ▲ respectively differ 180° in phase from each other. Now, a picked-up sampled point is indicated by ⊙. In n-th field in which the picked-up sampled point exists, the phase of color sub carrier at the picked-up sampled point differs 180° from that of a and b being one line up and down respectively therefrom, and differs 180° from that of c and d being two points before and behind respectively therefrom.

Thereupon, such filters as a line-comb filter based upon digital circuit, an adaptive Y/C separation filter disclosed in Japanese Patent Application Laid Open No.60-134587, 1985 and so on can be constructed.

As is shown in FIG. 10, as the phase of color sub carrier at the picked-up sampled point differs 180° from that at a sampled point corresponding thereto being one Frame (one frame=2 fields) away therefrom, a filter for interframe Y/C separation can also be constructed.

Moreover, as is understood from FIG. 11, as the phase of color sub carrier differs 180° from that of a sampled point I one line up therefrom and that of sampled points II and III one line down therefrom being respectively located in n−1-th field one field before the n-th field in which the picked-up sampled point exists, interfield Y/C separation can be possible according to the calculation between any of these three points I, II and III and the picked-up sampled point.

In addition, a frequency axis corresponding to the above-mentioned x-axis, y-axis and t-axis, u-axis as a horizontal frequency axis, v-axis as a vertical frequency axis and f-axis as a time frequency axis are used to establish a three-dimensional frequency space comprising u-axis, v-axis and f-axis being orthogonal with each other.

Figure 12A:
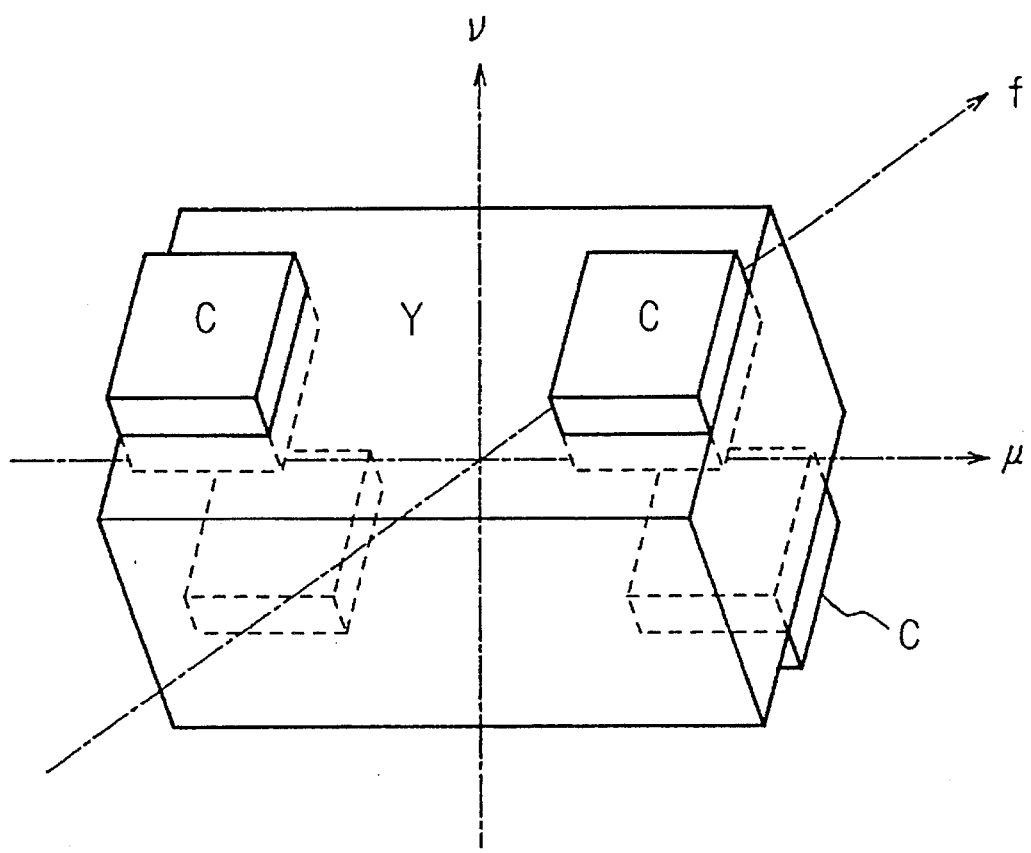
FIG. 12(a)–(c) are spectrum atlantes of V signal three-dimensional frequency space.
Figure 12B:
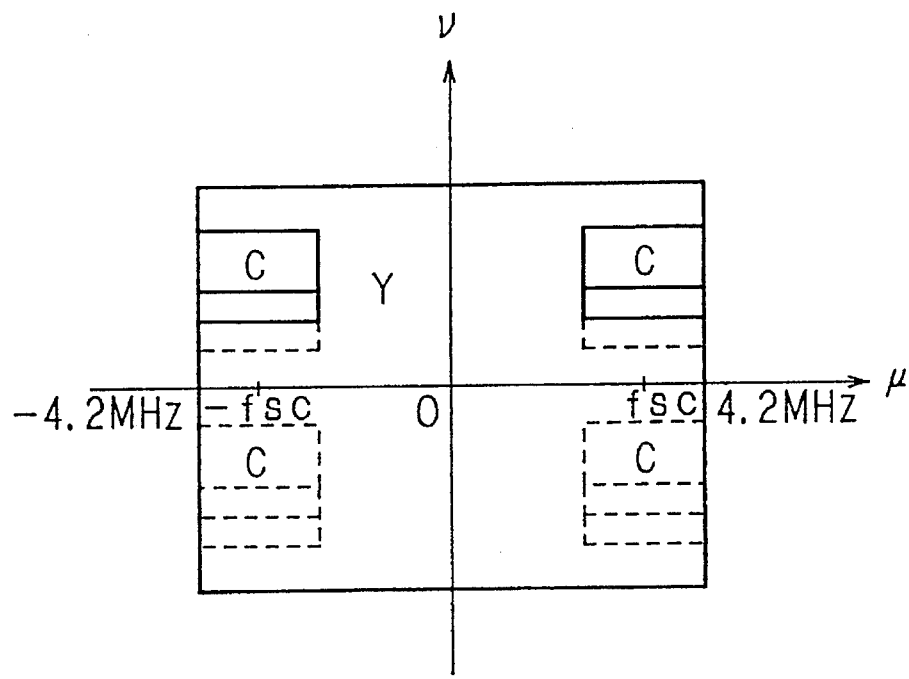
Figure 12C:
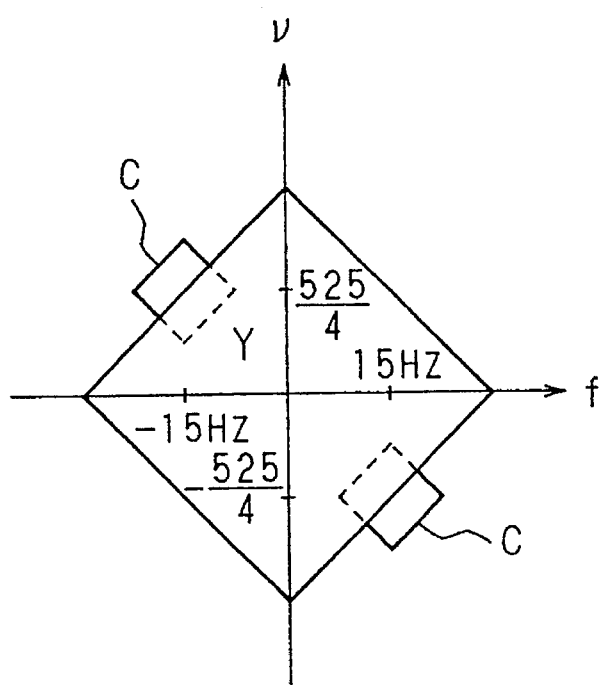

FIG. 12(a) through (c) are projection views of above-mentioned three-dimensional frequency space. FIG. 12(a) is a view of above-mentioned three dimensional frequency space viewed at a slant. FIG. 12(b) is a view of above-mentioned three dimensional frequency space viewed from the negative direction of f-axis, and FIG. 12(c) is a view of above-mentioned three dimensional frequency space viewed from positive direction of u-axis. In the FIG. 12(a) through (c), spectrum distribution of V signal is shown on the three-dimensional frequency space. As can be seen from FIG. 12(a) through (c), the spectrum of Y signal extend with the origin of the three-dimensional frequency space as the center, and spectrum of C signal is located in four spaces like the ones shown in FIG. 12(a) through (c) as I signal and Q signal are quadrature two phase modulated.

But, as in the case of FIG. 12(c), when looking V signal on u-axis, C signal is found only in the second quadrant and the fourth quadrant. This corresponds to the fact that a solid line showing the same phase of the color sub carrier goes up as time passes.

Nevertheless, in the conventional example, as Y/C separation utilizing intrafield correlation is carried out in the case where motion of an image is detected, band limitation is not possible in the direction of f-axis although it is possible in the direction of u-axis and v-axis.

Accordingly, frequency space in which Y signal originally exists is to be separated therefrom as C signal, and as a result, band of Y signal in motion image has been narrowed.

Hereupon, band of Y signal in motion image can be widened by carrying out Y/C separation according to interfield processing as mentioned above.

In FIG. 11 points in n−1-th field, located in the vicinity of the picked-up sampled point ⌞⊙⌉ in n-th field and different 180° in color sub carrier phase from the picked-up sampled point are the sampled points ⌞●⌉ I, II and III. Calculation between the picked-up sampled point and any of these three points enables interfield Y/C separation.

At first, it is possible to take out high frequency component on the three-dimensional frequency space including C signal according to the difference between the picked-up sampled point ⌞⊙⌉ and the sampled point ⌞●⌉ I shown in FIG. 11. When the taken-out component is made to pass through a two-dimensional comb filter 48 consisting of the one-line delay circuit 42, adders 43 and 46, subtracters 44 and LPF 45, C signal can be removed. Y signal can be obtained by adding the above result to low frequency component on the three dimensional frequency space not including C signal which is an output of the subtracter 41. This is called extracted interfield Y signal A.

Figure 13A:
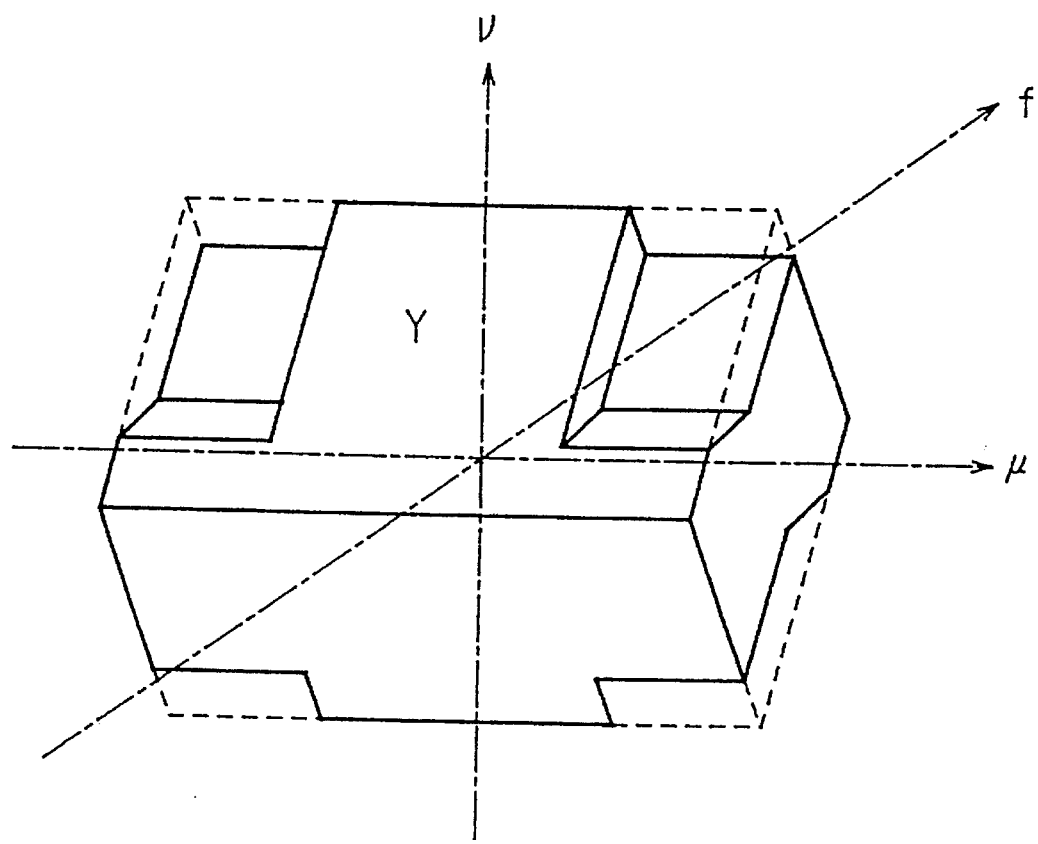
FIG. 13(a)–(c) are spectrum atlantes, in three dimensional frequency space, of Y signal obtained by the first filter for extracting interfield Y signal.
Figure 13B:
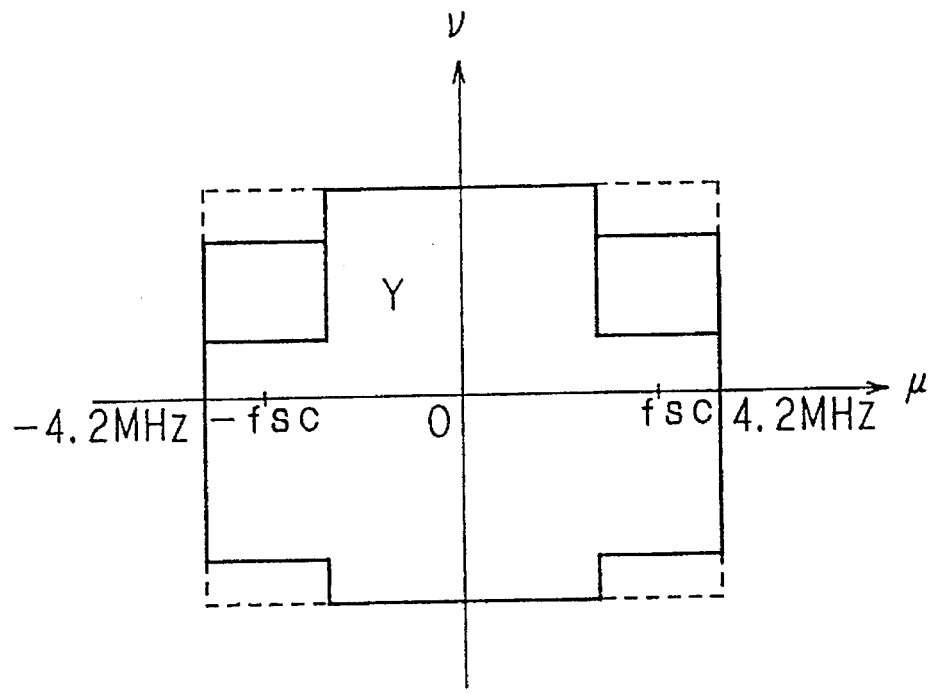
Figure 13C:
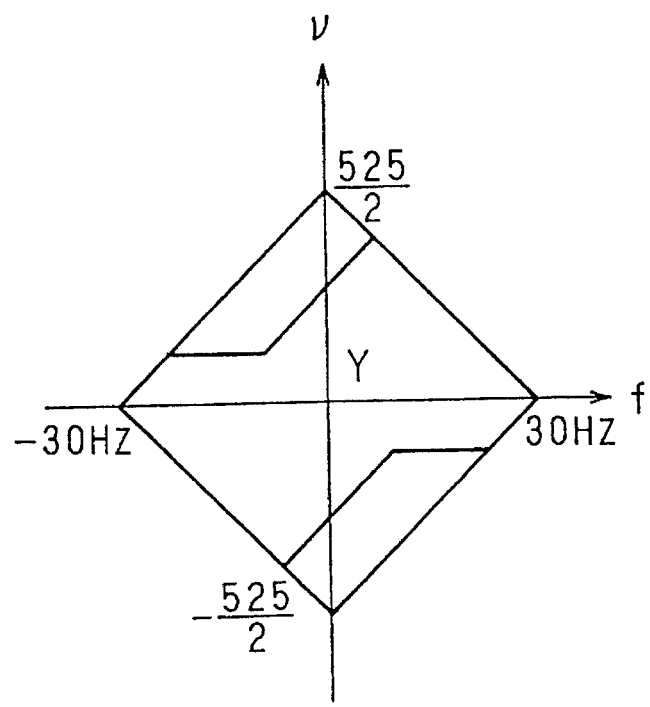

FIG. 13(a) through (c) show three-dimensional frequency space in the same way as FIG. 12(a) through (c), showing the frequency space in which Y signal exists obtained by extracted interfield Y signal A.

Secondary, it is possible to take out high frequency component in the three-dimensional frequency space including C signal according to the difference between the picked-up sampled point ⌊⊙⌉ and the sampled ⌊●⌉ II. When the taken-out component is made to pass through the above-mentioned two dimensional comb filter, C signal can be removed.

In the following, Y signal can be obtained by the same processing as the above. This is called extracted interfield Y signal B.

FIG. 14 also shows frequency space in which Y signal exists obtained by extracted interfield Y signal B in the same way as in the cases of FIG. 12 and 13.

Figure 14A:
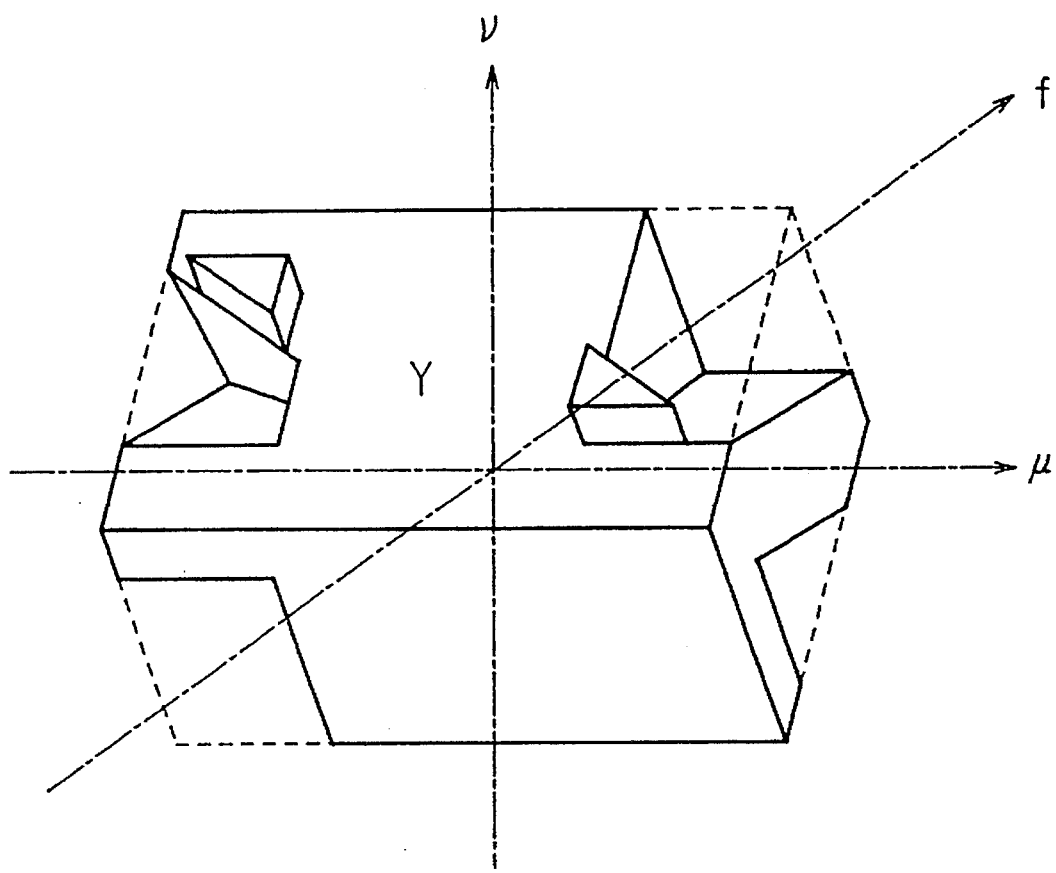
FIG. 14(a)–(c) are spectrum atlantes, in three dimensional frequency space, of Y signal obtained by the second filter for extracting interfield Y signal.
Figure 14B:
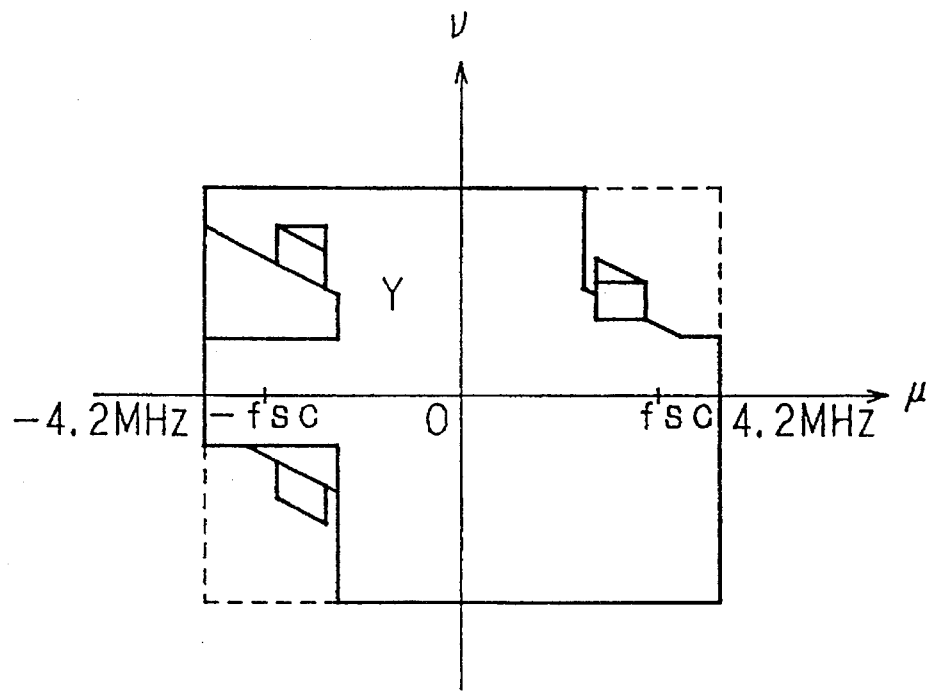
Figure 14C:
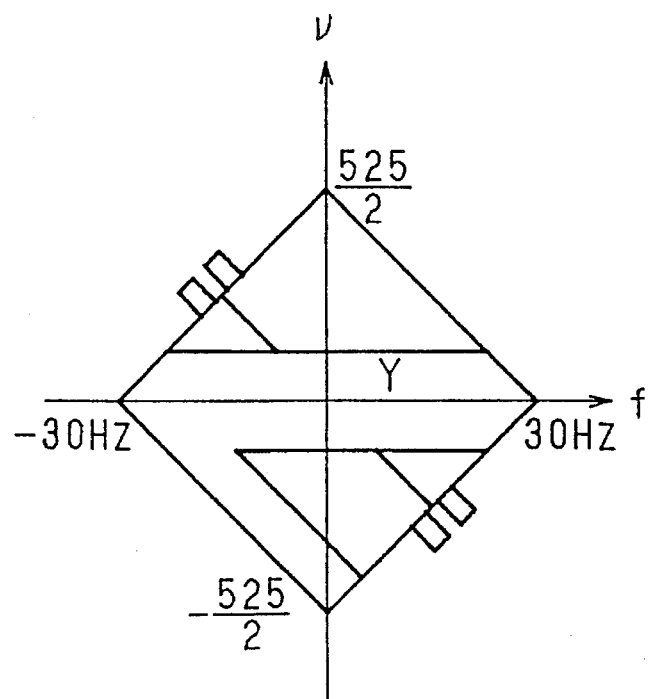

When FIG. 14(a) through (c) are viewed, it seems that the Y signal includes a part of C signal, however, it is rare that Y signal includes C signal because correlation between Y signal and C signal is strong.

Thirdly, it is possible to take out high frequency component on the three-dimensional frequency space including C signal according to the difference between the picked-up sampled point ⌊⊙⌉ and the sampled point ⌊●⌉ III shown in FIG. 11. When the taken-out component is made to pass through the above-mentioned two-dimensional comb filter, C signal can be removed.

When the same processing is applied, Y signal is obtained. This is called extracted interfield Y signal C.

Figure 15A:
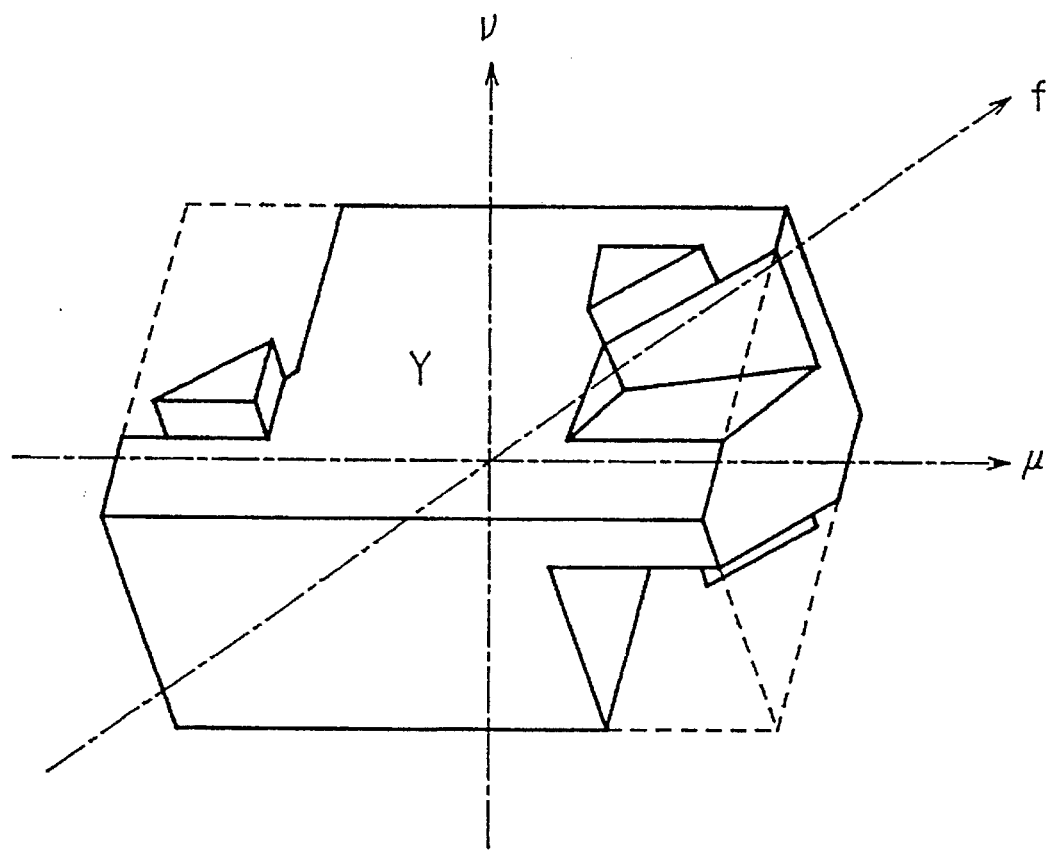
FIG. 15(a)–(c) are spectrum atlantes, in three dimensional frequency space, of Y signal obtained by the third filter for extracting interfield Y signal.
Figure 15B:
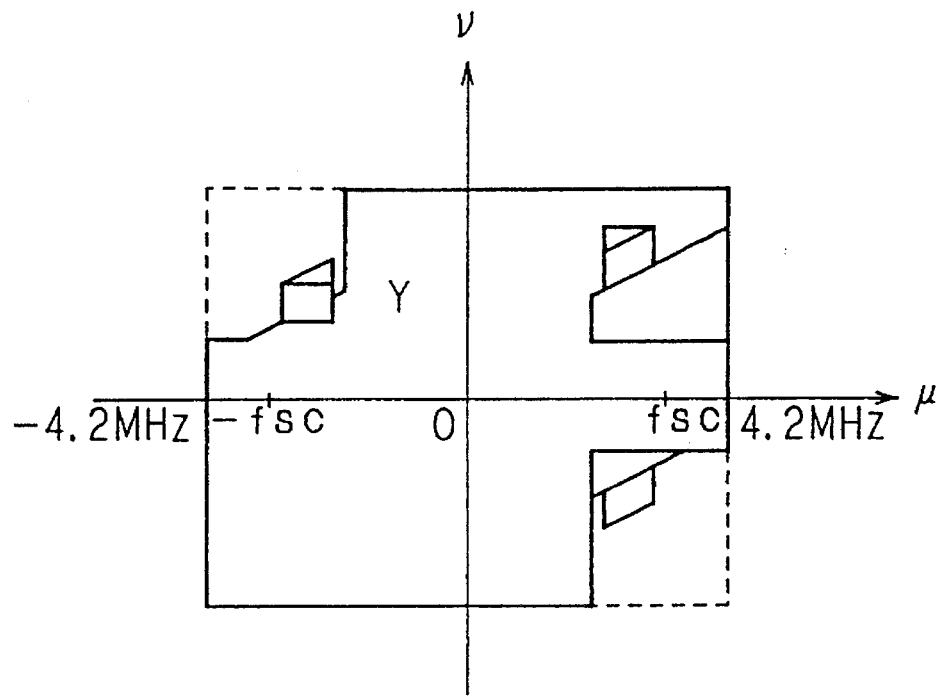
Figure 15C:
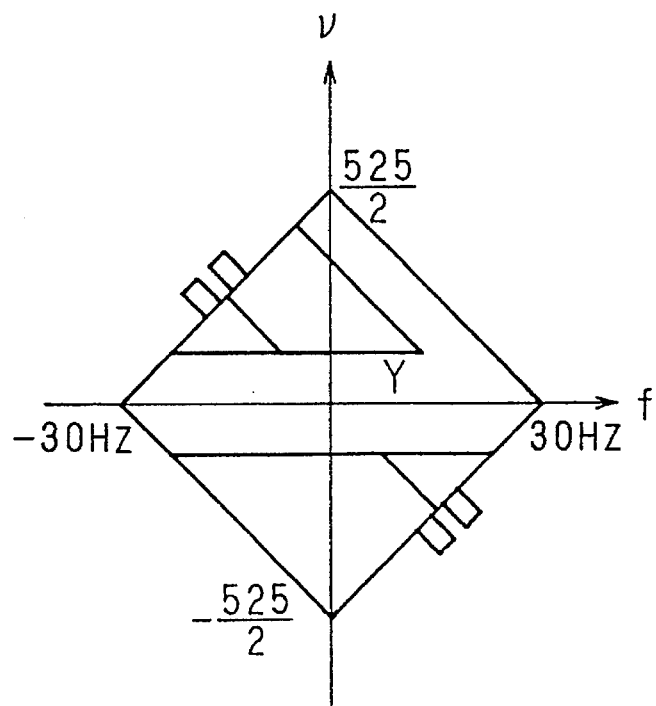

FIG. 15 also shows frequency space in which Y signal and C signal exist obtained by C signal by interfield Y/C separation.

When FIG. 15 is viewed, it seems that the separated Y signal includes a part of C signal, however, it is rare that Y signal include C signal according to the same reason in the case of FIG. 11.

In order to control selecting adaptively three kinds of interfield Y/C separations, it is necessary to detect correlation between the picked-up sampled point ⌊⊙⌉ and the sampled points ⌊●⌉ I, II and III.

As it is V signal that is inputted to the input terminal 21, in order to detect the correlation, the respective differences should be passed through LPF to detect the correlation of low frequency component of Y signal and make it as a control signal.

Next explanation will be given on operation of a filter for extracting intraframe Y signal having the configuration of FIG. 9.

This invention is characterized by using the optimum filter among the filters for extracting intraframe Y signal including three kinds of interfield calculations, as motion image processing in place of a filter for extracting intrafield Y signal, when a motion detecting unit 80 judges that the image is motion one.

In FIG. 9, V signal 101 inputted from the input terminal 21 is delayed by two pixels by the two-pixel delay circuit 25 and delayed by 262 lines by the 262-line delay circuit 26.

By subtracting V signal which is delayed by two pixels by the two-pixel delay circuit 25 from the output of the 262-line delay circuit 26 at the subtracter 30, an interfield difference for extracted interfield Y signal C can be obtained. The calculation is for obtaining the difference between the picked-up sampled point ⌊⊙⌉ and the sampled point ⌊●⌉ III. When the point d in FIG. 11 is made as a reference, the picked-up sampled point ⌊⊙⌉ is delayed by two pixels. The sampled point ⌊●⌉ III is delayed by 262 lines (262 lines=one field). Accordingly, the difference between the output of the two-pixel delay circuit 25 and the output of the 262-line delay circuit 26 becomes the aimed difference.

By subtracting V signal which is delayed by two pixels by the two-pixel delay circuit 25 from the output of the four-pixel delay circuit 28 at the subtracter 31, an interfield difference for extracted interfield Y signal B can be obtained.

By subtracting V signal which is delayed by two pixels by the two-pixel delay circuit 25 from the output of the two-pixel delay circuit 29, an interfield difference extracted interfield Y signal A can be obtained.

Respective extracted interfield Y signals A and B can be easily understood in the same way as extracted interfield Y signal C when the ○ point d is made as a reference.

Above-mentioned three kinds of interfield differences is inputted to the signal selecting circuit 40, and is selected by the output of the minimum value selecting circuit 40 to be described later.

An interfield difference being an output of the subtracter 30 passes through the LPF 33 which allows the band lower than 2.1 MHz to be passed, is made to be an absolute value thereof by the absolute value circuit 36, and is inputted to the minimum value selecting circuit 39. The output of the absolute value circuit 36 detects the correlation between the picked-up sampled point and the sampled point III shown in FIG. 11.

An interfield difference being an output of the subtracter 31 passes through the LPF 34 which allows the band lower than 2.1 MHz to be passed, is made to be an absolute value thereof by the absolute value circuit 37, and is inputted to the minimum value selecting circuit 39. The absolute value circuit 37 detects the correlation between the picked-up sampled point and the sampled point II.

An interfield difference being the output of the subtracter 32 passes through the LPF 35 which allows the band lower than 2.1 MHz to be passed is made to be an absolute value thereof by the absolute value circuit 38, and is inputted to the minimum value selecting circuit 39. The absolute value circuit 38 detects the correlation between the picked-up sampled point ⌊⊙⌉ and the sampled point ⌊○⌉ I shown in FIG. 11.

The minimum value selecting circuit 39 selects the minimum output (whose amount of detected correlation is maximum) among the above-mentioned three kinds of the absolute value outputs to control the signal selecting circuit 40.

That is to say, the signal selecting circuit 40 selects the output of the subtracter 30 in the case where the output of the absolute value circuit 36 is minimum, selects the output of the subtracter 31 in the case where the output of the absolute value circuit 37 is minimum, and selects the output of the subtracter 32 in the case where the output of the absolute value circuit 38 is minimum.

In addition, the output of the signal selecting circuit 40 is subtracted from V signal by the subtracter 41, and low frequency component of three-dimensional frequency space in the direction in which correlation has been detected is obtained. On the other hand, as the output of the signal selecting circuit 40 is high frequency component of three-dimensional frequency in the direction in which correlation has been detected, C signal can be removed by passing it through the two-dimensional comb filter consisting of the one-line delay circuit 42, adders 43 and 46, subtracters 44, LPF 45. By adding output of the subtracter 41 to that of the adder 46 by the adder 47, Y signal 112 by intraframe extracting Y signal can be obtained.

In addition, in FIG. 9, although calculation by using also the one-line delay circuit 42 has been applied in order to remove C signal, separation accuracy will be much more improved in the case where a plurality of line-memories are used and the one-line delay circuit is used at every stored signal of a plurality of lines.

Figure 16:
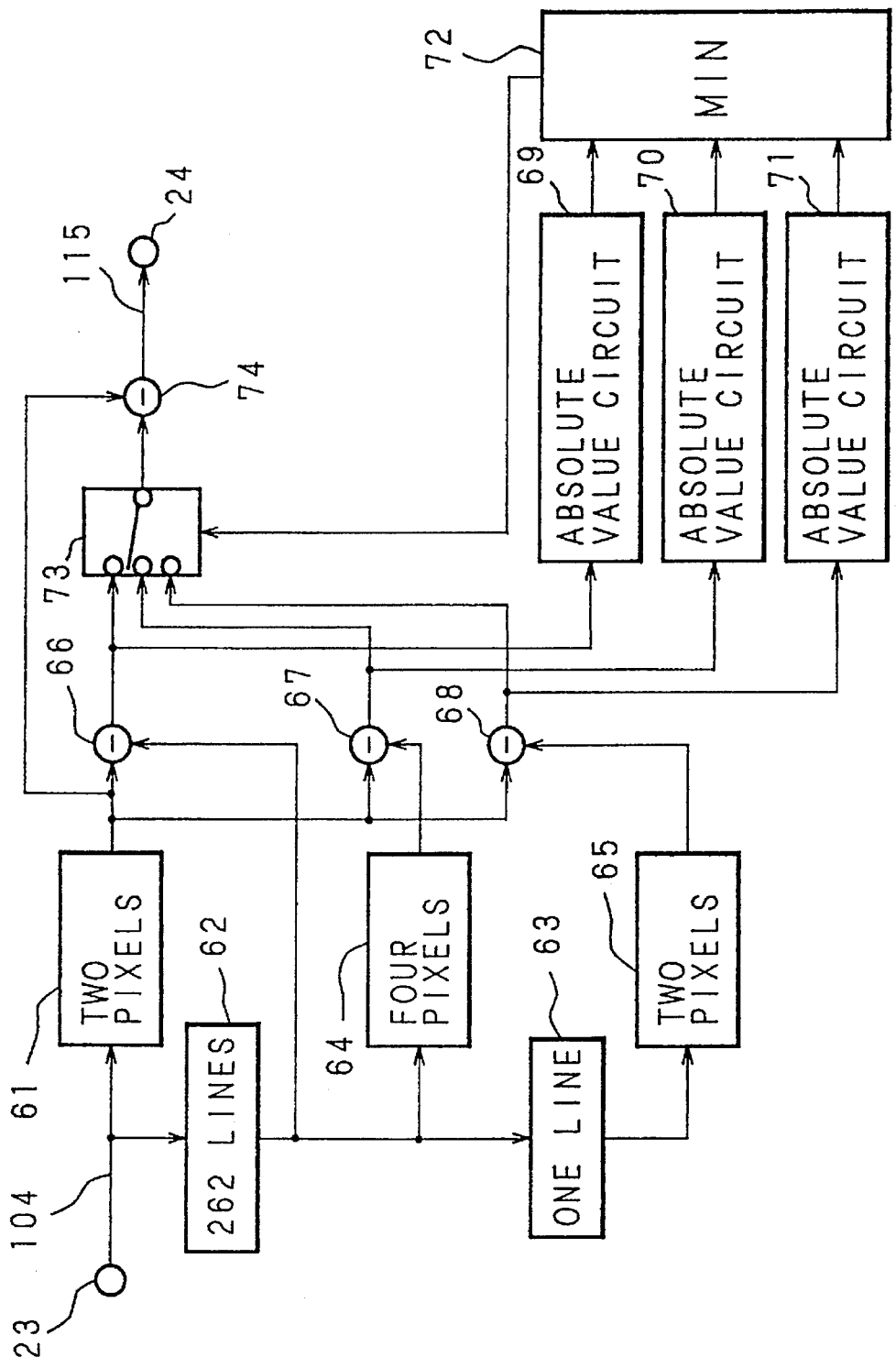
FIG. 16 is a block diagram of a first embodiment of a filter for extracting intraframe C signal in the embodiment shown in FIG. 8.

FIG. 16 is a detailed block diagram of the filter for extracting intraframe C signal shown in FIG. 8 of the invention.

In the FIG. 16, to the input terminal 23, color difference signal 104 is inputted. The color difference signal 104 is inputted to the input terminals of a two-pixel delay circuit 61 and a 262-line delay circuit 62 respectively.

The signal which has been delayed by two pixels by the two-pixel delay circuit 61 is inputted to first input terminals of subtracters 66, 67, 68, and 74 respectively.

V signal which has been delayed by 262 lines by the 262-line delay circuit 62 is inputted to input terminals of a one-line delay circuit 63 and a four-pixel delay circuit 64, and to a second input terminal of the subtracter 66.

The signal which has been delayed by one line by the one line delay circuit 63 is inputted to an input terminal of a two-pixel delay circuit 65. The signal which has been delayed by four pixels by the four-pixels delay circuit 64 is inputted to a second input terminal of the subtracter 67. The signal which has been delayed by two pixels by the two-pixel delay circuit 65 is inputted to a second input terminal of the subtracter 68.

The output signal of the subtracter 66 is inputted to a first input terminal of a signal selecting circuit 73 and to an input terminal of the absolute value circuit 69 respectively. The output signal of the subtracter 67 is inputted to a second input terminal of the signal selecting circuit 73 and to an input terminal of the absolute value circuit 70 respectively. The output signal of the subtracter 68 is inputted to a third input terminal of the signal selecting circuit 73 and to an input terminal of an absolute value circuit 73 and to an input terminal of an absolute value circuit 71.

An output of an absolute value circuit 69 is inputted to a first input terminal of a minimum value selecting circuit 72, output of an absolute value circuit 70 is inputted to a second input value of the minimum value selecting circuit 72, and the output of the absolute value circuit 71 is inputted to a third input terminal of the minimum value selecting circuit 72, respectively.

The output of the minimum value selecting circuit 72 is inputted to a fourth input terminal of the signal selecting circuit 73, thereby selecting and controlling inputs from the first to the third.

The output of the signal selecting circuit 73 is inputted to a second input terminal of the subtracter 74. The output of the subtracter 74 is outputted from an output terminal 24 as C signal 115 by intraframe extracting C signal.

Next, explanation on the operation of a filter for extracting intraframe C signal having a configuration shown in FIG. 16.

This invention is characterized by using the optimum filter among filters for extracting intraframe C signal including three kinds of interfield calculations as a motion image processing in place of a filter for extracting intrafield C signal when the motion detecting unit 80 judges the image to be motion one.

Referring to FIG. 16, the color difference signal 104 inputted from the input terminal 23 is delayed by two pixels by the two-pixel delay circuit, 61, and is delayed by 262 lines by the 262-line delay circuit 62.

By subtracting the color difference signal which has been delayed by two pixels by the two-pixel delay circuit 61 from the output of the 262-line delay circuit 62 by the subtracter 66, an interfield difference for extracted interfield C signal C can be obtained.

By subtracting the output of the color difference signal which has been delayed by two pixels by the two-pixel delay circuit 61 from the output of the four-pixel delay circuit 64 by the subtracter 67, an interfield difference for extracted interfield C signal B can be obtained.

The output of the color difference signal which has been delayed by two pixels by the two-pixel delay circuit 61 from the output of the two-pixel delay circuit 65 by the subtracter 68, an interfield difference for extracted interfield C signal A can be obtained.

The above-mentioned three kinds of differences are inputted to the signal selecting circuit 73 and is selected by the output, of the minimum value selecting circuit 72 to be described later.

An interfield difference being an output of the subtracter 66 is made to be the absolute value thereof by the absolute value circuit 69 and is inputted to the minimum value selecting circuit 72. The absolute value circuit 69 detects the correlation between the picked-up sampled point ⌊⊙⌉ and the sampled point ⌊●⌉ III in FIG. 11.

An interfield difference in a field being the output of the subtracter 67 is made to be the absolute value thereof by the absolute value circuit 70 and is inputted to the minimum value selecting circuit 72. The absolute value circuit 70 detects the correlation between the picked-up sampled point ⌊⊙⌉ and the sampled point ⌊●⌉ II in FIG. 11.

An interfield difference being the output of the subtracter 68 is made to be the absolute value thereof by the absolute value circuit 71 and is inputted to the minimum value selecting circuit 72. The absolute value circuit 71 detects the correlation between the picked-up sampled point ⌊⊙⌉ and the sampled point ⌊●⌉ I shown in FIG. 11.

The minimum value selecting circuit 72 selects the minimum output (whose amount of detected correlation is maximum) among the above-mentioned three kinds of absolute value outputs, thereby controlling the signal selecting circuit 73.

That is to say, the signal selecting circuit 73 selects the output of the subtracter 66 in the case where the output of the absolute value circuit 69 is minimum, selects the outpost of the subtracter 67 in the case where the output of the absolute value circuit 70 is minimum, and selects the output of the subtracter 68 in the case where the output of the absolute value circuit 71 is minimum.

Moreover, the output of the signal selecting circuit 73 is subtracted from the color difference signal by the subtracter 74, and low frequency component of three-dimensional frequency space in the direction in which the correlation has been detected can be obtained.

Figure 17:
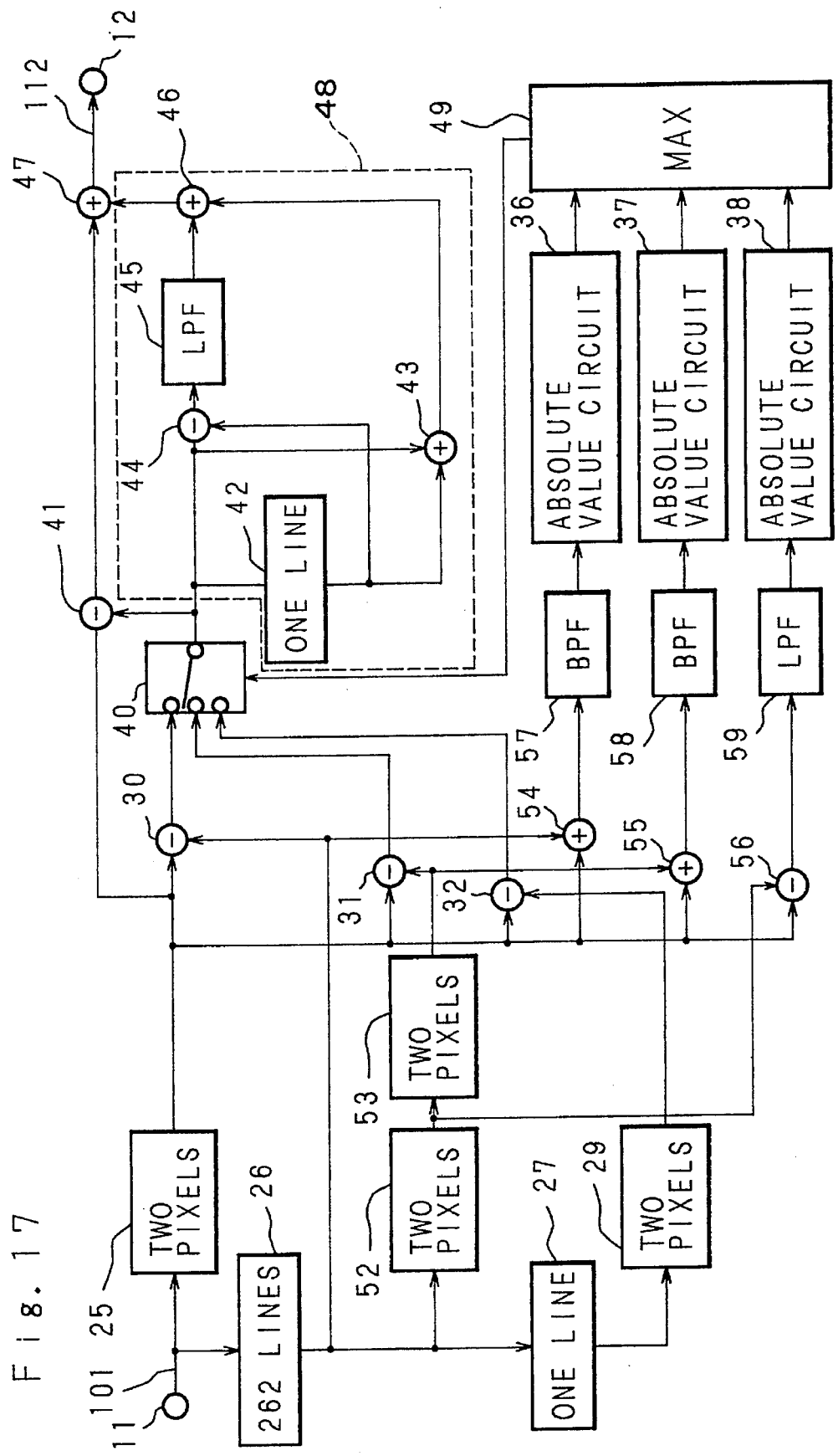
FIG. 17 is a block diagram of a second embodiment of a filter for extracting intraframe Y signal in the embodiment shown in FIG. 8.

FIG. 17 is a detailed block diagram of a second embodiment of a filter 16 for extracting intraframe Y signal shown in FIG. 8 of the invention.

The difference between the filters shown in FIG. 17 and FIG. 9 is only the method for detecting interfield correlation. This embodiment uses a method for detecting a direction in which spectrum of Y signal extends in three-dimensional frequency space, as the method for detecting correlation of V signal.

Figure 18A:
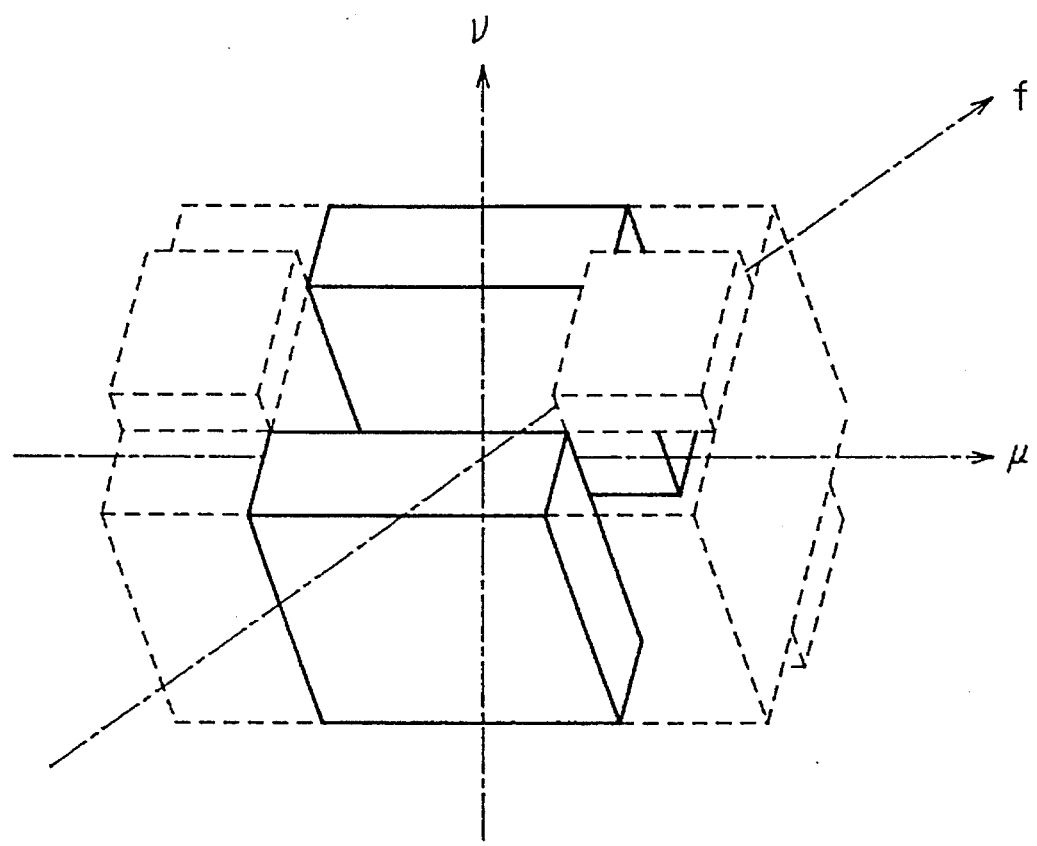
FIG. 18(a)–(c) are distribution diagram of frequency domain of correlation detected for selecting an extracted interframe Y signal A.
Figure 18B:
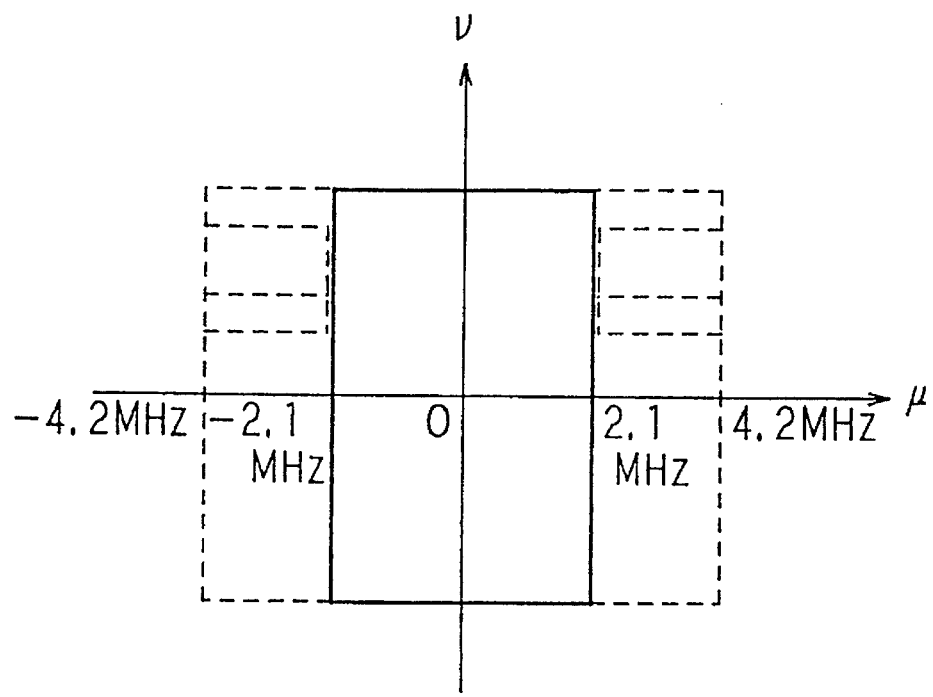
Figure 18C:
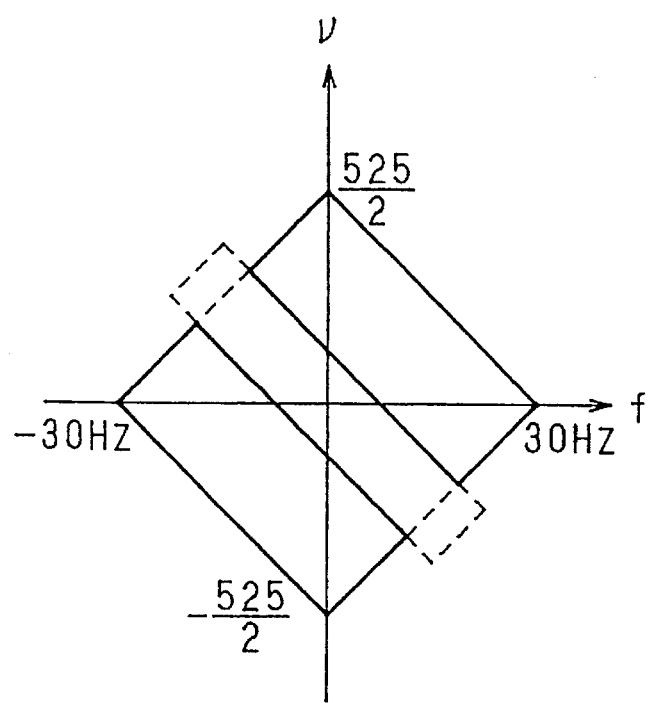
Figure 19A:
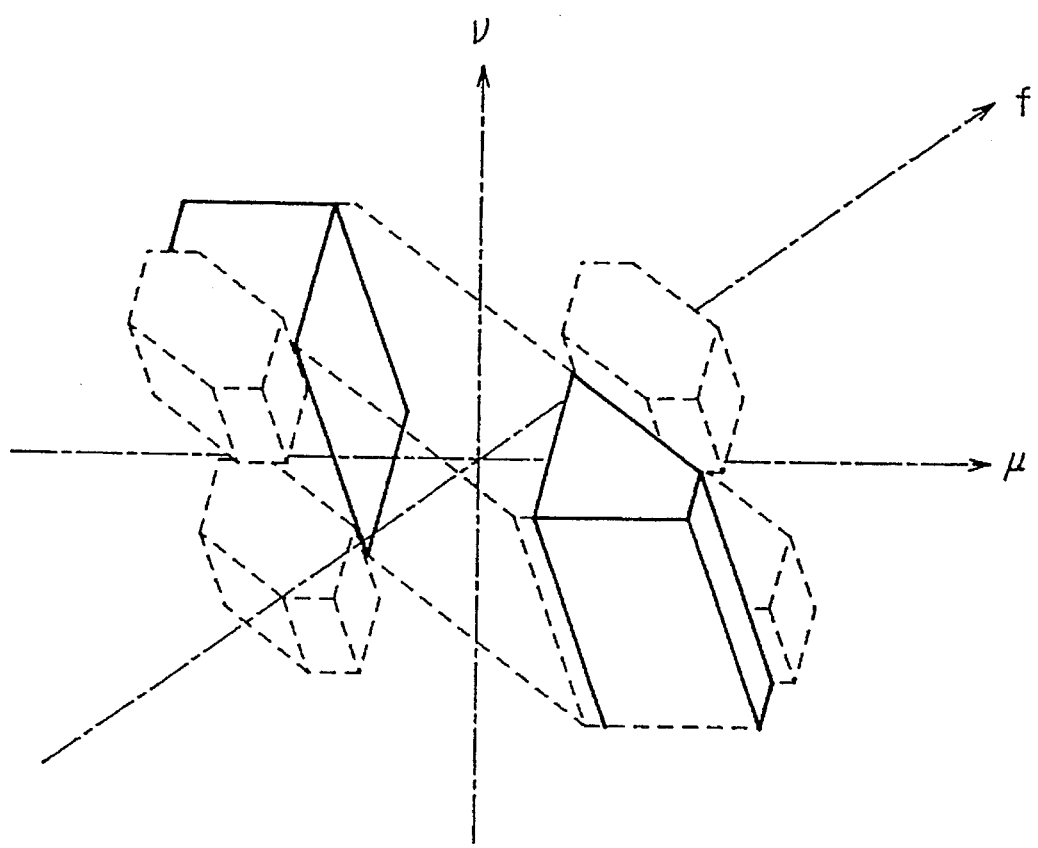
FIG. 19(a)–(c) are distribution diagram of frequency domain of correlation detected for selecting an extracted interfield Y signal B.
Figure 19B:
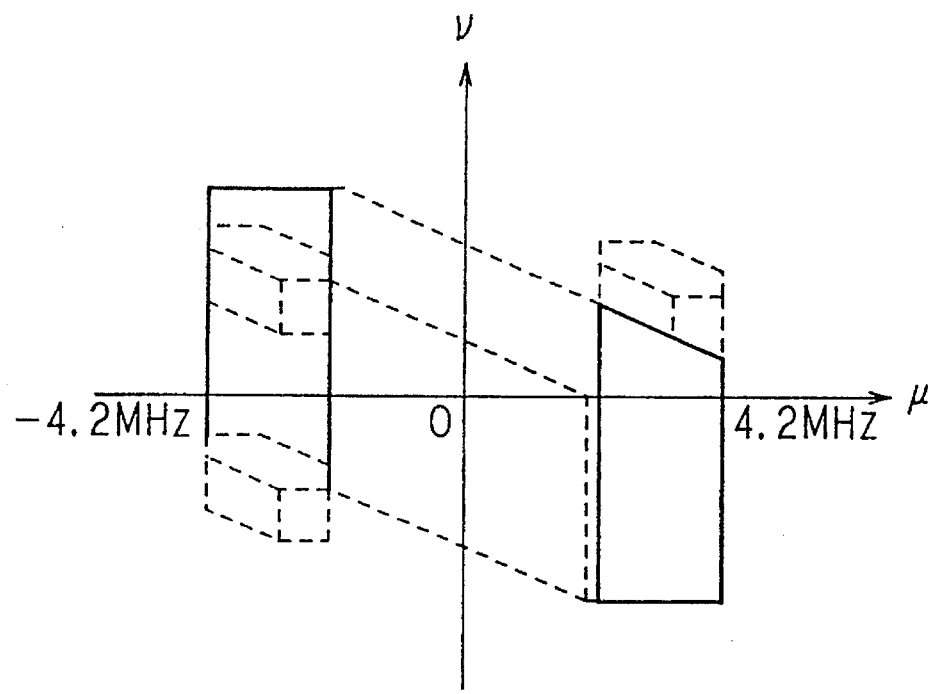
Figure 19C:
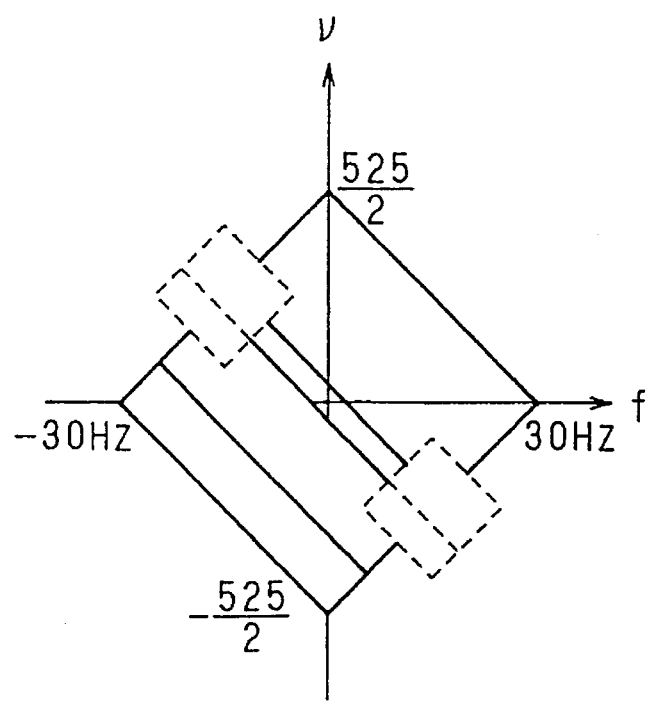
Figure 20A:
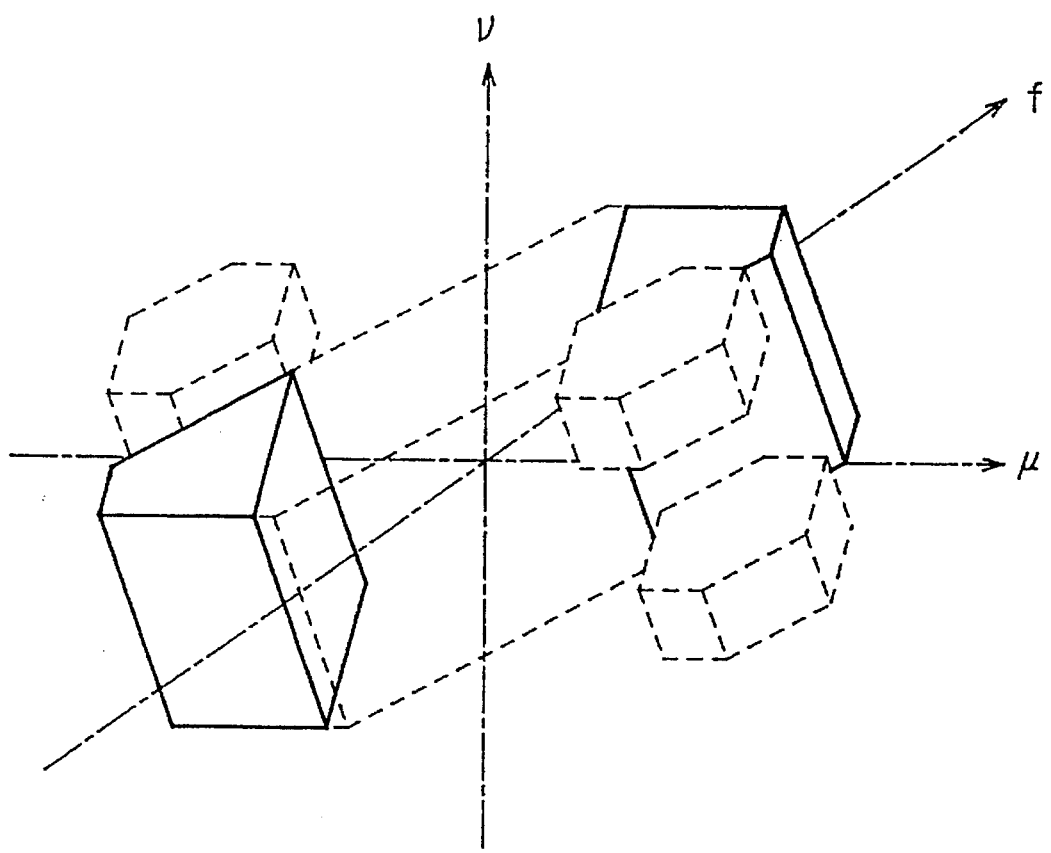
FIG. 20(a)–(c) are distribution view of frequency domain of correlation detected for selecting an extracted interfield Y signal C.
Figure 20B:
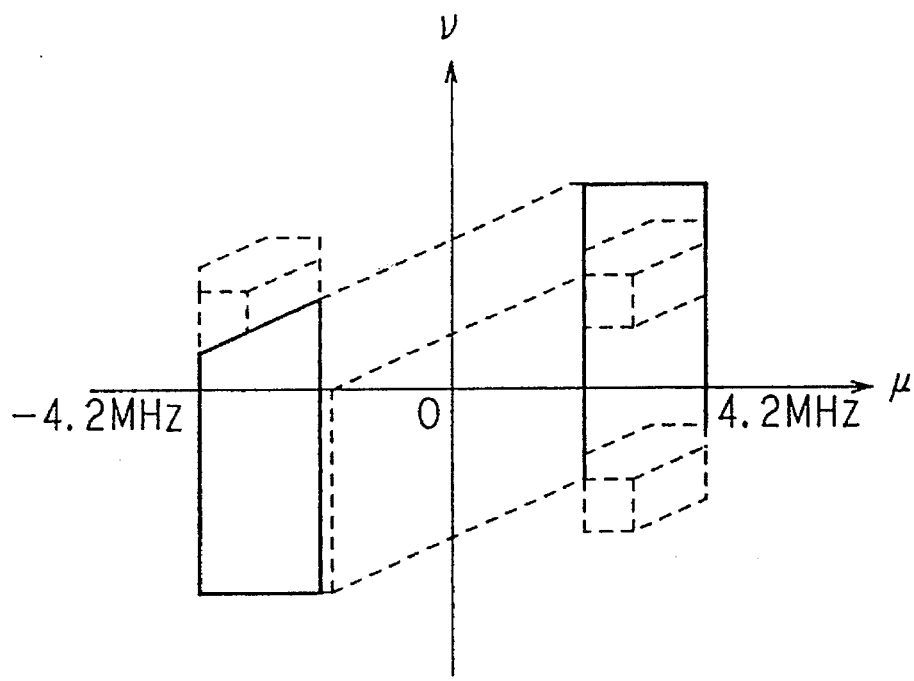
Figure 20C:
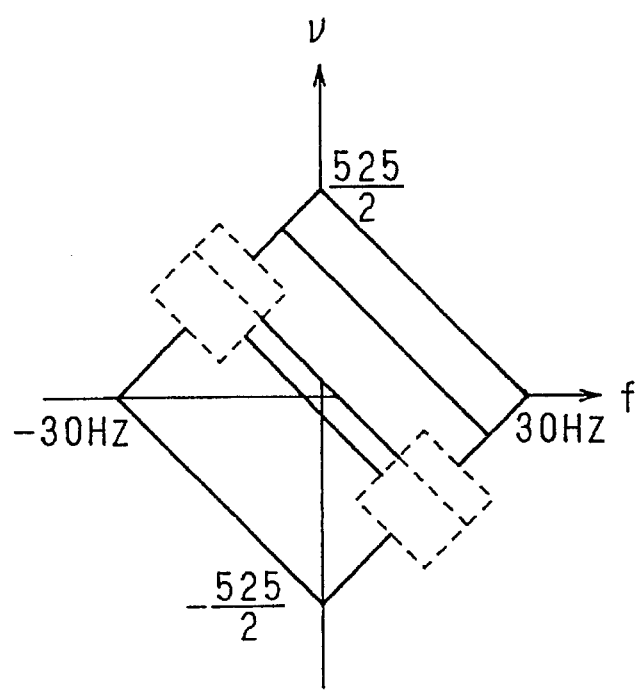

When illustrating the frequency band detecting the extension of the spectrum of Y signal for selecting and controlling three kinds of interfield extracting Y signal, they express themselves in solid line portions in FIG. 18, 19 and 20 respectively.

FIG. 18 shows a frequency band detecting the extension of Y signal spectrum for selecting extracted interfield Y signal A. This band can be detected by making the difference between the picked-up sampled point ⌊⊙⌉ and the sampled point ⌊○⌉ located one line lower than the sampled point ⌊●⌉ I shown in FIG. 11 pass through LPF.

FIG. 19 shows a frequency band detecting the extension of Y signal spectrum for selecting extracted interfield Y signal B. This band can be detected by making the sum between the picked-up sampled point ⌊⊙⌉ and the sampled point ⌊●⌉ II shown in FIG. 11 pass through BPF.

FIG. 20 shows a frequency band detecting the extension of Y signal spectrum for selecting extracted interfield Y signal C. This band can be detected by making the sum between the picked-up sampled point ⌊⊙⌉ and the sampled point ⌊●⌉ III shown in FIG. 11 pass through BPF.

Next, explanation will be given only on the interfield correlation detecting circuit different from the one shown in FIG. 9 among filters for extracting intraframe Y signal having the configuration of FIG. 17.

In FIG. 17, same numerals are used on the same portions as in FIG. 9.

The output of the 262-line delay circuit 26 and the output of the two-pixel delay circuit 25 are added by an adder 54, and the result of the above is made to pass through a BPF 57 which allows a band higher than 2.1 MHz to be passed, then made to be the absolute value thereof by the absolute value circuit 36, and inputted to a maximum value selecting circuit 49. The output of the absolute value circuit 36 detects the correlation between the picked-up sampled point ⌊⊙⌉ and the sampled point ⌊●⌉ III shown in FIG. 11.

The output of the 262-line delay circuit 26 is delayed by four pixels by a two-pixel delay circuit 52 and 53. The output of the two-pixel delay circuit 53 and the output of the two-pixel delay circuit 25 are added by an adder 55, and the result of the above is made to pass through a BPF 58 which allows a band higher than 2.1 MHz to be passed, then made to be the absolute value thereof by the absolute value circuit 37 and inputted to the maximum value selecting circuit 49. The absolute value circuit. 37 detects the correlation between the picked-up sampled point ⌊⊙⌉ and the sampled point ⌊●538 II in FIG. 11.

The output of the two-pixel delay circuit 52 and the output of the two-pixel delay circuit 25 are added by a subtracter 56, and the result of the above is made to pass through a LPF 59 which allows a band lower than 2.1 MHz to be passed, then is made to be the absolute value thereof by the absolute value circuit 38, and inputted to the maximum value selecting circuit 49. The absolute value circuit 38 detects the correlation between the picked-up sampled point ⌊⊙⌉ and the sampled point ⌊●⌉ I shown in FIG. 11.

The maximum value selecting circuit 49 selects the maximum output (whose amount of detected correlation is maximum) among the above-mentioned three kinds of absolute value outputs, thereby controlling the signal selecting circuit, 40.

Figure 21:
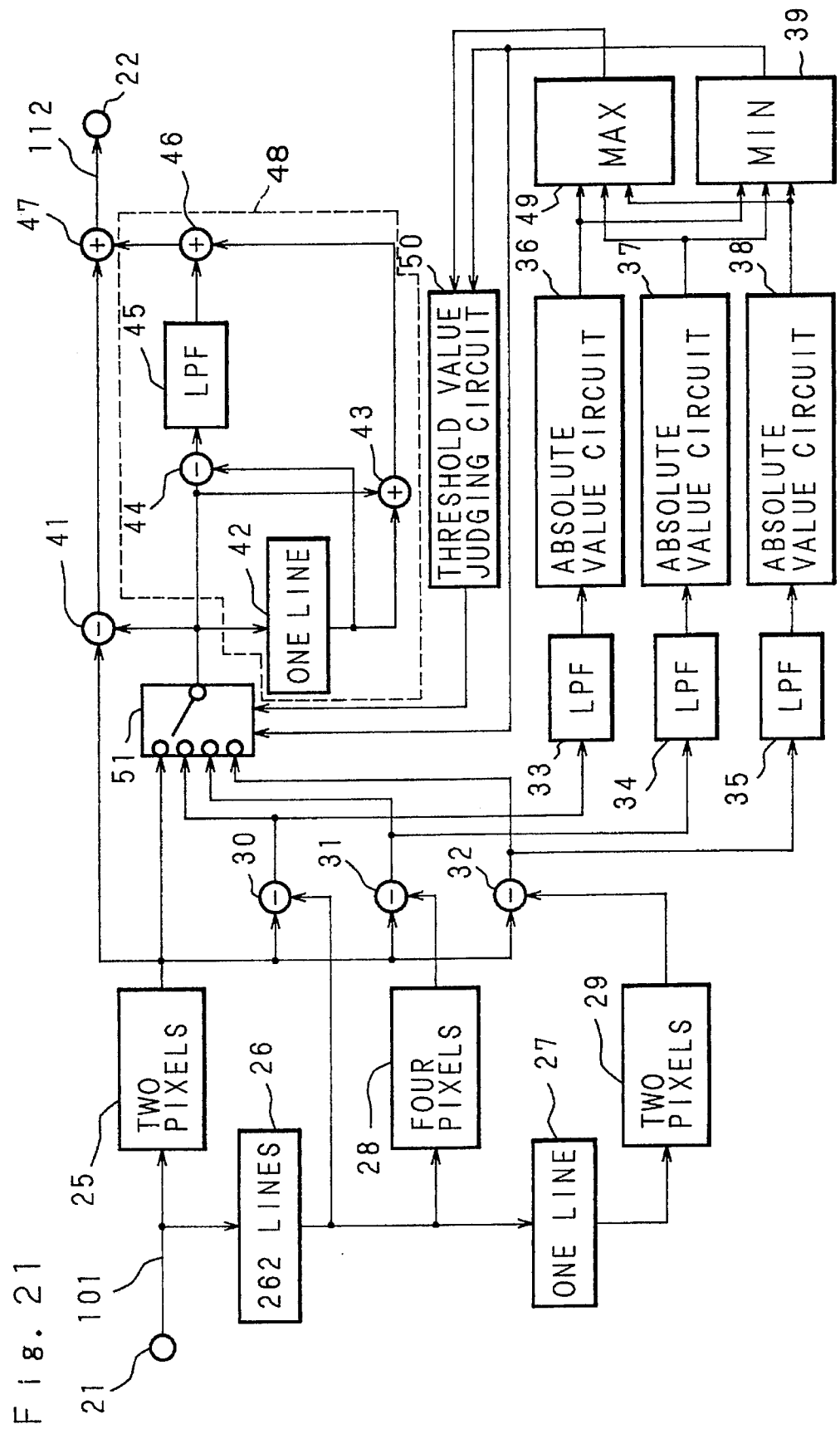
FIG. 21 is a block diagram of a third embodiment of a filter for extracting intraframe Y signal in the embodiment shown in FIG. 8.

FIG. 21 is a detailed block diagram of a third embodiment of the filter 16 for extracting intraframe Y signal shown in FIG. 8 of the invention.

The differece between the filter shown in FIG. 21 from that in FIG. 9 is that it uses the optimum three kinds of filters for extracting interfield C signal. Explanation will be given only on the interfield correlation detecting circuit different from that shown in FIG. 9 among the filters for extracting intraframe Y signal having the configuration of FIG. 21. In FIG. 21, same numerals are used on the same portions as in FIG. 9.

The output of the two-pixel delay circuit 25 is inputted to the first input terminals of the subtracters 30, 31, 32 and 41, respectively, as well as to a first terminal of the signal selecting corciut 51. The output of the two pixel delay circuit 25 is also inputted to a first input terminal of the signal selecting circuit 51. The output of the subtracter 30 is inputted to a second input terminal of the signal selecting circuit. 51 and to the LPF 33. The output of the subtracter 31 is inputted to a third input terminal of the signal selecting circuit 51 and to the LPF 34. The output of the subtracter 32 is inputted to a fourth input terminal of the signal selecting circuit 51 and to the LPF 35. The outputs of the LPFs 33, 34, and 35 are inputted to the absolute value circuits 36, 37 and 38 respectively in the same way as in the case of FIG. 9. The output of the absolute value circuit 36 is inputted to first input terminals of the maximum value selecting circuit 49 and the minimum value selecting circuit 89, respectively. The absolute value circuit 36 detects the correlation between the picked-up sampled point ⌊⊙⌉ and the sampled point ⌊●⌉ III in FIG. 11. The output of the absolute value circuit 87 is inputted to second input terminals of the maximum value selecting circuit 49 and the minimum value selecting circuit 39. The absolute valise circuit 37 selects the correlation between the picked-up sampled point ⌊⊙⌉ and the sampled point ⌊●⌉ II in FIG. 11. The output of the absolute value circuit 38 is inputted to third input terminals of the maximum value selecting circuit 49 and the minimum value selecting circuit 39, respectively. The absolute value circuit 38 detects the correlation between the picked-up sampled point ⌊⊙⌉ and the sampled point ⌊●⌉ I in FIG. 11. The output of the maximum value selecting circuit 49 is inputted to a first input terminal of a threshold judging circuit 50. The output of the minimum selecting circuit 39 is inputted to a second input terminal of the threshold judging circuit 50 and to a fifth input terminal of the signal selecting circuit 51. The output of the threshold judging circuit 50 is inputted to a sixth input terminal of the signal selecting circuit 51. The threshold judging circuit 50 controls the signal selecting circuit 51 to select the output of the two-pixel delay circuit 25 in either the case where the maximum value of three kinds of interfield correlations is smaller than a first threshold $\alpha$ or the case where the minimum value of three kinds of interfield correlations is larger than a second threshold $\beta$ thereby extracting the C signal. On the other hand, in either the case where the threshold judging circuit 50 judges that the maximum value of three kinds of interfield correlations is larger than the first threshold $\alpha$ or the minimum value of three kinds of interfield correlations is smaller than the second threshold $\beta$, according to the output of the minimum value selecting circuit 39, the signal selecting circuit 51 is controlled to select the output of the subtracter 30 in the case where the output of the absolute value circuit 36 is minimum, select the output of the subtracter 31 in the case where the output of the absolute value circuit 37 is minimum, and select the output of the subtracter 32 in the case where the output of the absolute value circuit 38 is minimum. Here there is a relation $\alpha<\beta$.

Figure 22:
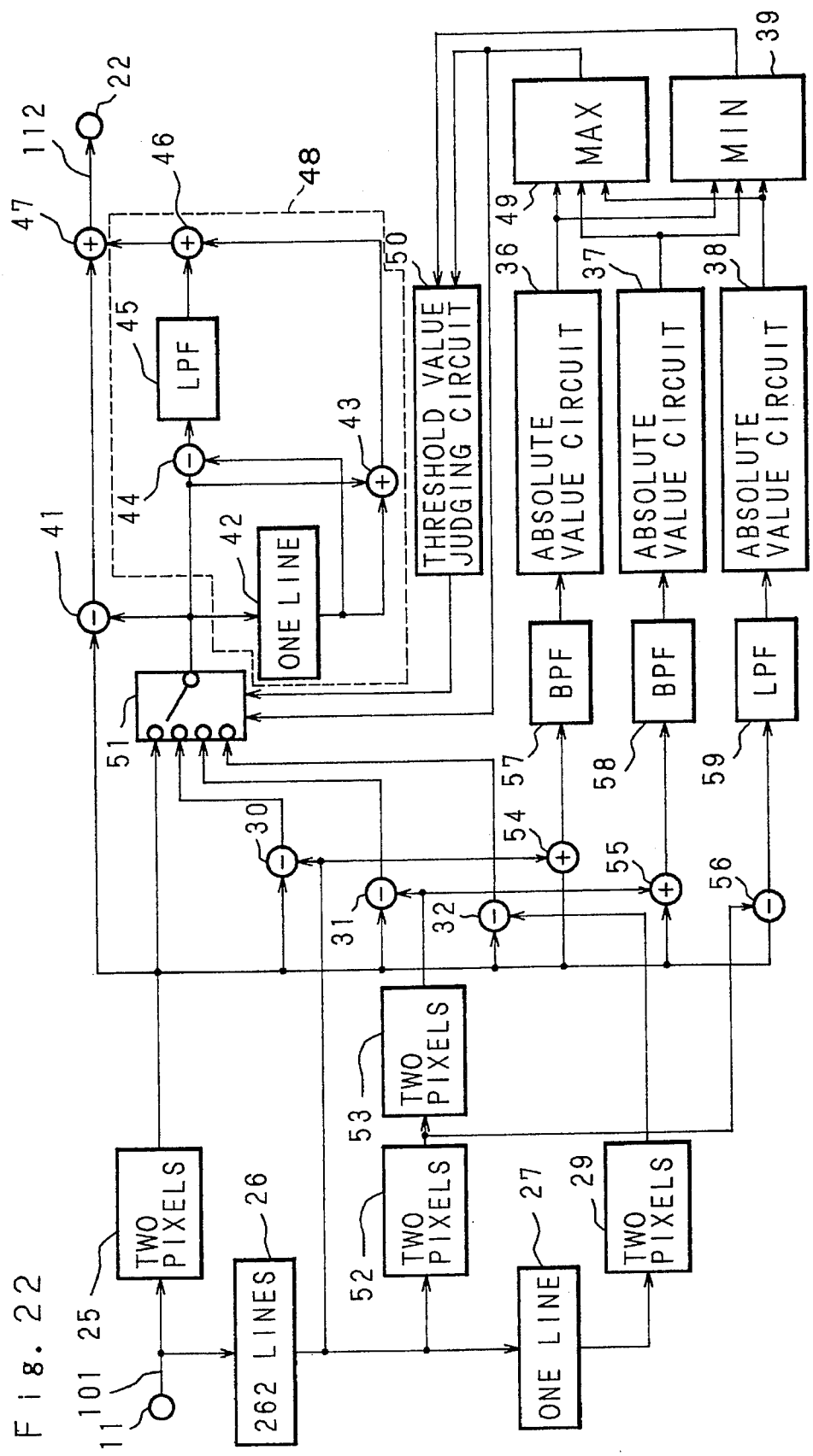
FIG. 22 is a block diagram of a fourth embodiment of a filter for extracting intraframe Y signal in the embodiment shown in FIG. 8.

FIG. 22 is a detailed block diagram of a fourth embodiment of the filter for extracting intraframe Y signal shown in FIG. 8 of the invention.

The only difference between the filter shown in FIG. 22 from that shown in FIG. 21 is the method for detecting interfield correlation. Here, in the same way as in the case of the embodiment of FIG. 17, a method for detecting a direction in which Y signal spectrum extends in three-dimensional frequency space is used as a method for detecting correlation of V signal.

Only difference of the filter for extracting intraframe Y signal having the configuration of FIG. 22 from those shown in FIG. 9, FIG. 17 and FIG. 21 will be explained. In FIG. 22, same numerals are used to the same portions as in FIG. 9, FIG. 17 and FIG. 21.

The output of the minimum value selecting circuit 39 is inputted to the first input terminal of the threshold judging circuit 50. The output of the maximum value selecting circuit 49 is inputted to the second input terminal of the threshold judging circuit 50 and to the fifth input terminal of the signal selecting circuit 51. The output of the threshold judging circuit 50 is inputted to the sixth input terminal of the signal selecting circuit 51. The threshold judging circuit 50 controls the signal selecting circuit 51 to select the output of the two pixel delay circuit 25 only, thereby extracting an intrafield C signal in either the case where the maximum value of three kinds of interfield correlations is smaller than the first threshold α or the minimum value of three kinds of interfield correlations is larger than the second threshold β. On the other hand, in the case where the threshold judging circuit 50 judges that the maximum value of three kinds of interfield correlations is larger than the first threshold α or the minimum value of three kinds of correlations is smaller than the second threshold β, according to the output of the maximum value selecting circuit 49, the signal selecting circuit 51 selects the output of the subtracter 30 in the case where the output of the absolute value circuit 36 is maximum, the output of the subtracter 31 in the case where the output of the absolute value circuit 37 is maximum, and selects the output of the subtracter 32 in the case when the output of the absolute value circuit is maximum. Here, there is a relationship $\alpha<\beta$.

Figure 23:
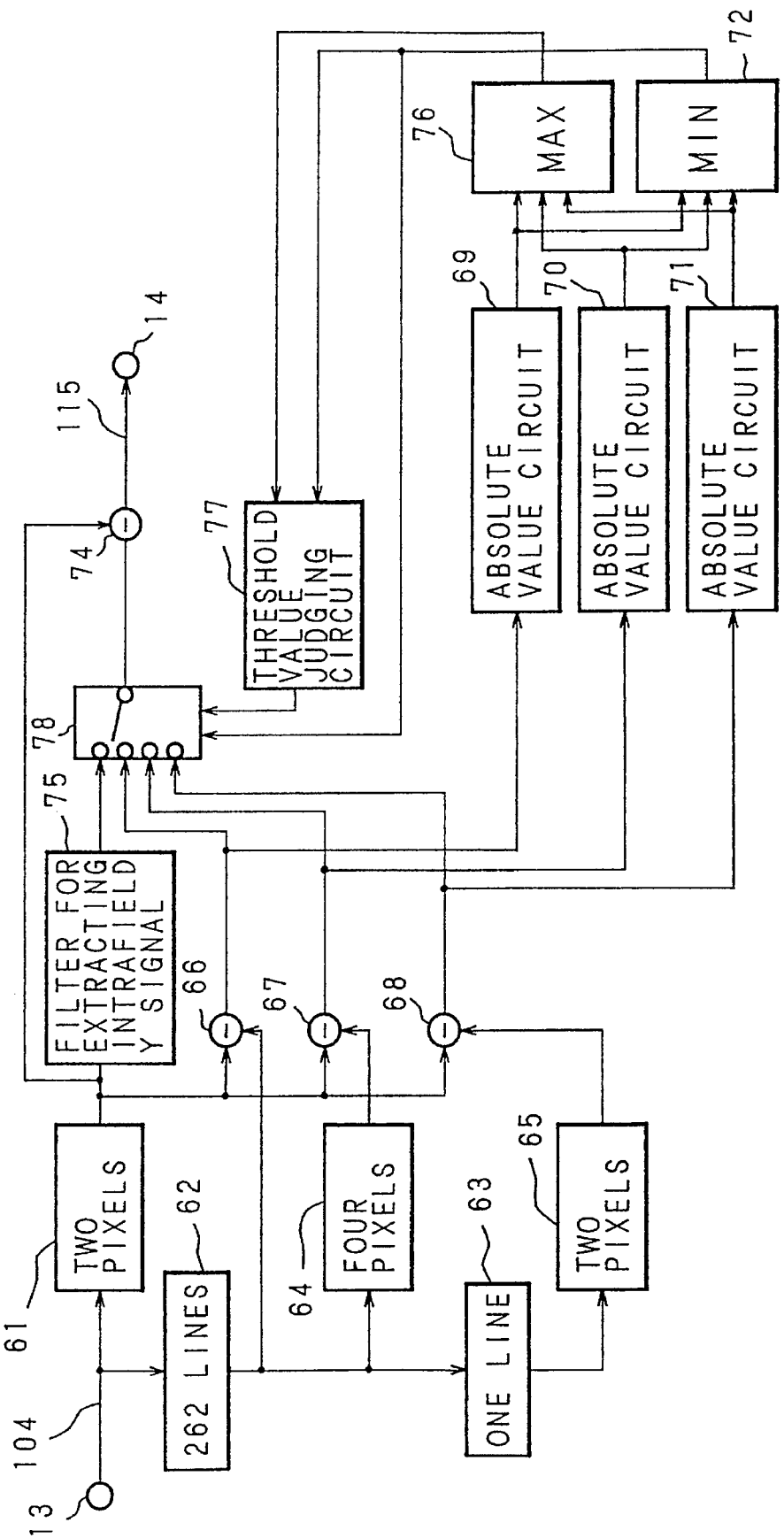
FIG. 23 is a block diagram of a second embodiment of a filter for extracting intraframe C signal in the embodiment shown in FIG. 8.

FIG. 23 is a detailed block diagram of a second embodiment of a filter 17 for extracting intraframe C signal shown in FIG. 8 of the invention.

The difference of the filter shown in FIG. 23 from that shown in FIG. 16 is that the optimum filter among four kinds of filters including a filter for extracting intrafield Y signal as well as three kinds of filters for extracting interfield Y signal.

Explanation will be given only on an interfield correlation detecting circuit being different from that shown in FIG. 16 among filters for extracting intraframe C signal having the configuration of FIG. 23. In FIG. 23, same numerals are used on the same portions shown in FIG. 16.

The output of the two-pixel delay circuit 61 is inputted to first input, terminals of the subtracters 66, 67, 68 arid 74 as well as to a filter 75 for extracting intrafield Y signal. The output of the filter 75 for extracting intrafield Y signal is inputted to a first input terminal of a signal selecting circuit 78. The output of the subtracter 66 is inputted to a second input terminal of the signal selecting circuit 78 and the absolute value circuit 69. The output of the subtracter 67 is inputted to a third input terminal of the signal selecting circuit 78 and the absolute value circuit 70. The output of the subtracter 68 is inputted to a fourth input terminal of the signal selecting circuit 78 and the absolute value circuit 71. The output of the absolute value circuit 69 is inputted to a maximum value selecting circuit 76 and a first input terminal of the minimum value selecting circuit 72 respectively. The absolute value circuit 69 detects the correlation between the picked-up sampled point ⌊◉⌉ and the sampled point ⌊●⌉ III. The output of the absolute value circuit 70 is inputted to the maximum value selecting circuit 76 and the second input terminal of the minimum value selecting circuit 72, respectively. The absolute value circuit 70 detects the correlation between the picked-up sampled point ⌊◉⌉ and the sampled point ⌊●⌉ II in FIG. 11. The output of the absolute value circuit 71 is inputted to the maximum value selecting circuit 76 and a third input terminal of the minimum value selecting circuit 72 respectively. The absolute value circuit 71 detects the correlation between the picked-up sampled point ⌊◉⌉ and the sampled point ⌊●⌉ I in FIG. 11. The output of the maximum value selecting circuit 76 is inputted to a first input terminal of a threshold judging circuit 77. The output of the minimum value selecting circuit 72 is inputted to a second input terminal of the threshold judging circuit 77 and a fifth input terminal of the signal selecting circuit 78. The output of the threshold judging circuit 77 is inputted to a sixth input terminal of the signal selecting circuit 78. The threshold judging circuit 77 controls the signal selecting circuit 78 to select the output of the filter 75 for extracting intrafield Y signal in either the case where the maximum value of three kinds of interfield correlations is smaller than the first threshold value α or the minimum value of three kinds of interfield correlations is larger than the second threshold value β. On the other hand, in either the case where the maximum value of three kinds of interfield correlation is judged to be larger than the first threshold α or the minimum value of three kinds of interfield correlation is judged to be smaller than the second threshold β by the threshold judging circuit 77, according to the output of the minimum value selecting circuit 72, the signal selecting circuit 78 is controlled to select the output of the subtracter 66 in the case where the output of the absolute value circuit 69 is minimum, select the output of the subtracter 67 in the case where the absolute value circuit 70 is minimum, and select the output of the subtracter 68 in the case where the output of the absolute value circuit 71 is minimum, respectively. Here, there is a relationship $\alpha<\beta$.

The output of the signal selecting circuit 78 is subtracted by the subtracter 74 from the color difference signal being the output of the two-pixel delay circuit 61, and is outputted from the output terminal 24 as an extracted intraframe C signal 115.

In addition, in FIG. 8, a circuit for motion-adaptive processing of color difference signal consisting of a filter 17 for extracting intraframe C signal, filter 10 for extracting interframe C signal, and color signal mixing circuit 15 makes a time-division color difference signal 104 as its input, however, it is also possible to construct so that the color difference signal process motion adaptively, separately from each other by additionally juxtaposing the same configuration as the filter 17 for extracting intraframe C signal, filter 10 for extracting interframe C signal and color signal mixing circuit 15.

Explanation will be given further on another embodiment. As mentioned before, in FIG. 11, the points locating in the vicinity of the picked-up sampled point ⌊◉⌉ in n−1-th field and being different 180° in color sub carrier phase are the sampled points ⌊●⌉ I, II, and III. Calculation between the picked-up sampled point between any of these three points enables interfield Y/C separation.

Figure 24:
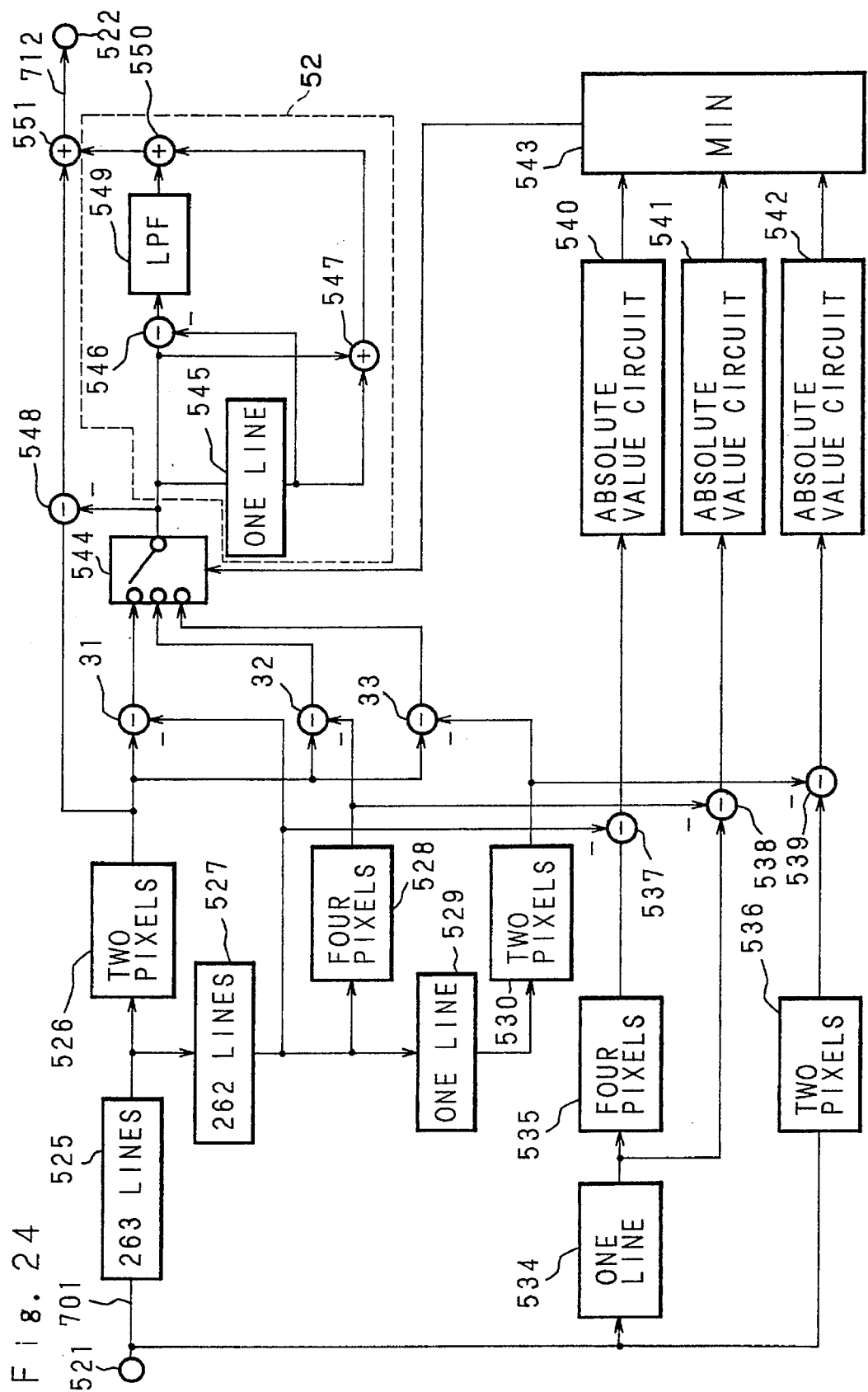
FIG. 24 is a block diagram of a fifth embodiment of filter for extracting intraframe Y signal in the embodiment shown in FIG. 8.

FIG. 24 is a block diagram of a fifth embodiment of a filter for extracting intraframe Y signal.

At first, high frequency component in three-dimensional frequency space including C signal can be taken out according to the difference between the picked-up sampled point ⌊⊙⌉ and sampled point ⌊●⌉ I shown in FIG. 11. When the component is made to pass through a two-dimensional comb filter 52 consisting of a one-line delay circuit 545, adders 547 and 550, subtracter 546 and LPF 549 shown in FIG. 24, C signal can be removed. When this result and low frequency component in three-dimensional frequency space not including C signal being the output of a subtracter 548 are added, Y signal can be obtained. This is called extracted interfield Y signal A.

Figure 25A:
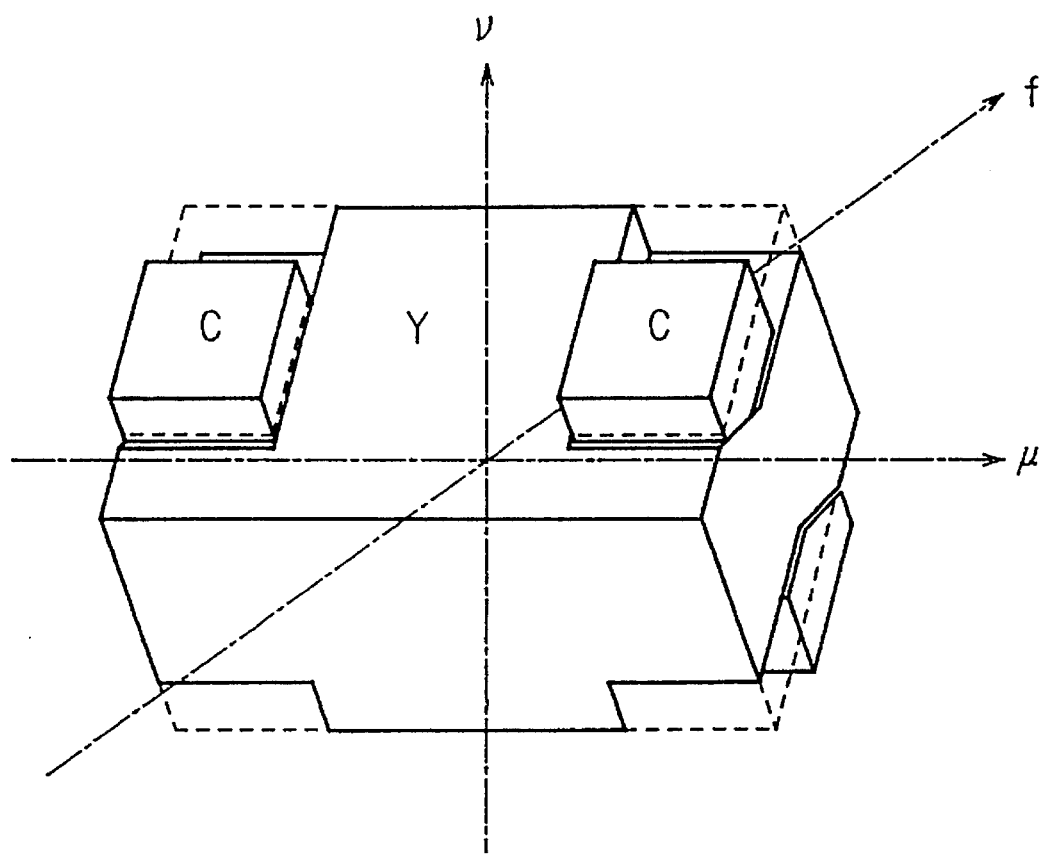
FIG. 25(a)–(c) are spectrum atlas of Y signal in three-dimensional frequency space, obtained by the first filter for extracting interfield Y signal relating to the fifth embodiment of the filter for extracting intraframe Y signal.
Figure 25B:
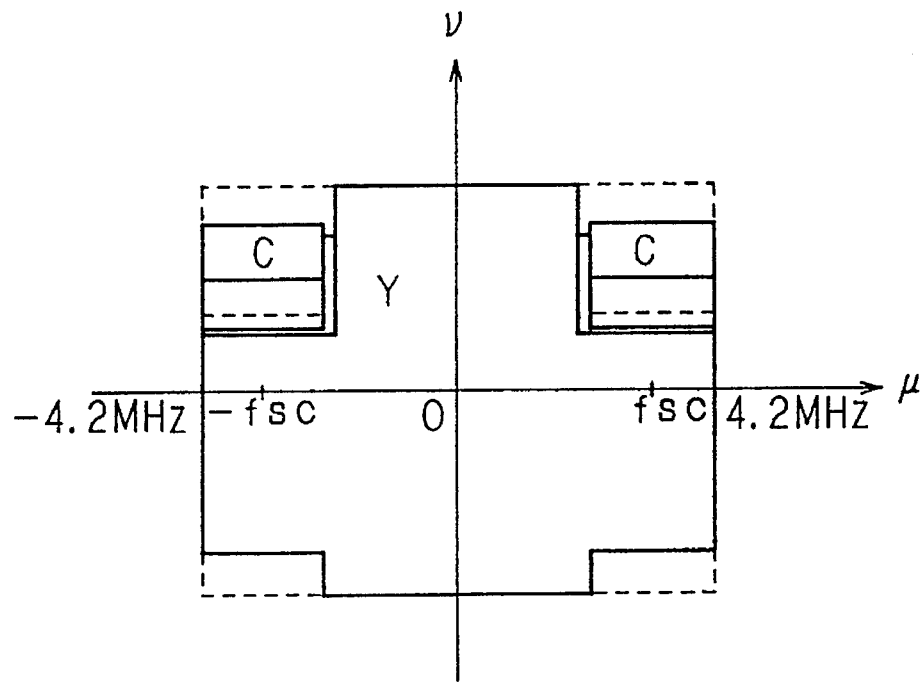
Figure 25C:
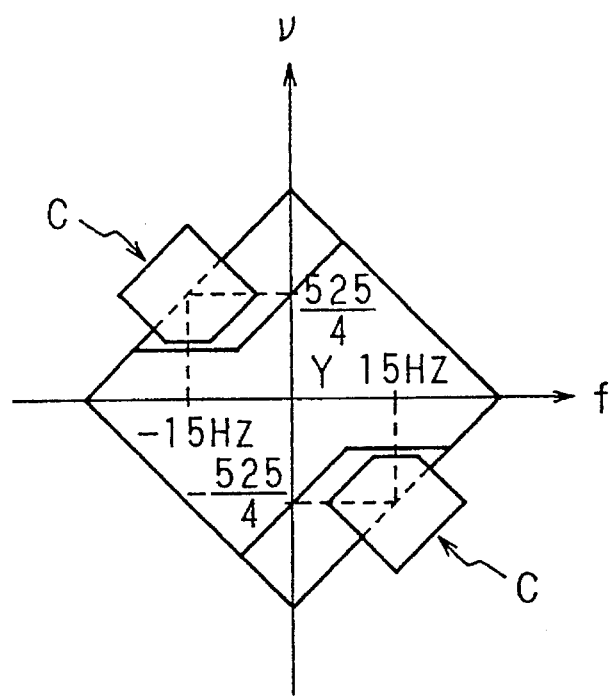

FIG. 25 shows a three-dimensional frequency space similarly to FIG. 12, and shows frequency space in which Y signal exists obtained by extracted interfield Y signal A.

Secondary, high frequency component in three-dimensional frequency space including C signal can be taken out according to the difference between the picked-up sampled point ⌊⊙⌉ and the sampled point ⌊●⌉ II shown in FIG. 11. When the component is made to pass through the above-mentioned two-dimensional comb filter, C signal can be removed. When same processing as the above is applied, Y signal can be obtained. This is called extracted interfield Y signal B.

Figure 26A:
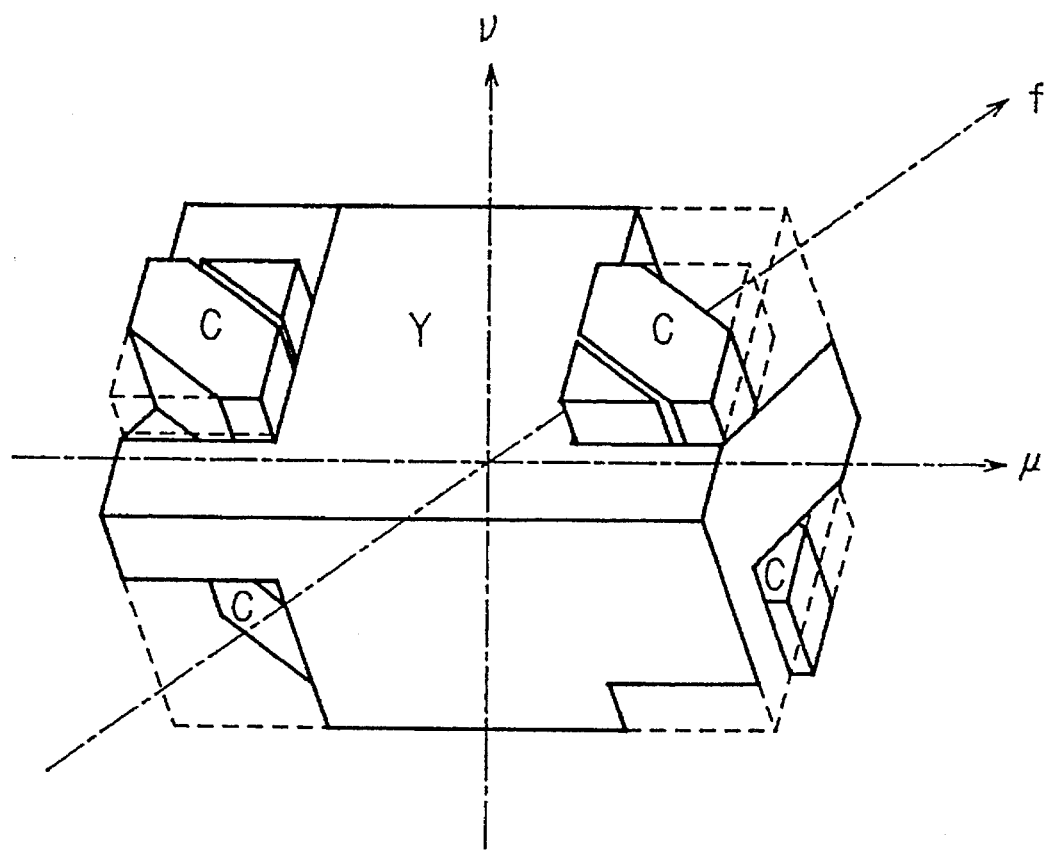
FIG. 26(a)–(c) are spectrum atlas of Y signal in three dimensional frequency space, obtained by the second filter for extracting interfield Y signal relating to the fifth embodiment of the filter for extracting intraframe Y signal.
Figure 26B:
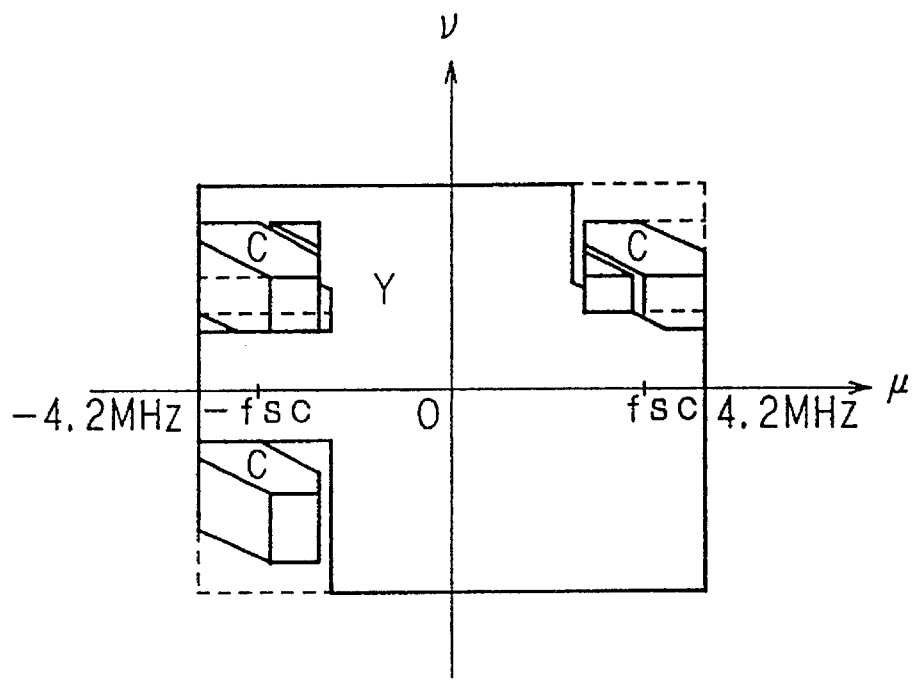
Figure 26C:
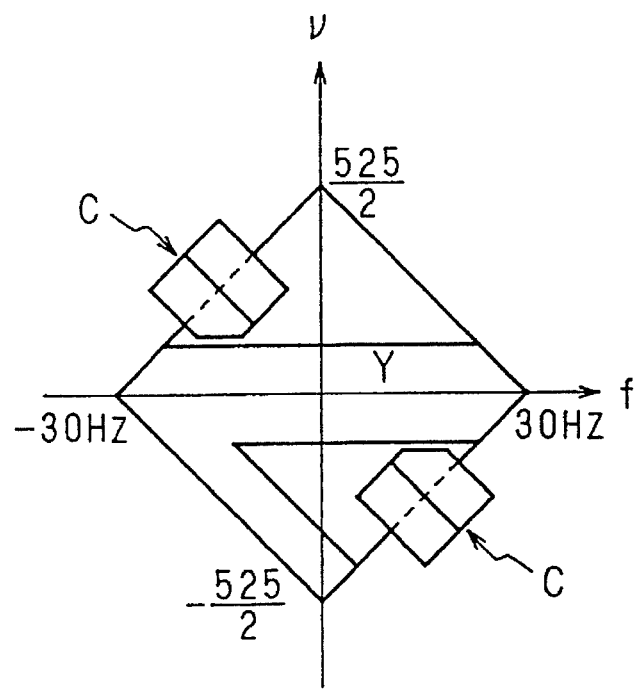

FIG. 26 shows a frequency space in which Y signal exist obtained also by extracted interfield Y signal B. When FIG. 26 is viewed, it seems that the separated Y signal includes a part of C signal, however, it is rare that Y signal includes C signal because the correlation between Y signal and C signal is strong.

Thirdly, high frequency component in three-dimensional frequency space including C signal can be taken out according to the difference between the picked-up sampled point ⌊⊙⌉ and the sampled point ⌊●⌉ III. When the component is made to pass through the above-mentioned two-dimensional comb filter, C signal can be removed. When the same processing is applied as the above, Y signal is obtained. This is called extracted interfield Y signal. C.

Figure 27A:
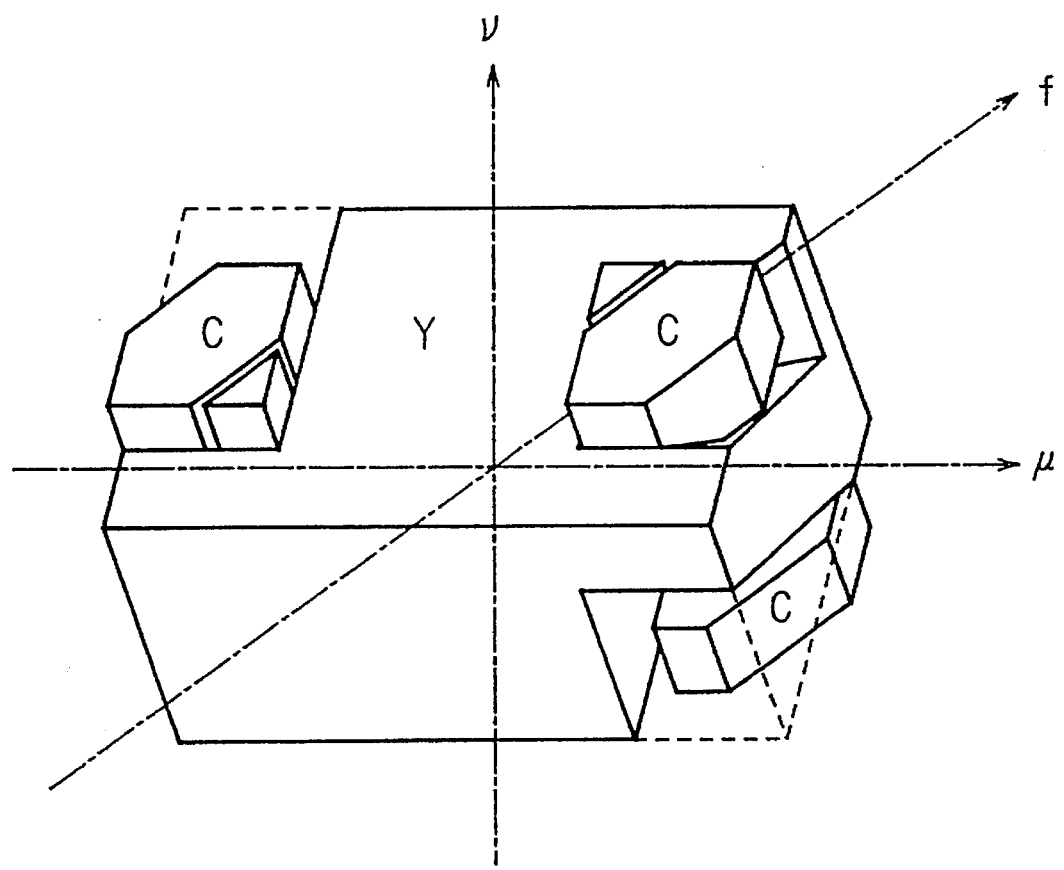
FIG. 27(a)–(c) are spectrum atlas of Y signal in three-dimensional frequency space obtained by the third filter for extracting interfield Y signal relating to the fifth embodiment of the filter for extracting intraframe Y signal.
Figure 27B:
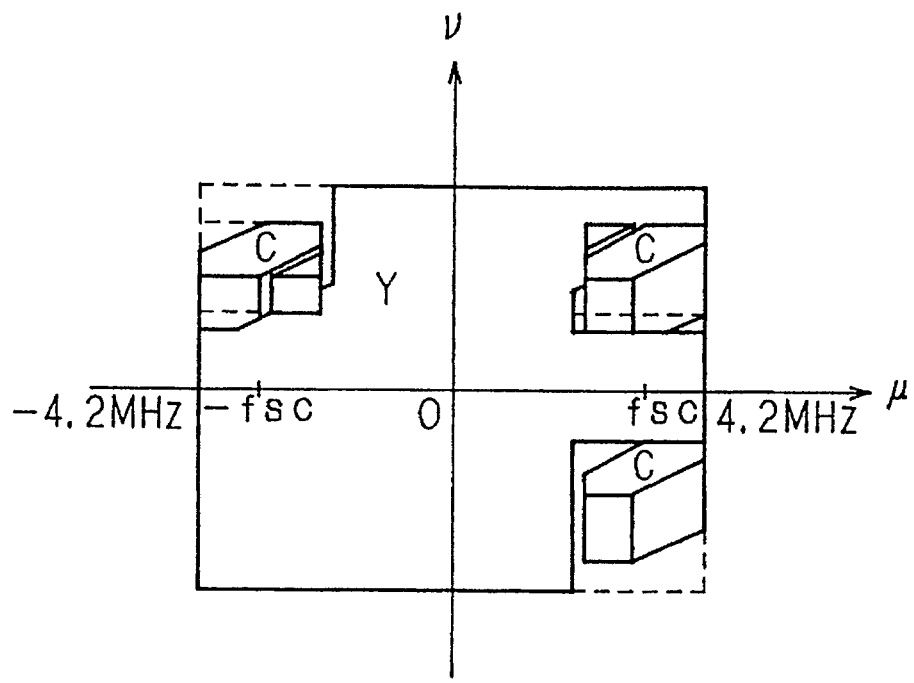
Figure 27C:
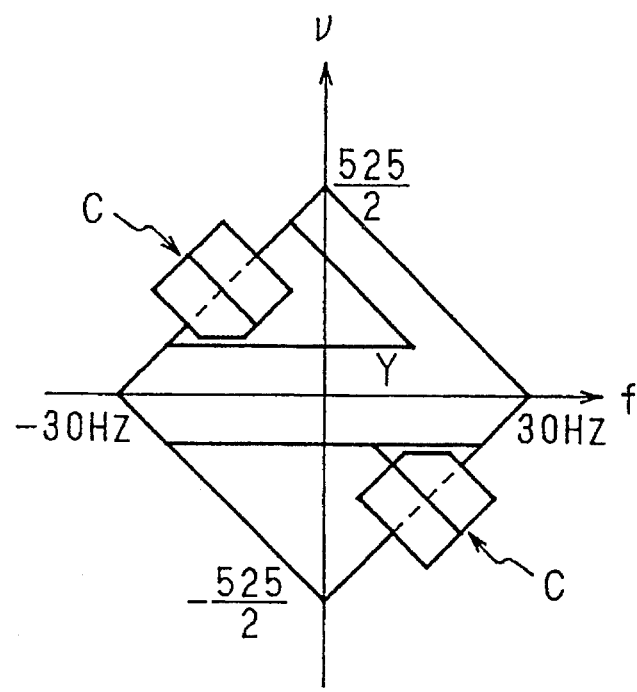

FIG. 27 shows a frequency space in which Y signal exist obtained also by extracted interfield Y signal C. When FIG. 27 is viewed, it seems that the separated Y signal includes a part of C signal, however, it is rare that Y signal includes C signal according to the same reason as above-mentioned.

In order to control selecting adaptively these three kinds of extractings of interfield Y signal, correlations between the picked-up sampled point ⌊⊙⌉ and the sampled points ⌊●⌉ I, II and III is needed to be detected. As it is V signal that is inputted to an input terminal 521, a difference of sampled points whose phase of color sub carrier in n−1-th field and n+1-th field is same is used.

Next, explanation will be given of the operations of a filter for extracting intraframe Y signal having the configuration of FIG. 24. The present invention is characterized by using the optimum filter among filters for extracting intraframe Y signal including three kinds of interfield calculations in place of the filter for extracting intrafield Y signal as the motion image processing, when the motion detecting unit 80 judges an image to be the motion one.

In FIG. 24, V signal 701 inputted from an input terminal 521 is delayed by 263 lines by a 263-line delay circuit 525, then is delayed by two pixels by a two-pixel delay circuit 526, and is delayed by 262 lines by a 262-line delay circuit 527.

By subtracting V signal which has been delayed by 262 pixels by the two-pixel delay circuit 526 from the output of the 262-line delay circuit 527 by a subtracter 531, an interfield difference for extracted interfield Y signal C can be obtained.

By subtracting V signal which has been delayed by two pixels by the two-pixel delay circuit 526 from an output of a four-pixel delay circuit 528 by a subtracter 532, an interfield difference for extracted interfield Y signal B can be obtained.

By subtracting V signal which has been delayed by two pixels by the two-pixel delay circuit 526 by a subtracter 533 from an output of a two-pixel delay circuit 530, an interfield difference for extracted interfield Y signal A can be obtained.

The above-mentioned three kinds of interfield differences are inputted to a signal selecting circuit 544 and are selected by an output of a minimum value selecting circuit 543.

Figure 28:
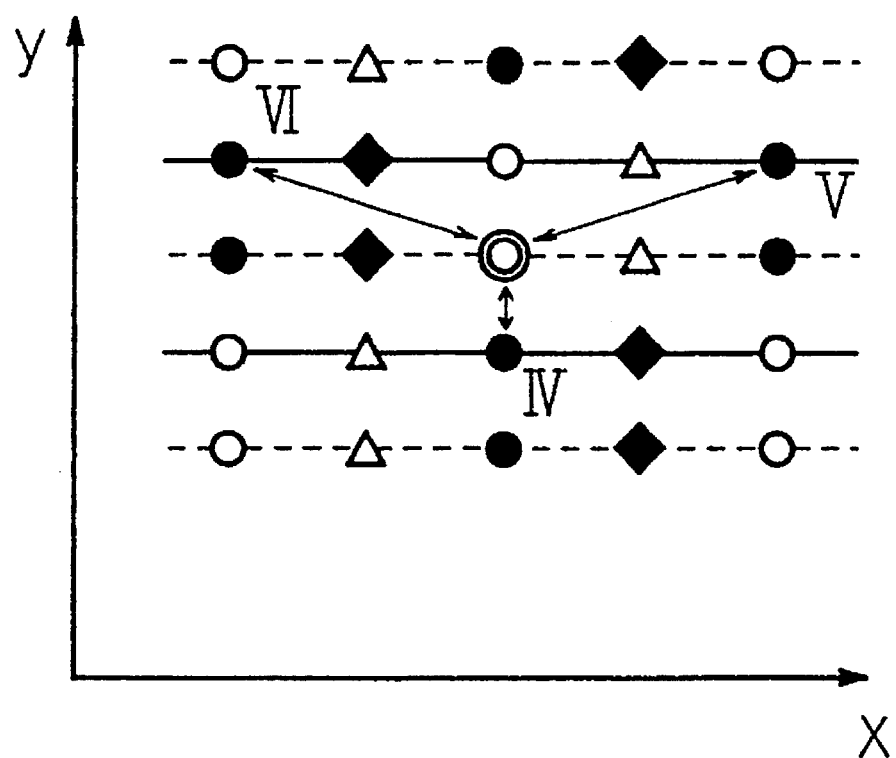
FIG. 28 is a x-y view of showing array of V signal.

In this embodiment, n−1-th field, n-th field and n+1-th field are related to correlation detection. FIG. 28 shows sampled points IV, V and VI located in n+1-th field whose phases of color sub carrier differ 180° from that of the picked-up sampled point located in n-th field.

At first, in order to select, extracted interfield Y signal A, it is necessary to obtain the absolute value of the difference between a sampled point; I in n−1-th field shown in FIG. 11 and a sampled point IV in n+1-th field shown in FIG. 28.

Next, in order to select extracted interfield Y signal B, it is necessary to obtain the absolute value of the difference between a sampled point II in n−1-th field and a sampled point V in n+1-th field.

Moreover, in order to select extracted interfield Y signal C, it is necessary to obtain the absolute value of the difference between a sampled point III in n−1-th field shown in FIG. 11 and a sampled point VI in n+1-th field shown in FIG. 28.

Three kinds of filters for extracting interfield Y signal is selected and controlled by comparing amount of detected interframe correlations obtained from the above result.

In FIG. 24, V signal 701 inputted from the input terminal 521 is inputted to the 263-line delay circuit 525 as well as to input terminals of a one-line delay circuit 534 and a two-pixel delay circuit 536. The output of the 263-line delay circuit is used to construct three kinds of filters for extracting interfield Y signal.

The output of the 262-line delay circuit 527 is subtracted by a subtracter 537 from an output of a four-pixel delay circuit 535, made to be the absolute value thereof by an absolute value circuit 540, inputted to the minimum value selecting circuit 543, and detects the correlation between the sampled points III and VI shown in FIG. 11 and FIG. 28.

The output of the four-pixel delay circuit 528 is subtracted by a subtracter 538 from the output of the one-line delay circuit 534, made to be the absolute value thereof by the absolute value circuit 541, inputted to the minimum value selecting circuit 543, and detects the correlation between the sampled points II and V shown in FIG. 11 and FIG. 28.

The output of the two-pixel delay circuit 530 is subtracted by a subtracter 539 from the output of the two-pixel delay circuit 536, made to be absolute value thereof by an absolute value circuit 542, inputted to the minimum value selecting circuit 543, and detects the correlation between the sampled points I and IV shown in FIG. 11 and FIG. 28.

The minimum value selecting circuit 543 selects the minimum absolute output among the above-mentioned three kinds of the absolute outputs, that is, the one is selected whose correlation between the sampled points among correlations between the sampled points in three different directions is maximum, each direction being made by connecting the picked-up sampled point with each sampled point separated by one frame from the picked-up sampled point which is the center, and controls the signal selecting circuit 544.

That is to say, the signal selecting circuit 544 selects the output of the subtracter 531 in the case where the output of the absolute value circuit 540 is minimum, selects the output of the subtracter 532 in the case where the output of the absolute value circuit 541 is minimum, and selects the output of the subtracter 533 in the case where the output of the absolute value circuit 542, respectively.

Moreover, the output of the signal selecting circuit 544 is subtracted by the subtracter 548 from V signal to obtain low frequency component in three-dimensional frequency space in the direction in which correlation has been detected. On the other hand, as the output of the signal selecting circuit 544 is the high frequency component of three-dimensional frequency in the direction in which correlation has been detected, by making it pass through the two-dimensional comb filter 52 consisting of the one-line delay circuit 545, adders 547 and 550, subtracter 546 and LPF 549, C signal can be removed. By adding the outputs of the subtracter 548 and the adder 550 by an adder 551, Y signal 712 by intraframe extracting Y signal can be obtained.

In addition, in FIG. 24, in order to remove C signal, calculation including the one-line delay circuit 545 is applied, however, separation accuracy is much more improved in the case where calculation is carried out in which one line delay circuit is used at every signal stored plurality of lines by using a plurality of line memories.

Figure 29:
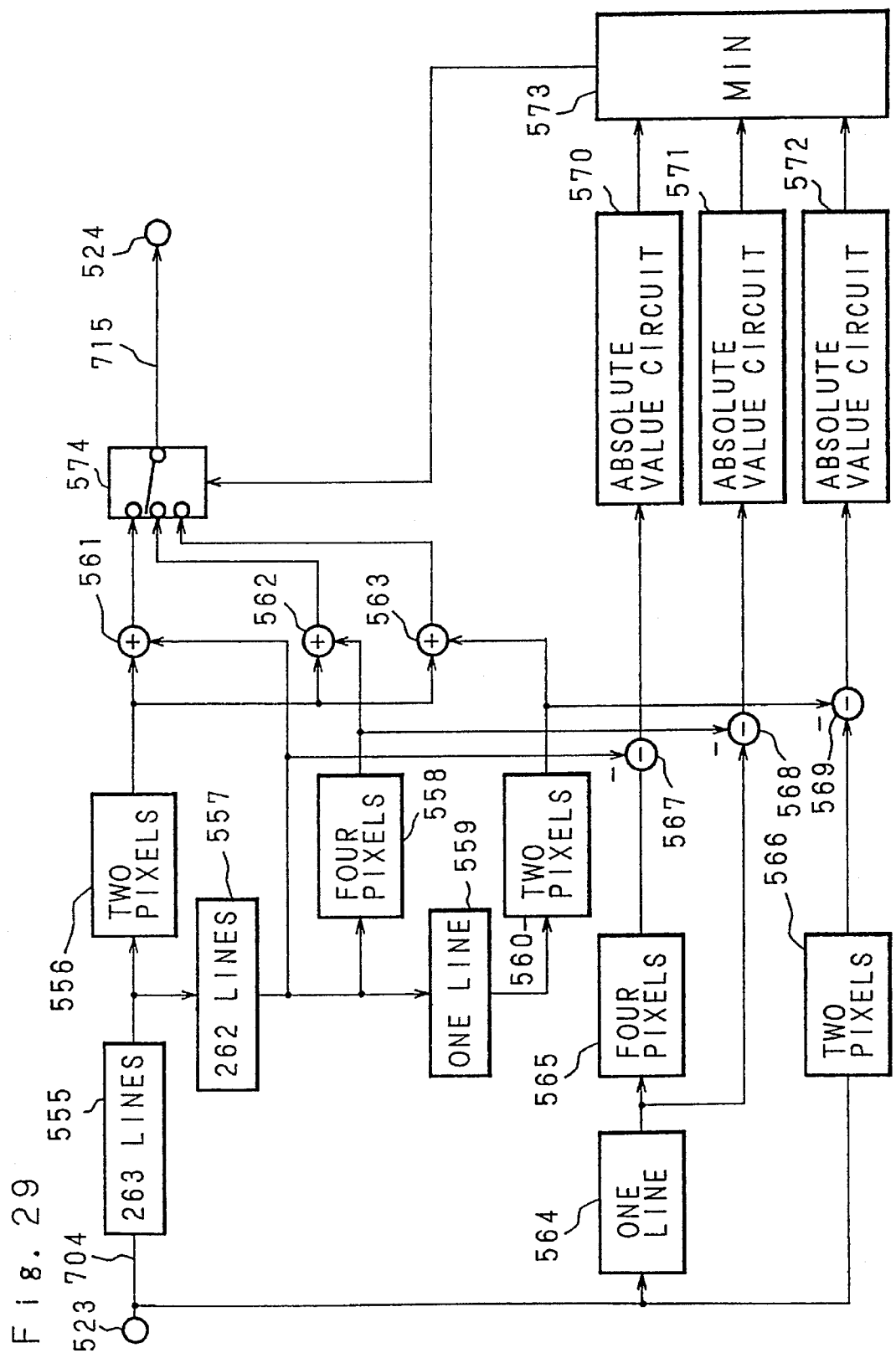
FIG. 29 is a block diagram of a third embodiment of a filter for extracting intraframe C signal in the embodiment shown in FIG. 8.

FIG. 29 is a detailed block diagram of a third embodiment of the filter 17 for extracting intraframe C signal. In the figure, to an input terminal 523, color difference signal 704 is inputted. Reference numeral 555 designates a 263-line delay circuit, 556, 560 and 566 two-pixel delay circuits, 557 262-line delay circuit, 568 and 565 four-pixel delay circuits, 559 and 564 one-line delay circuits, 561, 562 and 563 adders, 567, 568 and 569 subtracters, 570, 571 and 572 absolute value circuits for outputting absolute values, 573 a minimum value selecting circuit for judging and outputting the minimum value among values of three inputs, and 574 a signal selecting circuit For selecting and outputting one of three inputs. The output of the signal selecting circuit 574 is outputted from an output terminal 524 as C signal 715 by intraframe extracting C signal.

Next, explanation will be given of a filter for extracting intraframe C signal having the configuration of FIG. 29. The present invention is characterized by using the optimum filter among filters for extracting intraframe C signal including three kinds of interfield calculations in place of a filter for extracting intrafield C signal as a motion image processing when the motion detecting unit 80 judges an image to be a motion one.

In FIG. 29, color difference signal 704 inputted from the input terminal 523 is delayed by 263 lines by the 263-line delay circuit 556, then is delayed by two pixels by the two-pixel delay circuit 556, and is delayed by 262 lines by the 262-line delay circuit 557.

By adding the color difference signal which has been delayed by two pixels by the two-pixel delay circuit 556 and the output of the 262-line delay circuit 557 by an adder 561, an interfield sum by extracted interfield C signal B can be obtained.

By adding the color difference signal which has been delayed by two pixels by the two-pixel delay circuit 556 and the output of the four-pixel delay circuit 558 by an adder 562, an interfield sum by extracted interfield C signal B can be obtained.

By adding the color difference signal which has been delayed by the two-pixel delay circuit 556 and the output of the two-pixel delay circuit 560 by an adder 563, an interfield sum by extracted interfield C signal A can be obtained.

The above-mentioned three kinds of interfield sums are inputted to the signal selecting circuit 574 and selected by the output of the minimum value selecting circuit 573.

The correlation detection for adaptively selecting these three kinds of extractings of interfield C signal depends upon the interframe correlation detection similarly to the embodiment shown in FIG. 24.

In FIG. 29, the color difference signal 704 inputted from the input terminal 523 is inputted to the 263-line delay circuit 555 as well as to input terminals of a one-line delay circuit 564 and the two-pixel delay circuit 566. The output of the 263-line delay circuit 555 is used for constructing three kinds of filters for extracting interfield C signal.

The output of the 262-line delay circuit 557 and the output of the four-pixel delay circuit 565 is subtracted by a subtracter 567, made to be the absolute value thereof by the absolute value circuit 570 and inputted to the minimum value selecting circuit 573, and detects the correlation between the sampled points III and VI shown in FIG. 11 and FIG. 28.

The output of the four-pixel delay circuit 558 is subtracted from the output of the one-line delay circuit 564 by a subtracter 568, made to be the absolute value thereof by the absolute value circuit 571, inputted to the minimum value selecting circuit 573 and detects the correlation between the sampled points II and V shown in FIG. 11 and FIG. 28.

The output of the two-pixel delay circuit 560 is subtracted from the output of the two-pixel delay circuit 566 by a subtracter 569, made to be the absolute value thereof by the absolute value circuit 572, inputted to the absolute value selecting circuit 573, and detects the correlation between the sampled points I and IV shown in FIG. 11 and FIG. 28.

The minimum selecting circuit 573 selects the minimum output among the above-mentioned three kinds of absolute value outputs, that is, the one is selected whose correlation between the sampled points among correlations between sampled points in three different directions is maximum, each direction being made by connecting the picked-up sampled point with each sampled point separated by one frame from tile picked-up sampled point which is the center, and controls the signal selecting circuit 574.

That, is to say, the signal selecting circuit 574 selects the output of the adder 561 in the case where the output of the absolute value circuit 570 is minimum, selects the output of the adder 562 in the case where the absolute value circuit 571 is minimum, and selects the output of the adder 563 in the case where the output of the absolute value circuit 572 is minimum, respectively.

In addition, in FIG. 8, the motion-adaptive processing of the color difference signal comprising the filter 17 for extracting intraframe C signal, the filter 10 for extracting interframe C signal, and the C signal mixing circuit 15 makes color difference signal 104 which has been time-division multiplexed as its input signal, however, it is also possible to motion-adaptively process the color difference signal independently by juxtaposing the same configuration as the filter 17 for extracting intraframe C signal, filter 10 for extracting interframe C signal, and C signal mixing circuit 15.

In the filter 16 for extracting intraframe Y signal shown in FIG. 24, three kinds of filters for extracting interfield Y signal are adaptively selected, however, in the following embodiment, the optimum filter is used among four kinds of filters including a filter for extracting intrafield Y signal as well as three kinds of filters for extracting interfield Y signal.

Figure 30:
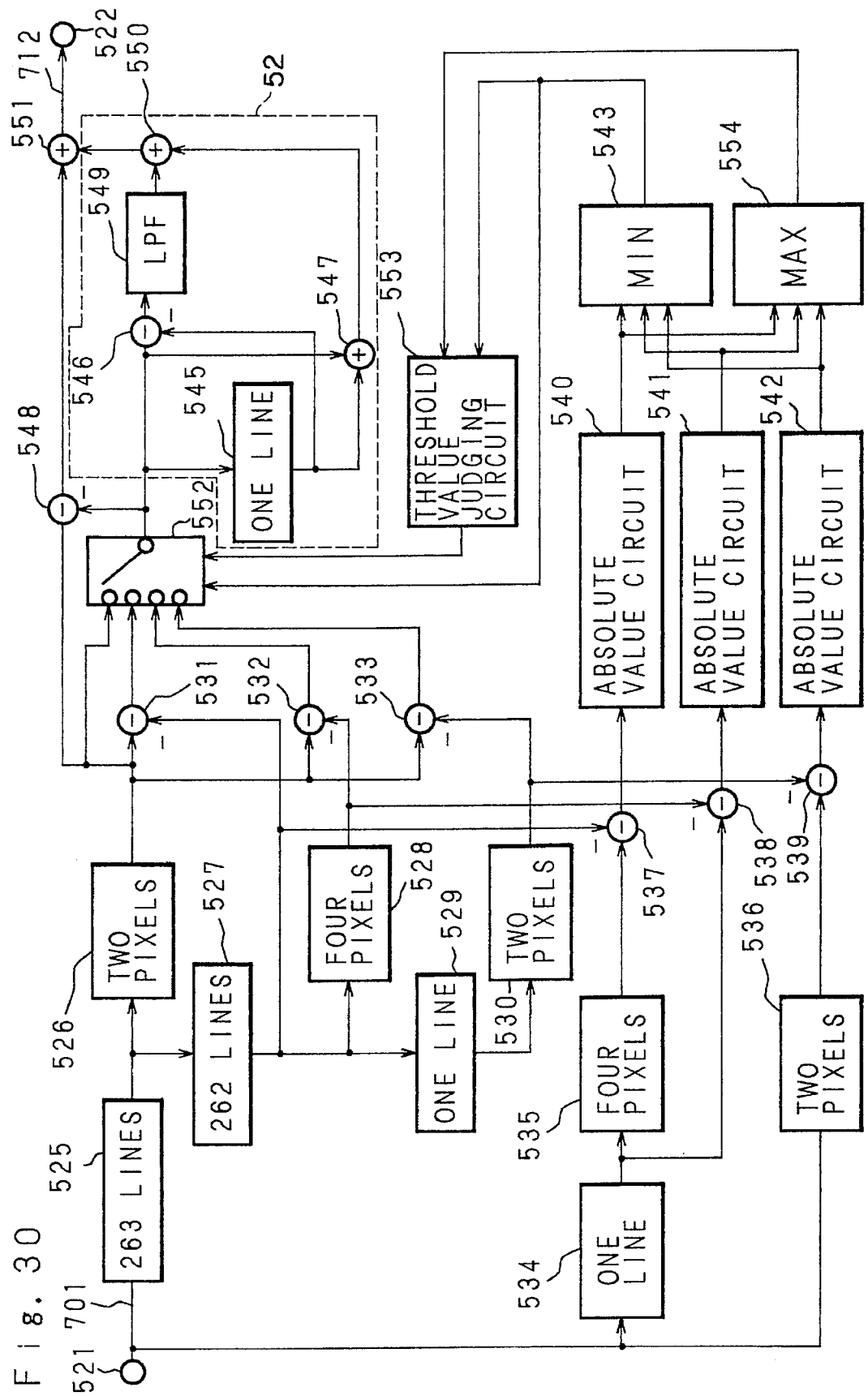
FIG. 30 is a block diagram of a sixth embodiment of a filter for extracting intraframe Y signal in the embodiment shown in FIG. 8.

FIG. 30 is a block diagram of a sixth embodiment of the filter for extracting intraframe Y signal. In FIG. 30, same numerals are used on the same portions shown in FIG. 24.

Reference numeral 552 designates a signal selecting circuit selecting and outputting one of four inputs, 553 designates a threshold judging circuit judging whether respective two inputs exceed a certain threshold or not and outputting a control signal, and 554 designates the maximum value selecting circuit judging the maximum value of values of three inputs and outputting a control signal.

The output of the two-pixel delay circuit 526 is inputted to first input terminals of the subtracters 531, 532 and 533 as well as to the signal selecting circuit 552. This input does not carry out interfield calculation. When this input is selected in the signal selecting circuit 552, the processing for extracting intrafield Y signal is carried out.

The output of the absolute value circuit 540 is inputted to the minimum selecting circuit 543 and the maximum value selecting circuit 554. The output of the absolute value circuit 541 is inputted to the minimum value selecting circuit 543 and the maximum value selecting circuit 554. The output of the absolute value circuit 542 is inputted to the minimum value selecting circuit 543 and the maximum value selecting circuit 554.

The output of the maximum value selecting circuit 554 is inputted to a first input terminal of the threshold judging circuit 553. The output of the minimum value selecting circuit 543 is inputted to a second input terminal of the threshold judging circuit 553 and to a fifth input terminal of the signal selecting circuit 552. The output of the threshold judging circuit 553 is inputted to a sixth input terminal of the signal selecting circuit 552. The threshold judging circuit 553 controls the signal selecting circuit 552 to select the output of the two-pixel delay circuit 526 in either the case where the maximum value of three kinds of interframe correlations is smaller than the first threshold $\alpha$ or the minimum value of three kinds of interframe correlations is larger than the second threshold $\beta$. On the other hand, the threshold judging circuit 553 judges either tile case where the maximum value of three kinds of interframe correlations is larger than the first threshold $\alpha$ or the minimum value of three kinds of interframe correlations is smaller than the second threshold $\beta$, according to the output of the minimum selecting circuit 543, the signal selecting circuit 552 selects the output of the subtracter 531 in the case where the output of the absolute value selecting circuit 540 is minimum, selects the output of the subtracter 532 in the case where the output of the absolute value circuit 541 is minimum, and selects the output of the subtracter 533 in the case where the output of the absolute value circuit 542 is minimum, respectively. Here, there is a relationship $\alpha<\beta$.

An output of an adder 551 is outputted from an output terminal 522 as an extracted intraframe Y signal 712.

In the filter 17 for extracting intraframe C signal in the embodiment shown in FIG. 29, three kinds of filters for extracting interfield C signal are adaptively select-controlled, however, in a following embodiment, optimum filter among four kinds of filters including a filter for extracting intrafield C signal as well as three kinds of filters for extracting interfield C signal is used.

Figure 31:
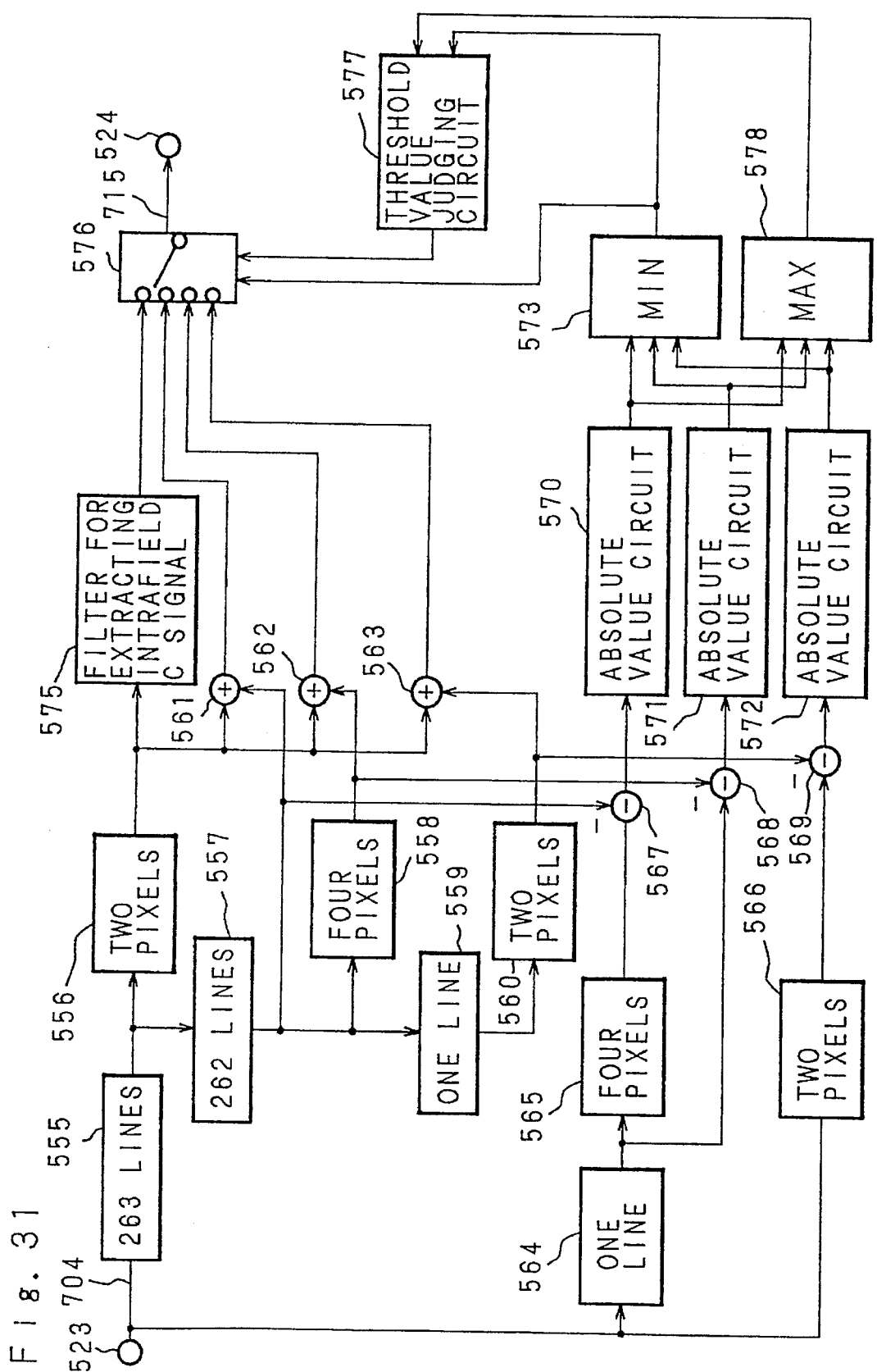
FIG. 31 is a block diagram of a fourth embodiment of a filter for extracting intraframe C signal in the embodiment shown in FIG. 8.

FIG. 31 is a detailed block diagram of a fourth embodiment of the filter 17 for extracting intraframe C signal.

In FIG. 31, same numerals are used on the same portions shown in FIG. 26. Reference numeral 575 designates a filter for extracting intrafield C signal which extracts and outputs C signal according to an intrafield calculation, 576 designates a signal selecting circuit which selects and outputs one among four inputs, 577 designates a threshold judging circuit which judges whether respective two inputs exceed a certain threshold or not and outputs a control signal, and 578 designates a maximum value selecting circuit which judges the maximum value of the values of three inputs and outputs a control signal.

The output of the two-pixel delay circuit 556 is inputted to first inputs of the adders 561, 562, and 563 as well as to the filter 575 for extracting intrafield C signal. The output of the filter 575 for extracting intrafield C signal is inputted to the signal selecting circuit 576.

The output of the absolute value circuit 570 is inputted to the minimum value selecting circuit 573 and the maximum value selecting circuit 578. The output of the absolute value circuit 571 is inputted to the minimum value selecting circuit 573 and the maximum value selecting circuit 578. The output of the absolute value circuit 572 is inputted to the minimum value selecting circuit 573 and the maximum value selecting circuit 578.

The signal selecting circuit 576, in the same way as the signal selecting circuit 552 shown in FIG. 30, is controlled by the threshold judging circuit 553 and the minimum value selecting circuit 543.

The output of the signal selecting circuit 576 is outputted from the output terminal 524 as an extracted intraframe C signal 715.

In short, the filter 16 for extracting intraframe, Y signal and the filter 17 for extracting intraframe C signal as shown in FIG. 8, are used in place of the conventionally used filter 4 for extracting intrafield Y signal and the filter 9 for extracting intrafield C signal, as shown in FIG. 1.

A following embodiment differs in extracting Y signal from the embodiment shown in FIG. 8 in the point that the filter 5 for extracting interframe Y signal and a filter for extracting Y signal in three fields are used.

Figure 32:
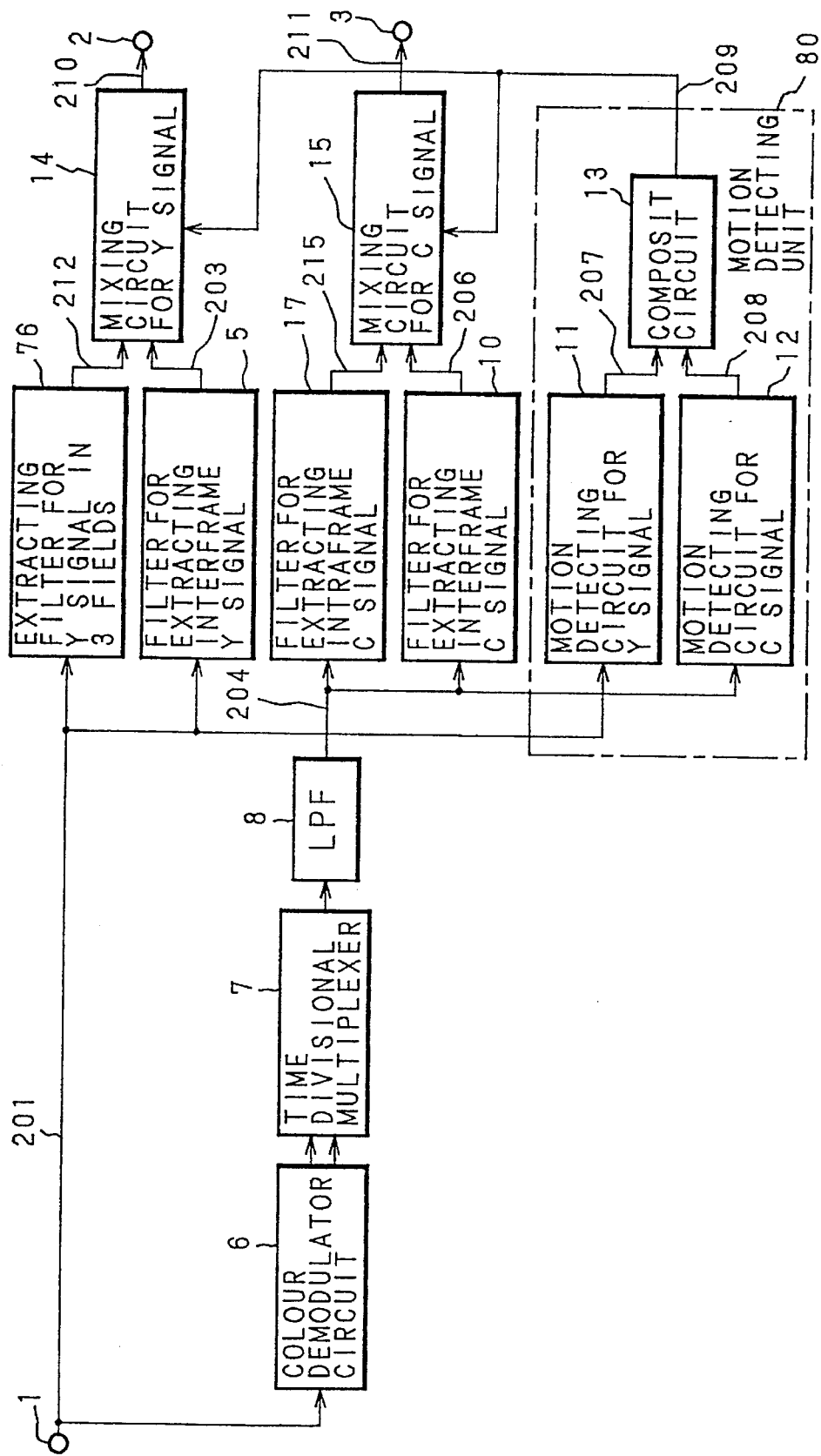
FIG. 32 is a block diagram of a second embodiment of a filter for Y/C separation of the invention.

FIG. 32 is a block diagram of a second embodiment thereof.

FIG. 32 is a view showing that the filter 4 for extracting intrafield Y signal is replaced by a filter 76 for extracting Y signal in three fields, and the filter 9 for extracting intrafield C signal is replaced by the filter 17 for extracting intraframe C signal, and explanation on other parts will be omitted because they were explained in the conventional example.

Figure 33:
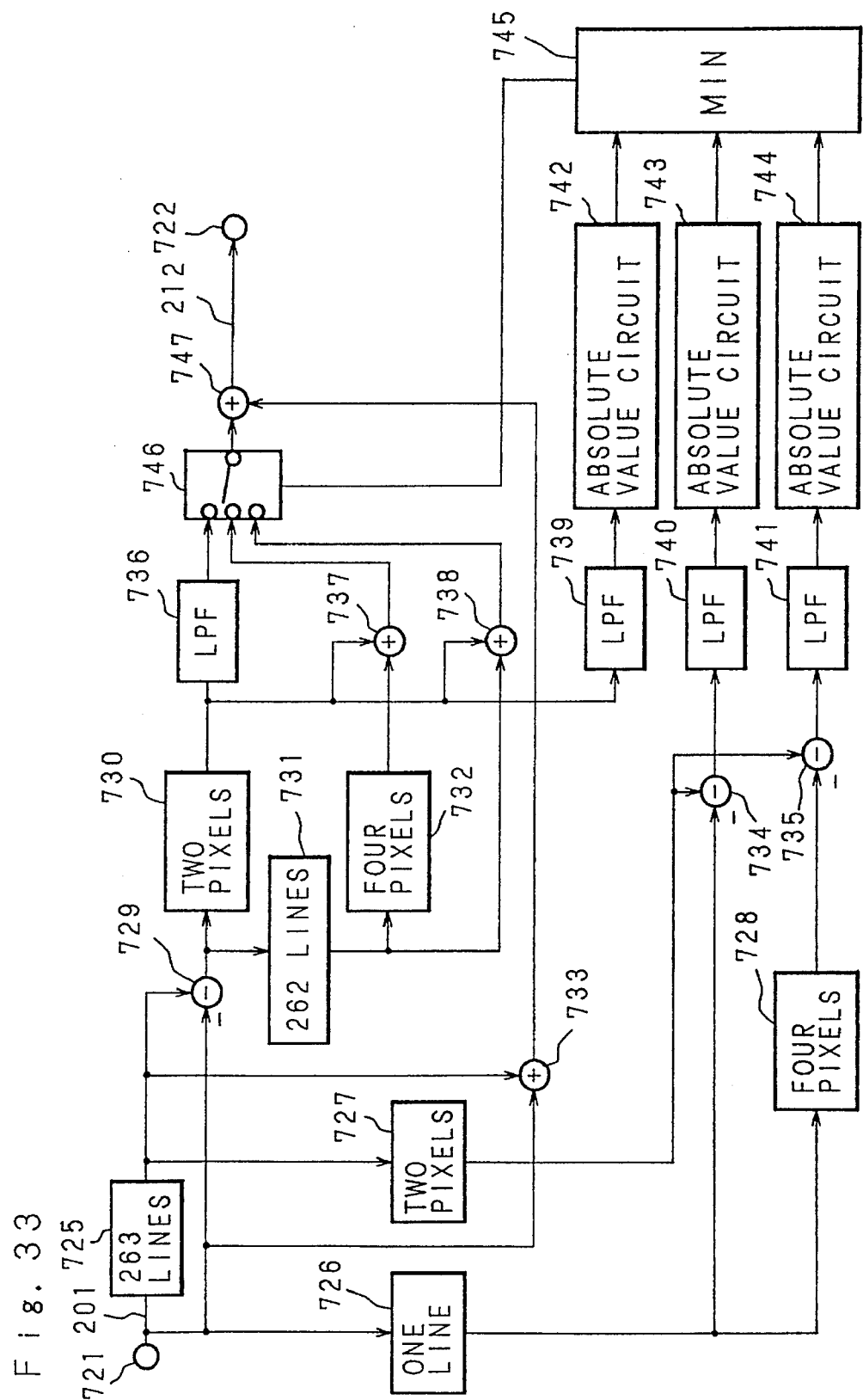
FIG. 33 is a block diagram of a filter for extracting Y signal in three fields.

FIG. 33 is a detailed block diagram of a first embodiment of the filter 76 for extracting Y signal in three fields shown in FIG. 32.

In the figure, to an input terminal 721, V signal 201 is inputted. The V signal is inputted to input terminals of a 263-line delay circuit 725, one-line delay circuit 726 and to first input terminals of a subtracter 729 and adder 733, respectively.

The V signal which has been delayed by 268 lines by the 263-line delay circuit 725 is inputted to an input terminal of a two-pixel delay circuit 727, and to second input terminals of the subtracter 729 and adder 733, respectively. The V signal which has been delayed by two pixels by the two-pixel delay circuit 727 is inputted to first input terminals of subtracters 734 and 735. The V signal which has been delayed by one line by the one-line delay circuit 726 is inputted to an input terminal of a four-pixel delay 732 circuit 728 and to a second input terminal of the subtracter 784, respectively. The V signal which has been delayed by four pixels by the four-pixel delay circuit 728 is inputted to a second input terminal of the subtracter 735.

The output signal of the subtracter 729 is inputted to input terminals of a two-pixel delay circuit 730 and 262-line delay circuit 731, respectively. The output signal of the two-pixel delay circuit 730 is inputted to input terminals of LPF 736 and 739, and to first input terminals of adders 737 and 738 respectively. The output signal of the 262-line delay circuit 731 is inputted to an input terminal of a four-pixel delay circuit 732 and to a second input terminal of the adder 738. The output signal of the four-pixel delay circuit 732 is inputted to a second input terminal of the adder 737. The output signal of the adder 733 is inputted to a first input terminal of an adder 747.

The output signal of the subtracter 734 is inputted to an input terminal of a LPF 740. An output signal of a subtracter 735 is inputted to an input terminal of a LPF 741.

The output of the LPF 736 is inputted to a first input terminal of the signal selecting circuit 746, the output of the adder 737 is inputted to a second input terminal of the signal selecting circuit 746, and the output of the adder 738 is inputted to a third input terminal of a signal selecting circuit 746, respectively.

The output of the LPF 739 is inputted to an input terminal of an absolute value circuit 742, the output of the LPF 740 is inputted to an input terminal of an absolute value circuit 743, and the output of the LPF 741 is inputted to an input terminal of an absolute value circuit 744, respectively.

The output of the absolute value circuit 742 is inputted to a first input terminal of the minimum value selecting circuit 745, the output of the absolute value circuit 743 is inputted to a second input terminal of the minimum value selecting circuit 745, and the output of the absolute value circuit 744 is inputted to a third input terminal of the minimum value selecting circuit 745, respectively.

The output of the minimum value selecting circuit 745 is inputted to a fourth input terminal of the signal selecting circuit 746, thereby selecting and controlling inputs from the first to the third.

The output of the signal selecting circuit 746 is inputted to a second input terminal of the adder 747. The output of the adder 747 is outputted from an output terminal 722 as Y signal 212 by intrafield extracting Y signal in three fields.

Next, explanation will be given of the operation thereof.

Figure 34:
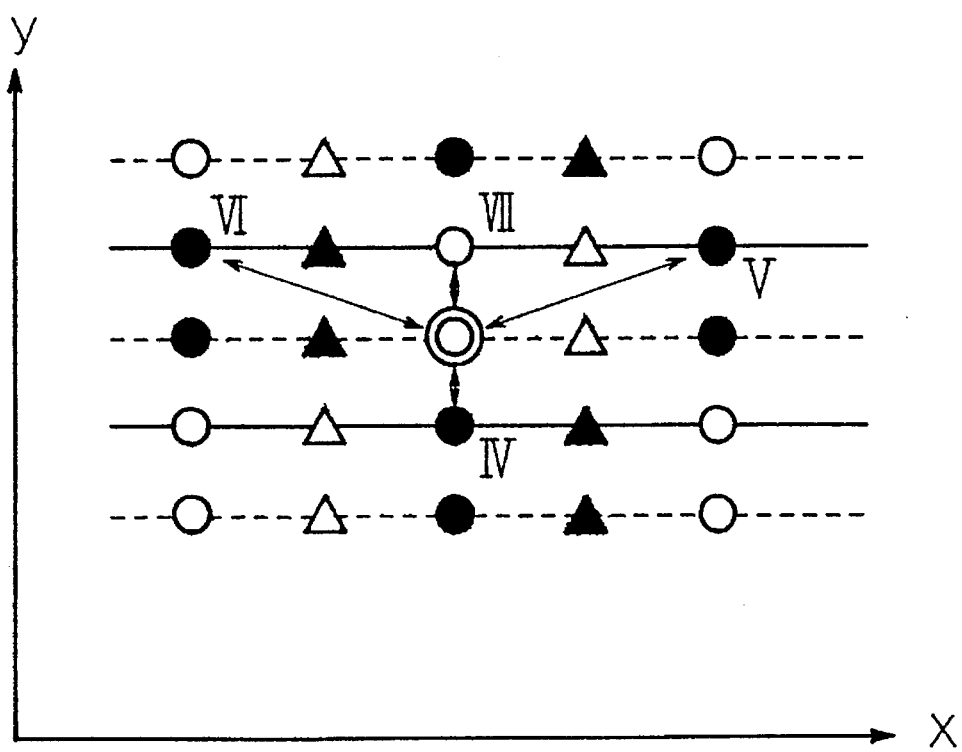
FIG. 34 is a x-y view showing array of V signal.

In FIG. 11, the points locating in the vicinity of the picked-up sampled point ⌊⊙⌉ in n−1-th field and different 180° in color sub carrier phase from the picked-up sampled point are the sampled points ⌊●⌉ I, II and III. FIG. 34 shows the array of V signal in n-th field and n+1 fields, similarly to FIG. 28.

In FIG. 34, the points locating in the vicinity of the picked-up sampled point ⌊⊙⌉ in n+1-th field and different 180° in color sub carrier phase from the picked-up sampled point are the sampled points ⌊●⌉ IV, V and VI. By calculation between the picked-up sampled point ⌊⊙⌉ and any of these sampled points, interfield Y/C separation is enabled. Moreover, when combining these interfield Y/C separations, Y/C separation in three fields is enabled which is capable of carrying out more accurate Y/C separation.

At first, high frequency component on three-dimensional frequency space including C signal can be taken out according to the difference between the picked-up sampled point ⌊⊙⌉ and the sampled point ⌊●⌉ IV in FIG. 34. In addition, low frequency component on three-dimensional frequency space not including C signal can be taken out according to the sum of the picked-up sampled point ⌊⊙⌉ and the sampled point ⌊●⌉ IV in FIG. 34. The outputs of the subtracter 729 and the adder 733 shown in FIG. 33 respectively show the high frequency component and the low frequency component mentioned above. The output of the subtracter 729 can take out C signal from high frequency component including C signal by the two-pixel delay circuit 730 and LPF 736 compensating for a horizontal position. By adding the above result, and low frequency component on three-dimensional frequency space not including C signal which is the output of the adder 733 by the adder 747, Y signal can be obtained. This is called an extracted Y signal A in three fields.

Figure 35A:
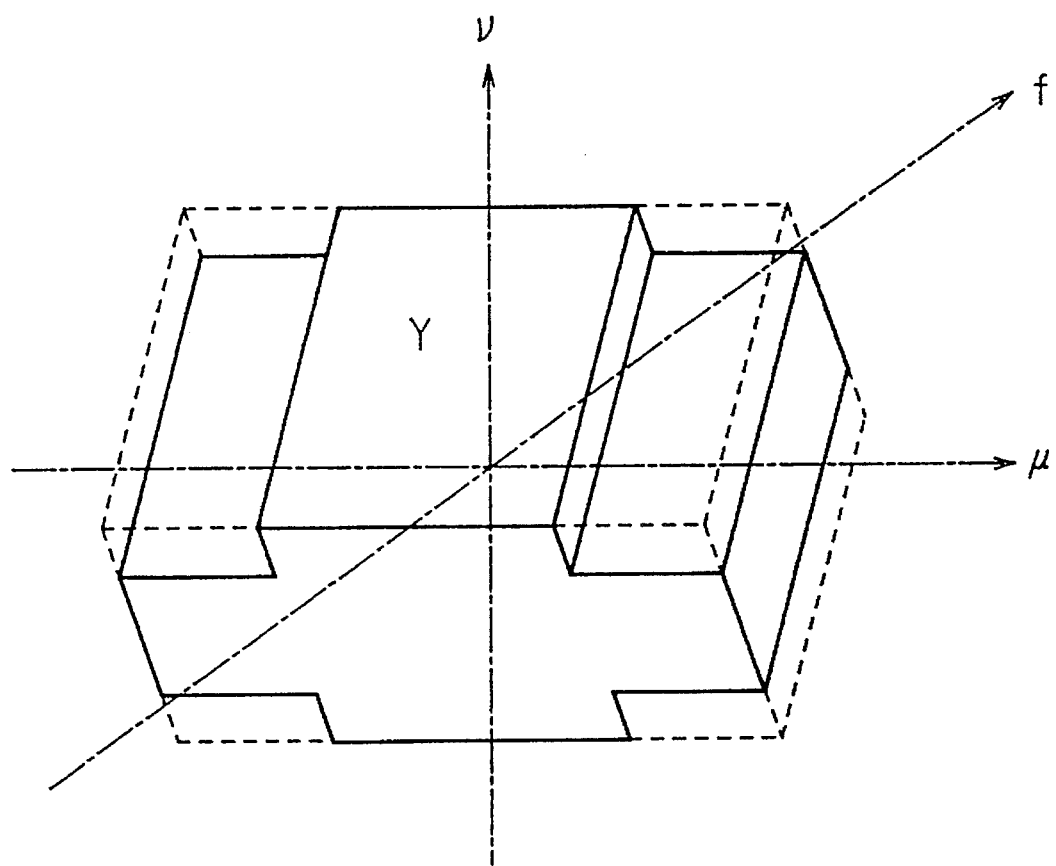
FIG. 35(a)–(c) are spectrum atlantes of Y signal in three-dimensional frequency space obtained by the first extracting Y signal in three fields.
Figure 35B:
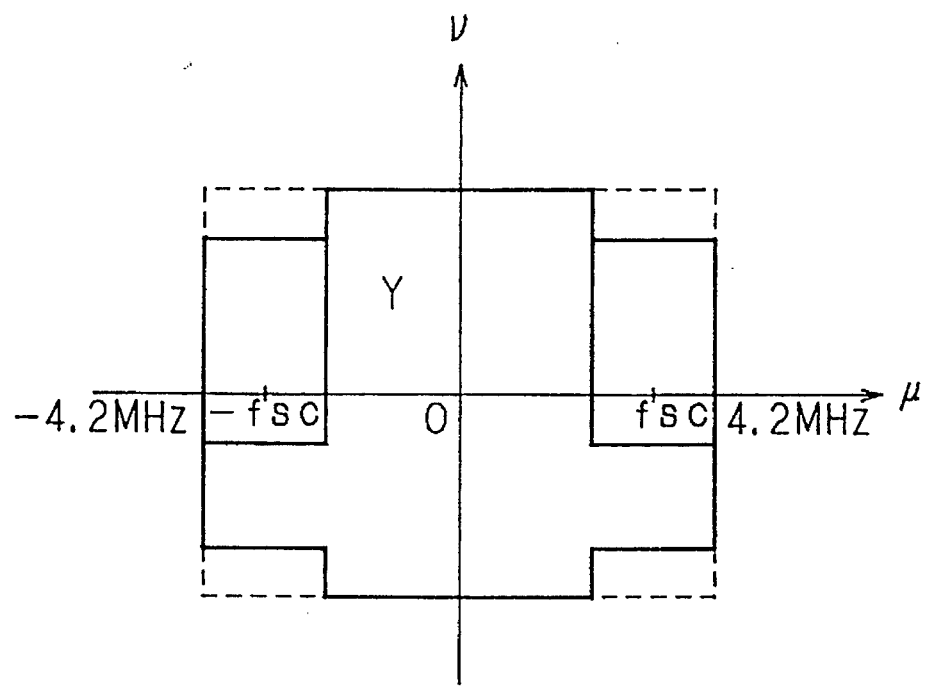
Figure 35C:
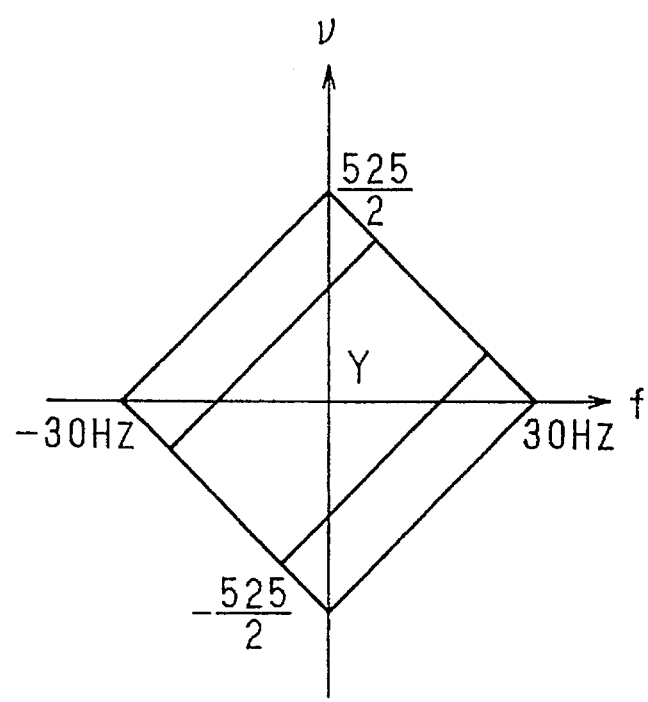

FIG. 35 shows a three-dimensional frequency space similarly to FIG. 12. The view shows the frequency space in which Y signal exists which has been obtained by extracted Y signal A in three fields.

Secondary, the output of the subtracter 729 shown in FIG. 33 is delayed by 262 lines and four pixels by the 262-line delay circuit 731 and the four-pixel delay circuit 732, and by the adder 737, the sum of the above result and the output of the two-pixel delay circuit 730 can be obtained. The above calculation means that high frequency component in three-dimensional frequency space including C signal can be obtained by the difference between the picked-up sampled point ⌊⊙⌉ and the sampled point ⌊●⌉ IV shown in FIG. 34, and moreover that, C signal can be removed according to the sum of the above-mentioned high frequency components of the positions of the picked-up sampled point ⌊⊙⌉ and the sampled point ⌊●⌉ II shown in FIG. 11. When the same processing as the above is applied, Y signal can be obtained. This is called an extracted Y signal B in three fields.

Figure 36A:
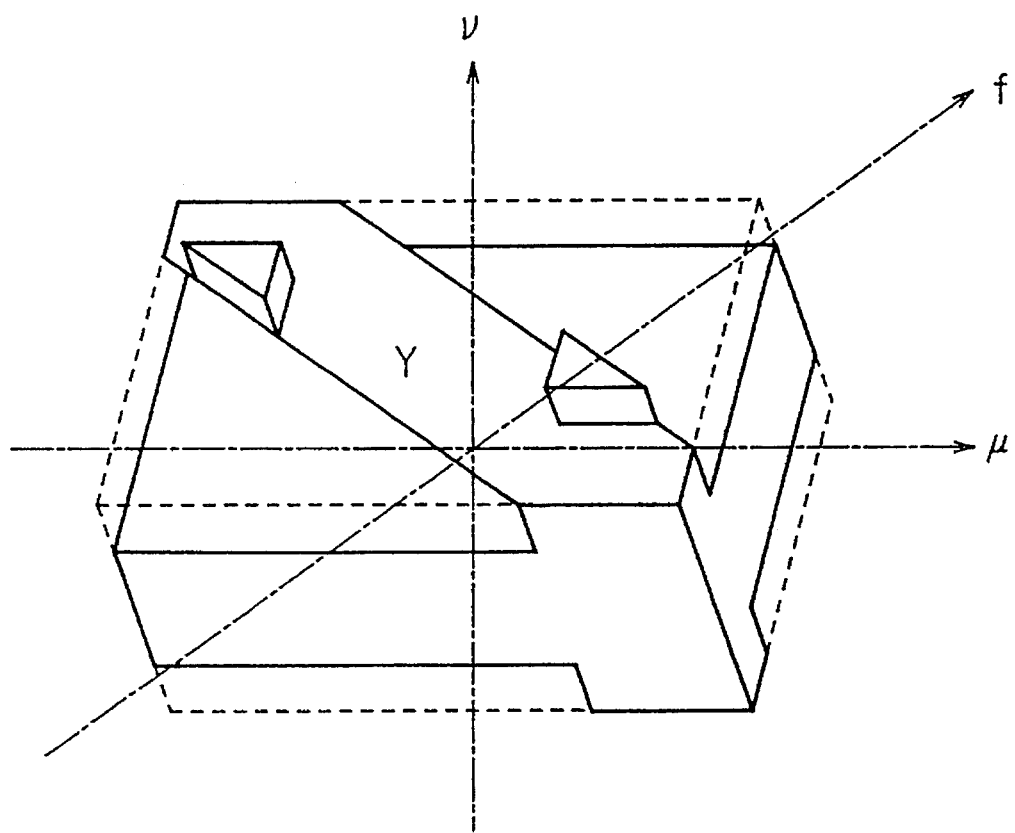
FIG. 36(a)–(c) are spectrum atlantes of Y signal in three-dimensional frequency space obtained by the second extracting Y signal in three fields.
Figure 36B:
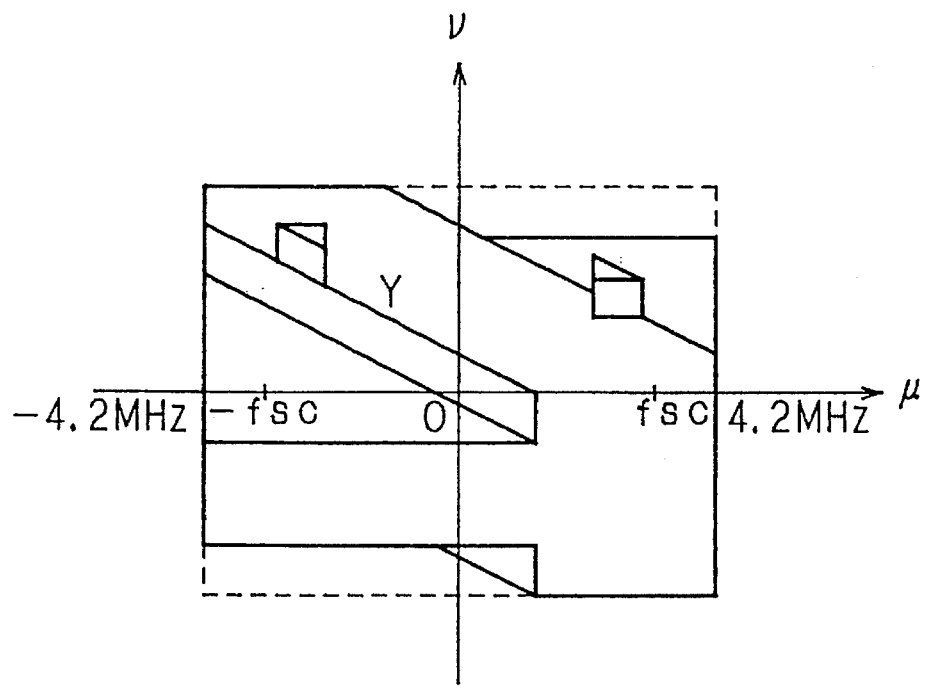
Figure 36C:
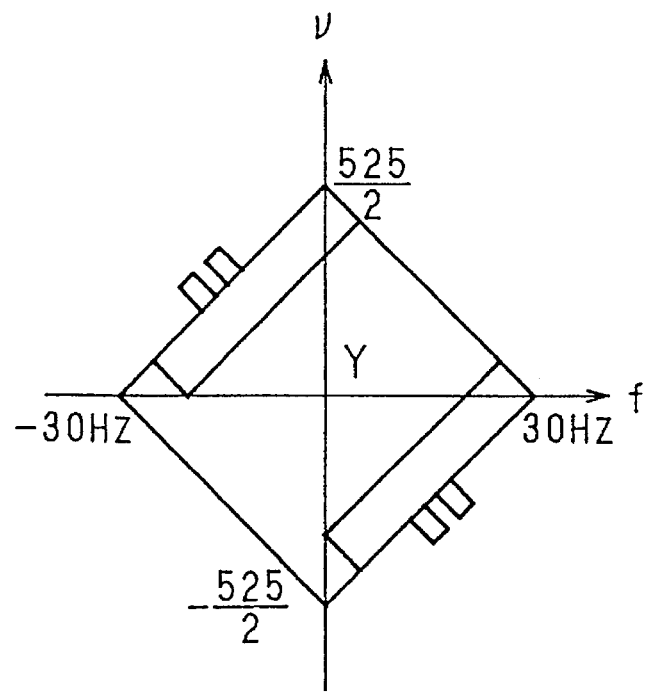

FIG. 36 also shows frequency space in which Y signal exists obtained by the extracted Y signal B in three fields.

When FIG. 36 is viewed, it seems that the separated Y signal includes a part of C signal, however, it is rare that Y signal includes C signal as the correlation between the Y signal and C signal is strong.

Thirdly, by the adder 738 shown in FIG. 33, the sum of the output of the 262-line delay circuit 731 and that of the two-pixel delay circuit 730 can be obtained. This calculation means that high frequency component in three-dimensional frequency space including C signal can be obtained according to the difference between the picked-up sampled point ⌊⊙⌉ and the sampled point ⌊●⌉ IV shown in FIG. 34, and moreover that, C signal can be removed according to the sum of the above-mentioned high frequency components of the positions of the picked-up sampled point ⌊⊙⌉ and the sampled point ⌊●⌉ III shown in FIG. 11. When the same processing as above-mentioned is applied, Y signal can be obtained. This is called an extracted Y signal C in three fields.

Figure 37A:
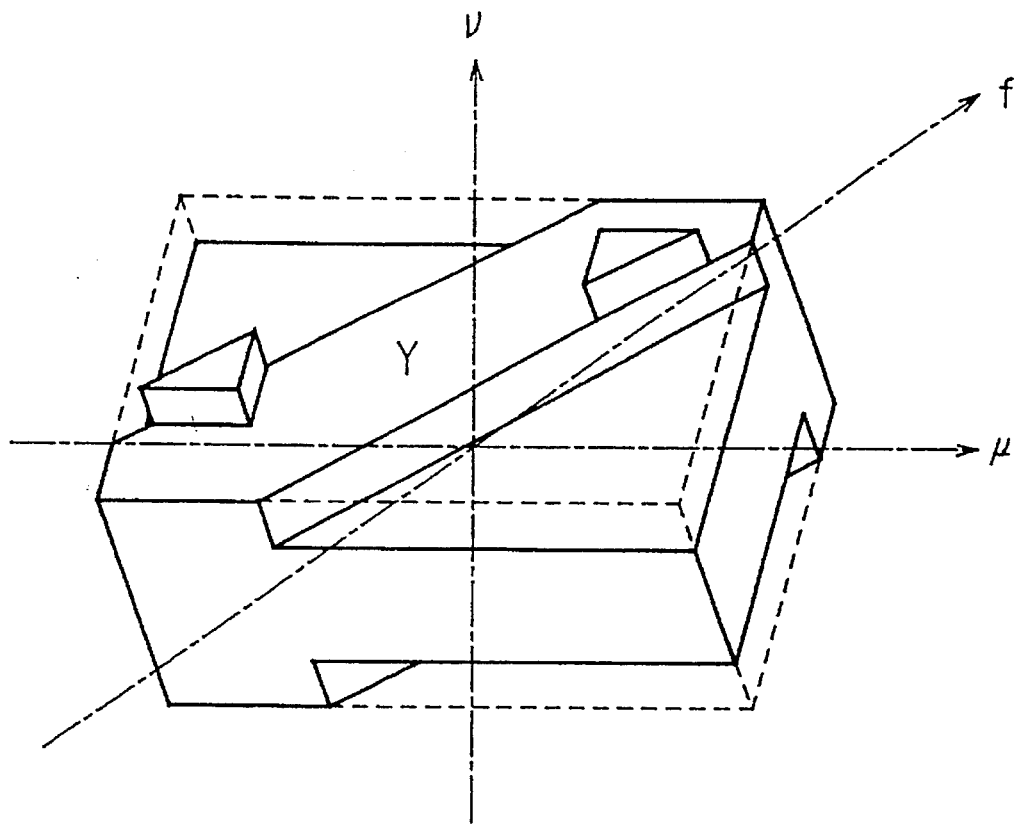
FIG. 37 (a)–(c) are spectrum atlantes of Y signal obtained in three-dimensional frequency space obtained by the third extracting Y signal in three fields.
Figure 37B:
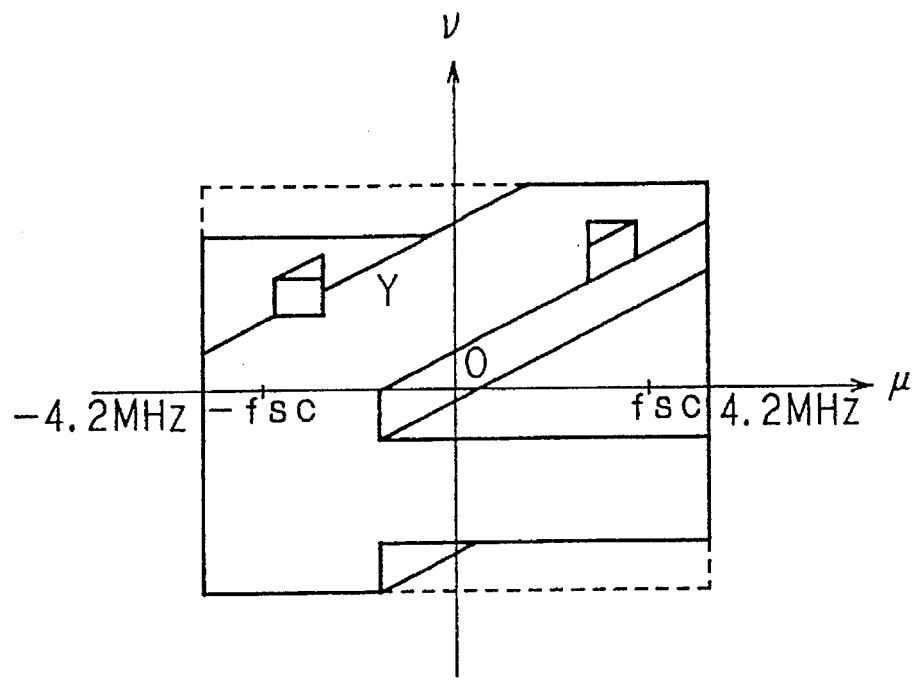
Figure 37C:
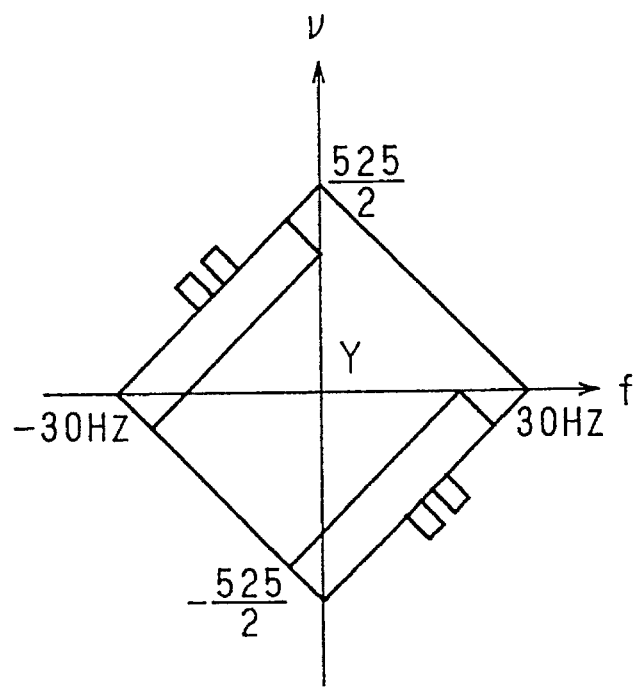

FIG. 37 also shows a frequency space in which Y signal exists obtained by the extracted Y signal C in three fields.

When FIG. 37 is viewed, it seems that the separated Y signal includes a part of C signal, however, it is rare that Y signal includes C signal from the same reason as in the case of FIG. 36.

In order to control selecting adaptively tile filter for extracting Y signal in three fields, it is considered that the correlations between the picked-up sampled point ⌊⊙⌉ and the sampled points ⌊●⌉ IV, V, and VI are detected, respectively.

As it is V signal that is inputted to the input terminal 721, in order to detect correlations, each of the difference is made to pass through LPF to detect correlation of low frequency component of Y signal, and make it as a control signal.

Next, explanation will be given of the operation of the filter for extracting Y signal in three fields having the configuration of FIG. 33. This invention is characterized by using the optimum filter among three kinds of filters for extracting Y signal in three fields including interfield calculation in place of the filter for extracting intrafield Y signal, when the motion detecting unit 80 judges an image to be a motion one.

In FIG. 33, V signal 201 inputted from the input terminal 721 is delayed by 263 lines by the 263-line delay circuit 725.

By subtracting V signal which has been delayed by 263 lines by the 263-line delay circuit 725 from the inputted V signal 201 by the subtracter 729, high frequency component on three-dimensional frequency space including C signal can be obtained.

The output of the subtracter 729 is, at first, capable of removing C signal with the first method by the two-pixel delay circuit 730 and LPF 736. This is the extracted Y signal A in three fields. The output of the subtracter 729 is capable of removing C signal with the second method by being delayed 262 lines by the 262-line delay circuit 731, being delayed by four pixels by the four-pixel delay circuit 732, and by being added to the output of the two-pixel delay circuit 730. This is the extracted Y signal B in three fields mentioned above. The output of the 262-line delay circuit 731 is capable of removing C signal with the third method by being added to the output of the two-pixel delay circuit 730. This is the extracted Y signal C in three fields.

The above-mentioned three kinds of interfield differences are inputted to the signal selecting circuit 746, and are selected by the output of the minimum value selecting circuit 745 to be described later.

The interfield difference being the output of the two-pixel delay circuit 730 is made to pass through the LPF 739 which allows a band lower than 2.1 MHz to be passed is made to be the absolute value thereof by the absolute value circuit 742, and is inputted to the minimum value selecting circuit 745. The absolute value circuit 742 detects the correlation between the picked-up sampled point ⌊◉⌉ and the sampled point ⌊●⌉ IV shown in FIG. 34.

The output of the one-line delay circuit 726 is subtracted from the output of the two-pixel delay circuit 727 by the subtracter 734 to obtain an interfield difference. The interfield difference being the output of the subtracter 734 is made to pass through LPF 740 which allows band lower than 2.1 MHz to be passed, then made to be the absolute value thereof by the absolute value circuit 734, and inputted to the minimum value selecting circuit 745. The absolute value circuit 734 detects the correlation between the picked-up sampled point ⌊◉⌉ and the sampled point ⌊●⌉ V shown in FIG. 34.

The output of the four-pixel delay circuit 728 is subtracted from the output of the two-pixel delay circuit 727 to obtain an interfield difference. The interfield difference allows a to pass through LPF 741 which makes band lower than 2.1 MHz to be passed, then made to be the absolute value thereof by the absolute value circuit 744, and inputted to the minimum value selecting circuit 745. The absolute value circuit 744 detects the correlation between the picked-up sampled point ⌊◉⌉ and the sampled point ⌊●⌉ VI shown in FIG. 34.

The minimum value selecting circuit 745 selects the minimum output (whose amount of detected correlation is maximum) of the above mentioned three kinds of absolute value outputs and controls the signal selecting circuit 746.

That is to say, the signal selecting circuit 746 selects the output of the LPF 736 in the case where the output of the absolute value circuit 742 is minimum, selects the output of the adder 737 in the case where the output of the absolute value circuit 743 is minimum, and selects the output of the adder 738 in the case where the output of the absolute value 744 is minimum.

In addition, the output of the signal selecting circuit 746 is capable of removing C signal in the direction in which correlation has been detected in three dimensional frequency space and of obtaining Y signal 212 by extracting Y signal in three fields.

Figure 38:
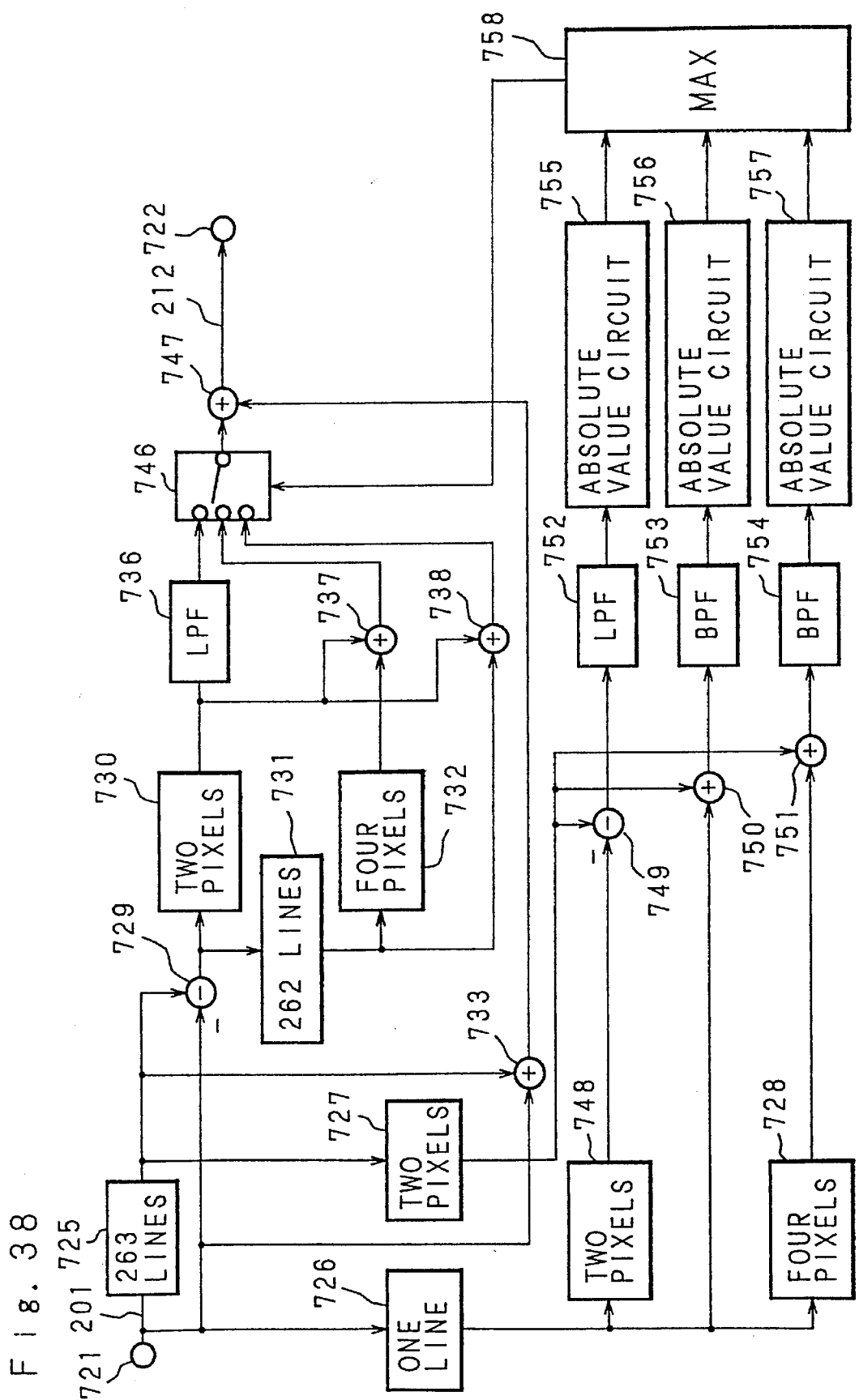
FIG. 38 is a block diagram of a second embodiment of a filter for extracting Y signal in three fields.

FIG. 38 is a detailed block diagram of a second embodiment of the filter 76 for extracting Y signal in three fields.

The only difference between the ones shown in FIG. 38 and FIG. 33 is the method for detecting interfield correlation.

Explanation will be given only of an interfield correlation detecting circuit different from that in FIG. 33, among filters for extracting Y signal in three fields having the configuration shown in FIG. 38. Same numeral are used on the same portions shown in FIG. 33.

In this embodiment, as a method for detecting correlation of V signal, a method for detecting a direction in which spectrum of Y signal extends in three-dimensional frequency space.

Figure 39A:
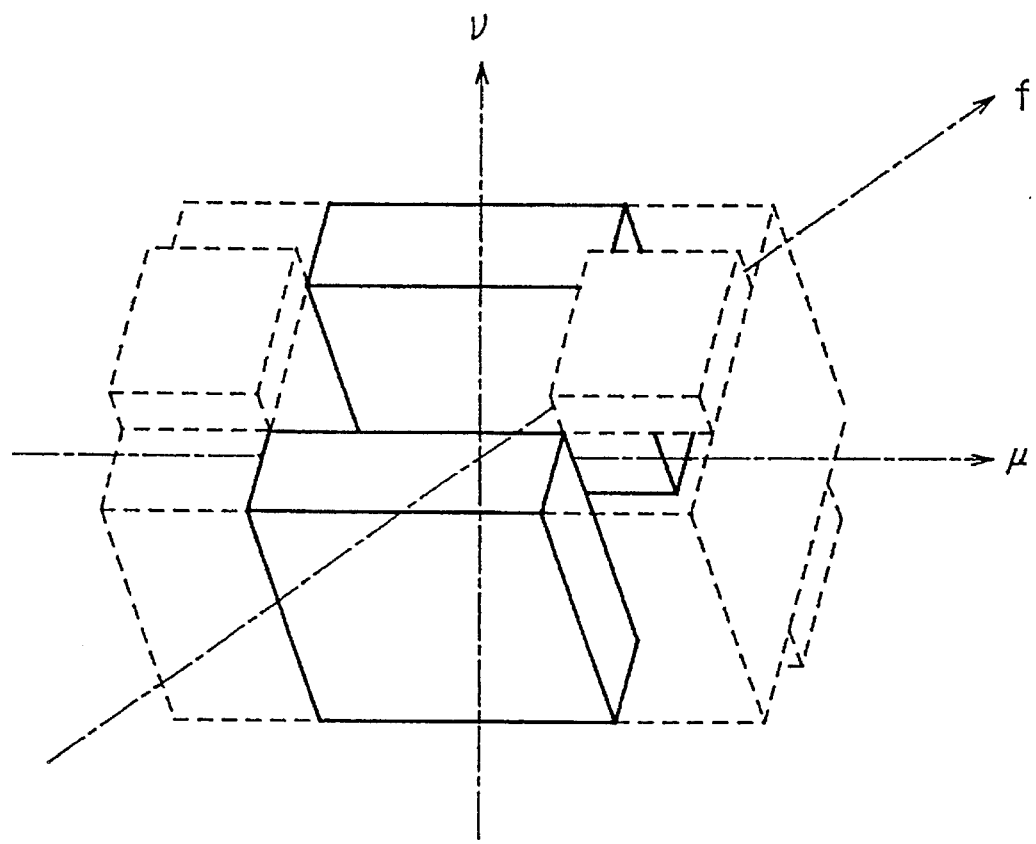
FIG. 39(a)–(c) are spectrum atlas of Y signal in three-dimensional frequency space obtained by the first extracting Y signal in three fields.
Figure 39B:
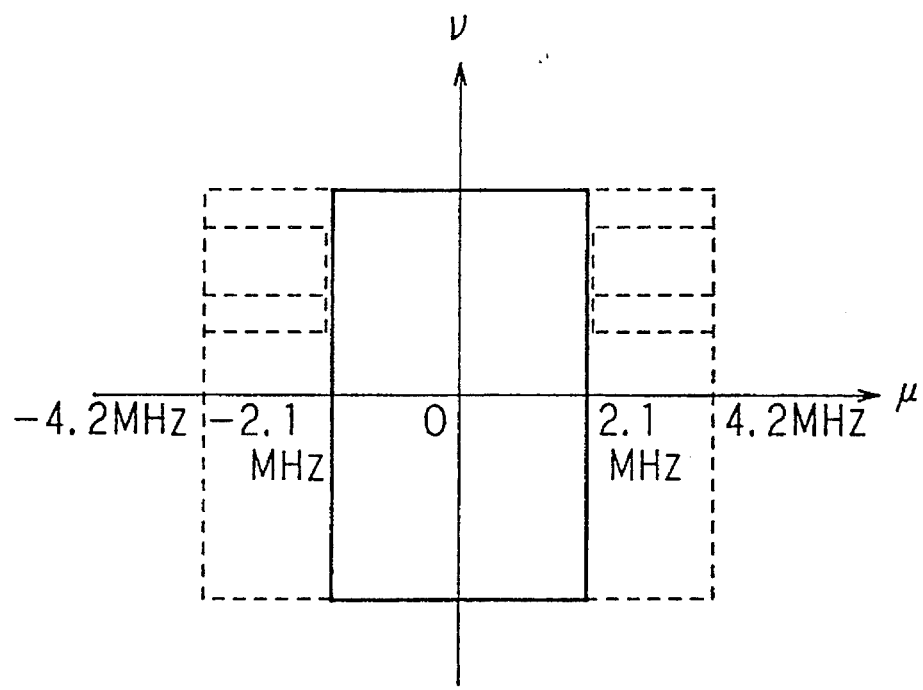
Figure 39C:
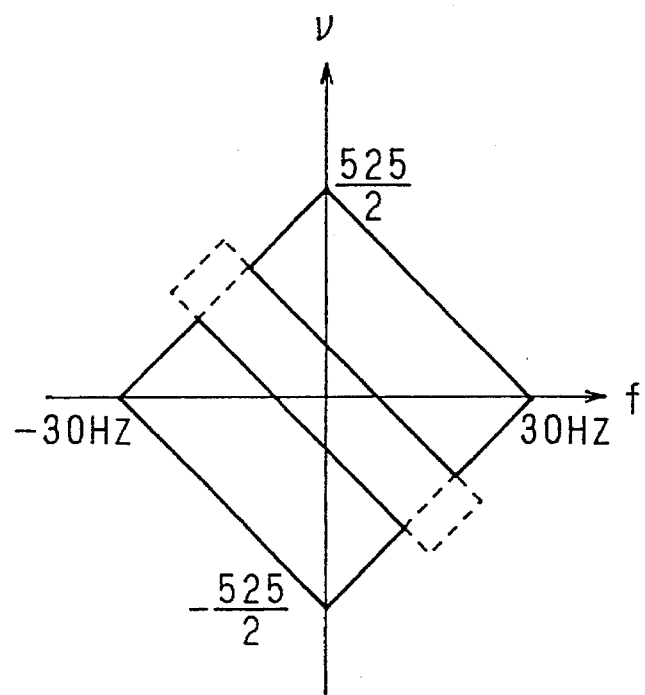
Figure 40A:
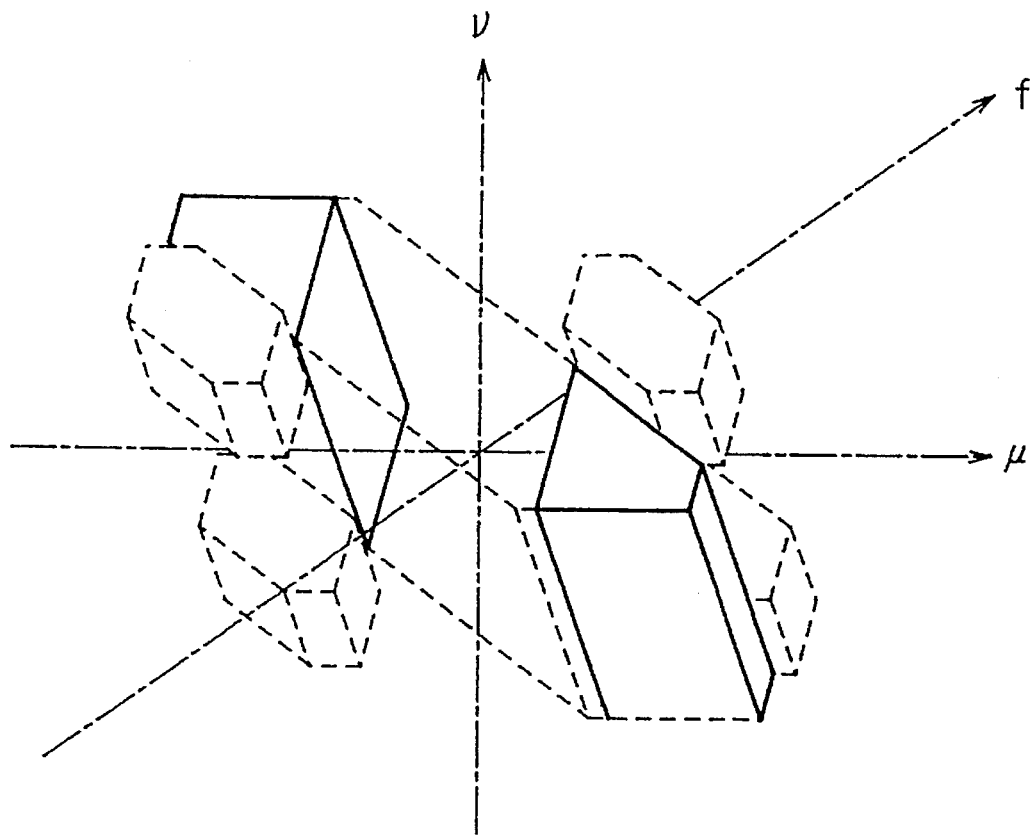
FIG. 40(a)–(c) are spectrum atlas of Y signal in three-dimensional frequency space obtained by the second extracting Y signal in three fields.
Figure 40B:
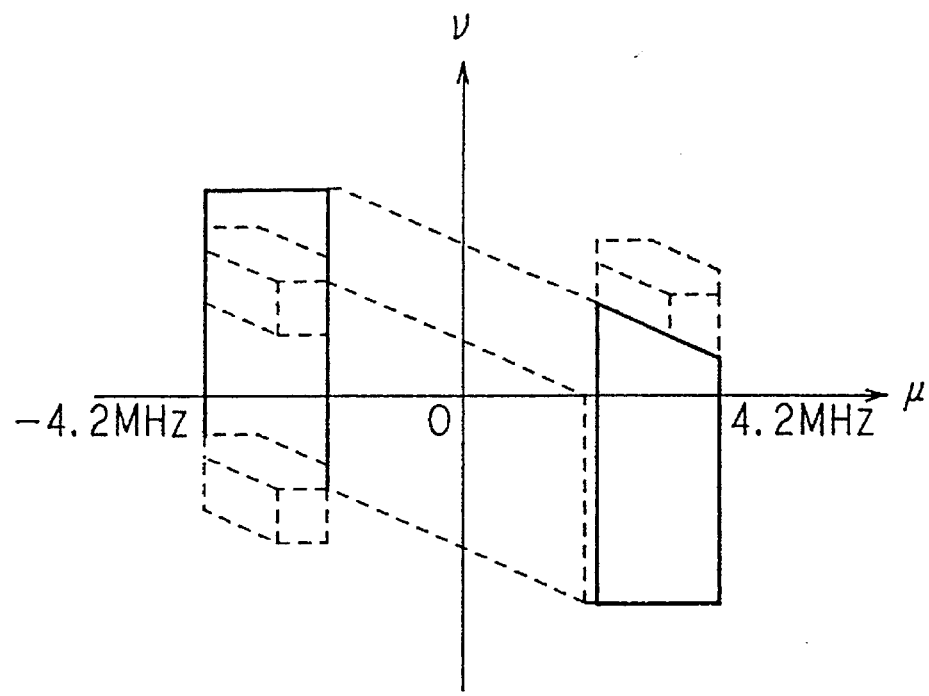
Figure 40C:
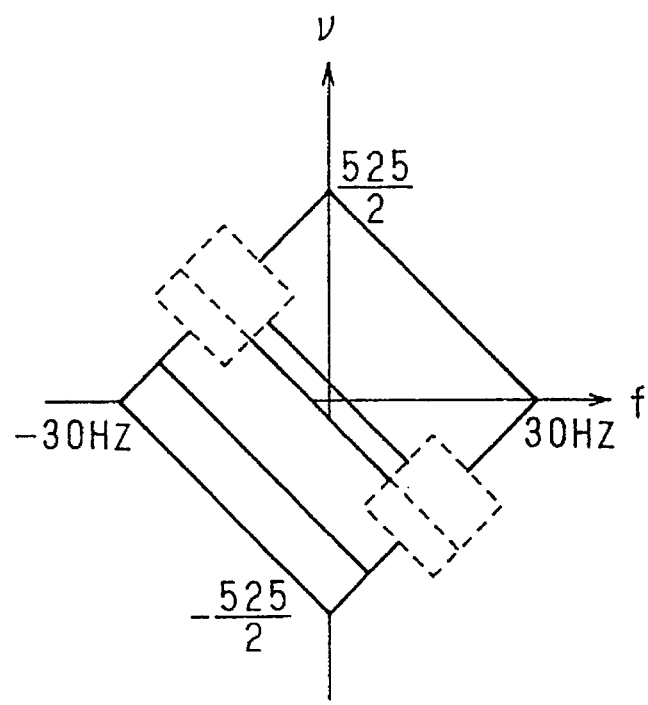
Figure 41A:
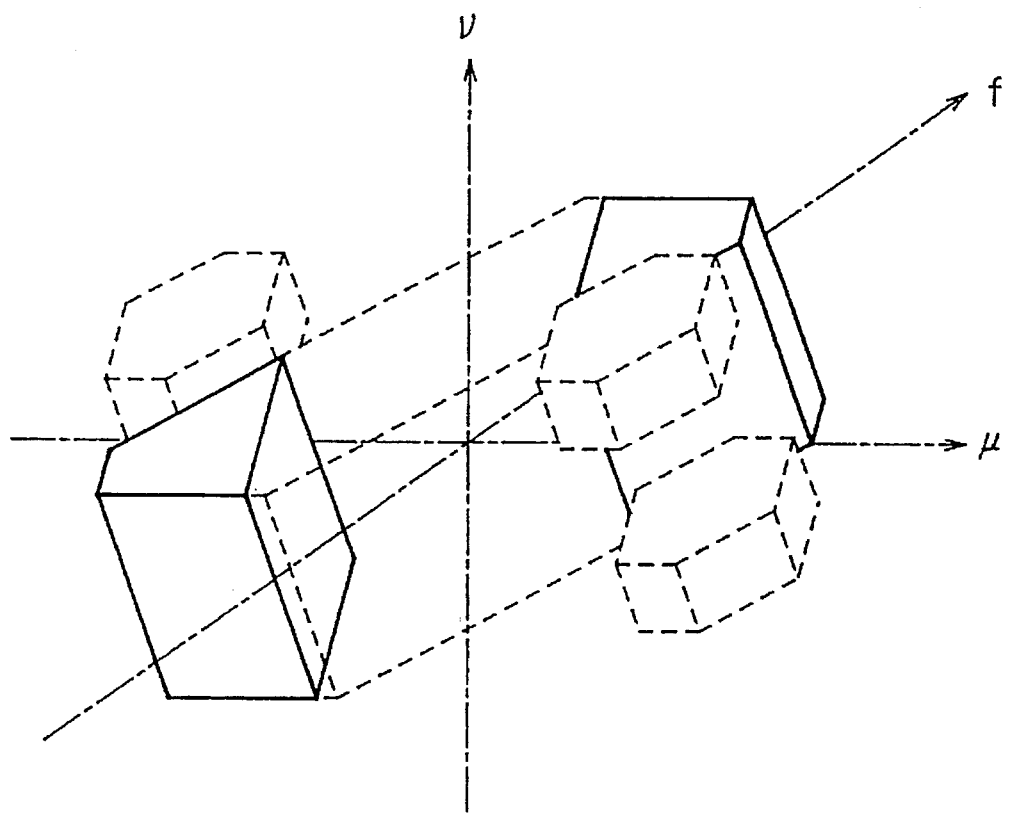
FIG. 41(a)–(c) are spectrum atlas of Y signal in three-dimensional frequency space obtained by the third extracting Y signal in three fields.
Figure 41B:
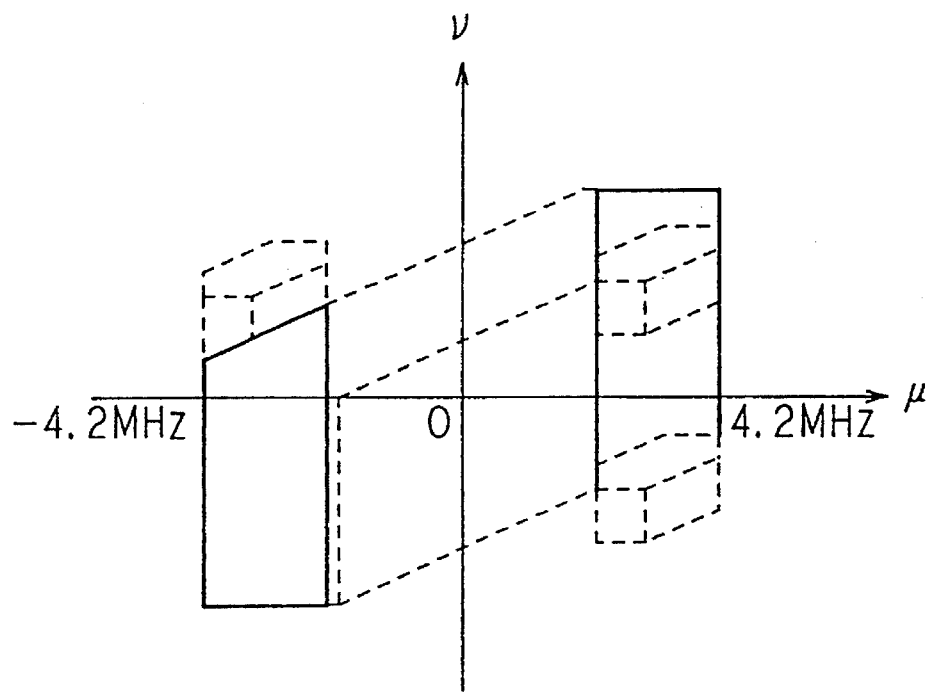
Figure 41C:
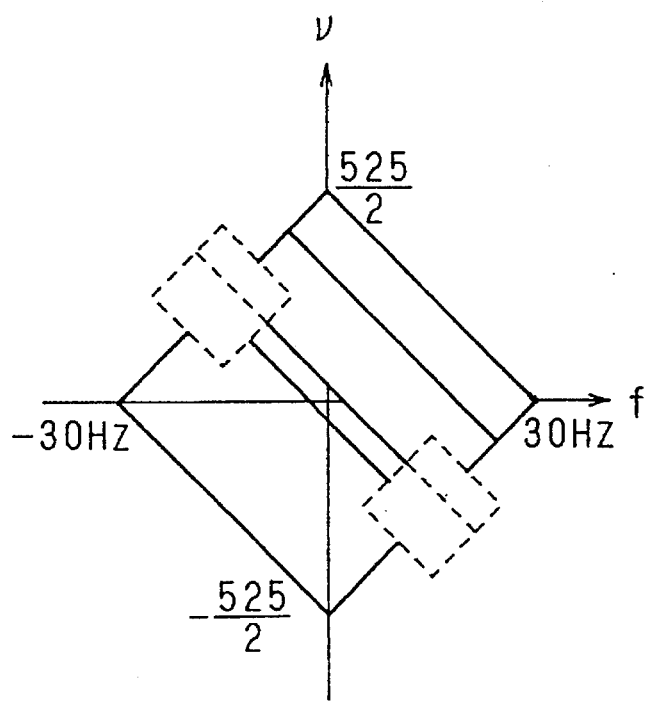

The frequency band, which detects spectrum extension of Y signal for selecting and controlling three kinds of interfield extracting Y signal are shown in FIG. 39, FIG. 40 and FIG. 41.

FIG. 39 is a frequency band which detects spectrum extension of Y signal for selecting the interfield extracted Y signal A. By making the difference between the picked-up sampled point ⌊◉⌉ and sampled point ⌊○⌉ VII located one line up the sampled point ⌊●⌉ IV shown in FIG. 34 pass through LPF, this band can be detected.

FIG. 40 is a frequency band which detects spectrum extension of Y signal for selecting the extracted interfield Y signal B. By making the sum of the picked-up sampled point ⌊◉⌉ and sampled point ⌊●⌉ V shown in FIG. 34 to pass through BPF, this band can be detected.

FIG. 41 is a frequency band which detects spectrum extension of Y signal for selecting the extracted interfield Y signal C. By making the sum of the picked-up sampled point ⌊◉⌉ and sampled point ⌊●⌉ VI in FIG. 34 pass through BPF, this band can be detected.

Next, explanation will be given only of an interfield correlation detecting circuit different from that shown in FIG. 33, among filters for extracting Y signal in three fields having the configuration shown in FIG. 38. In FIG. 38, same numerals are used on the same portions as shown in FIG. 33.

An output of a two-pixel delay circuit 748 is subtracted from that of the two pixel delay circuit 727 by a subtracter 749, and the above result is made to pass through a LPF which allows a band lower than 2.1 MHz to be passed, then is made to be the absolute value thereof by an absolute value circuit 755, and inputted to a maximum value selecting circuit 758 to detect the correlation between the picked-up sampled point ⌊◉⌉ and sampled point, ⌊○⌉ VII shown in FIG. 34.

The output of the one-line delay circuit 726 and that of the two-pixel delay circuit 727 is added by an adder 750, and the above result is made to pass through a BPF 753 which allows a band higher than 2.1 MHz to be passed, then made to be the absolute value thereof by an absolute value circuit 758, and inputted to the maximum value selecting circuit 758 to detect correlation between the picked-up sampled point ⌊⊙⌉ and sampled point ⌊●⌉ V shown in FIG. 34.

The output of the four-pixel delay circuit 728 and that of the two-pixel delay circuit 727 are added by an adder 751, and the above result is made to pass through a BPF 754 which allows a band higher than 2.1 MHz to be passed, then made to be the absolute value thereof by an absolute value circuit 757, and inputted to the maximum selecting circuit 758 to detect the correlation between the picked-up sampled point ⌊⊙⌉ and sampled point ⌊●⌉ VI shown in FIG. 34.

The maximum value selecting circuit 758 selects the maximum output (whose amount of detected correlation is also maximum) among the above-mentioned three kinds of the absolute values, thereby controlling the signal selecting circuit 746.

Figure 42:
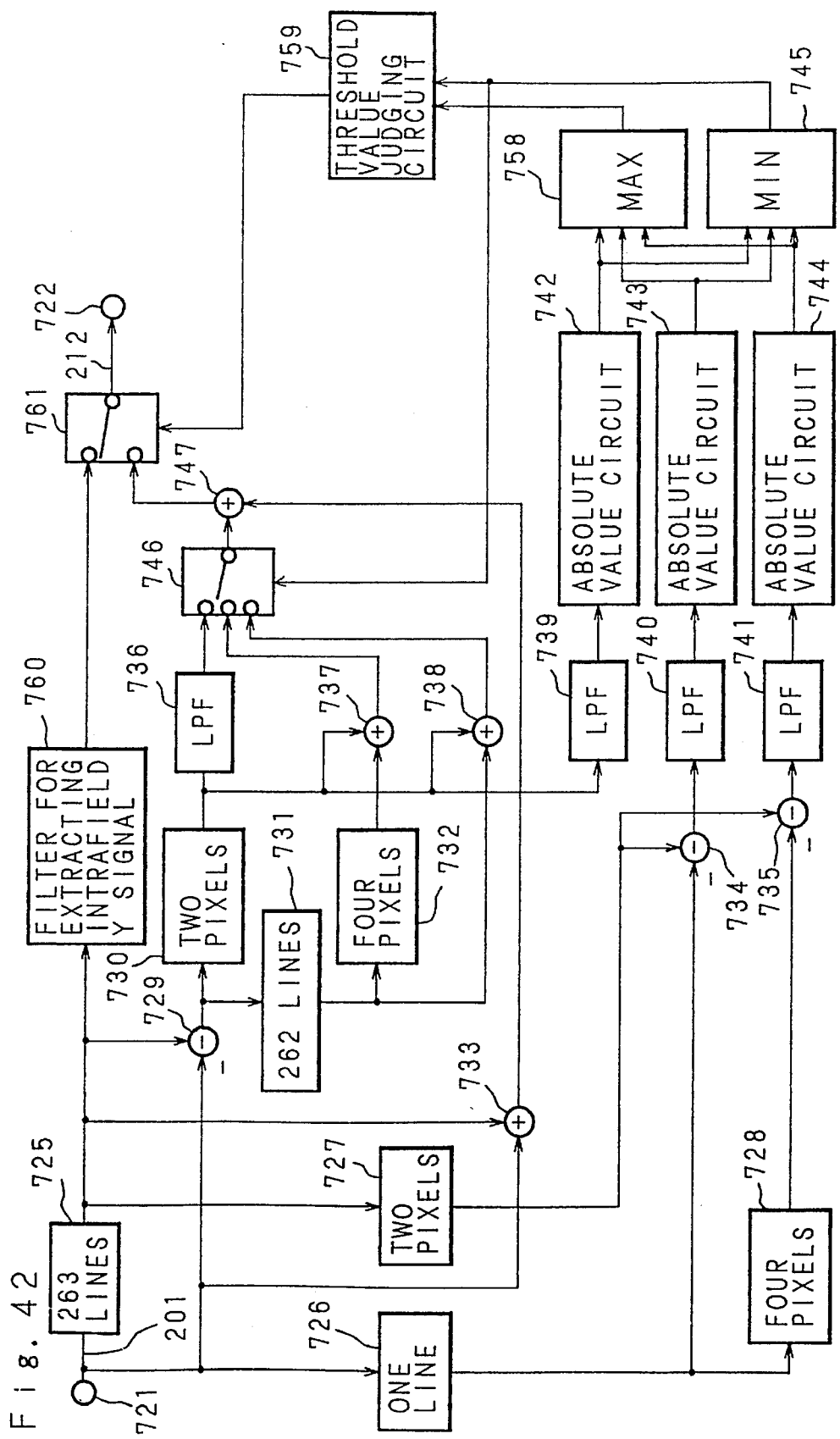
FIG. 42 is a block diagram of a three embodiment of a filter for extracting Y signal in three fields.

FIG. 42 is a detailed block diagram of a third embodiment of the filter 76 for extracting Y signal in three fields shown in FIG. 32.

In FIG. 42, the difference between the one shown in FIG. 33 is that the optimum filter is used among four kinds of filters including a filter for extracting intrafield Y signal as well as three kinds of filters for extracting Y signal in three fields. Explanation will be given only of an interfield correlation detecting circuit different from that shown in FIG. 33, among filters for extracting Y signal in three fields. In FIG. 42, same numerals are used on the same portions as shown in FIG. 33.

The output of the 263-line delay circuit 725 is inputted to the input terminal of the two-pixel delay circuit 727 and to second input terminals of the subtracter 729 and the adder 733 as well as to a filter 760 for extracting intrafield Y signal. The output of the filter 760 for extracting intrafield Y signal is inputted to a first input terminal of the second signal selecting circuit 761. The output of the adder 747 is inputted to a second input terminal of the second signal selecting circuit 761. The second signal selecting circuit 761 selects either of the first or second input signal by an output of a threshold judging circuit 759 to be described later.

The outputs of the LPF 739, 740 and 741 are respectively inputted to the absolute value circuit 742, 743 and 744, similarly to the case of FIG. 33. The output of the absolute value circuit 742 is inputted to first input terminals of the maximum value selecting circuit 758 and the minimum value selecting circuit 745 respectively to detect the correlation between the picked-up sampled point ⌊⊙⌉ and sampled point ⌊●⌉ IV. The output of the absolute value circuit 743 is inputted to second input terminals of the maximum value selecting circuit 758 and the minimum value selecting circuit 745 respectively, to detect correlation between the picked-up sampled point ⌊⊙⌉ and sampled point ⌊●⌉ V. The output of the absolute value circuit 744 is inputted to third input terminals of the maximum value selecting circuit 758 and the minimum value selecting circuit 745 respectively to detect the correlation between the picked-up sampled point ⌊⊙⌉ and sampled point ⌊●⌉ VI shown in FIG. 34. The output of the maximum value selecting circuit 758 is inputted to a first input terminal of threshold judging circuit 759. The output of the minimum value selecting circuit 745 is inputted to a second input terminal of the threshold judging circuit 759 and to a fourth input terminal of the first signal selecting circuit 746 respectively. The outpost of the threshold judging circuit 759 is inputted to a third input terminal of the second signal selecting circuit 761. The threshold judging circuit 759 controls the second signal selecting circuit 761 to select the output of the filter 760 for extracting intrafield Y signal in either the case where the maximum value of values of three kinds of interfield correlation of is smaller than the first threshold $\alpha$ or the minimum value of values of three kinds of interfield correlations is larger than the second threshold $\beta$.

On the other hand, by the threshold judging circuit 759, in either the case where the maximum value of values of three kinds of interfield correlations is judged to be larger than the first threshold $\alpha$ or the minimum value of values of three kinds of interfield correlations is judged to be smaller than the second threshold value $\beta$, according to the output of the minimum value selecting circuit 745, the first signal selecting circuit 746 is controlled to select the output of the LPF 736 in the case where the output of the absolute value circuit 742 is minimum, selects the output of the adder 737 in the case where the output of the absolute value circuit 743 is minimum, and selects the output of the adder 738 in the case where the output of the absolute value circuit 744 is minimum, respectively, and moreover, the second signal selecting circuit 761 is controlled to select an output of a filter for extracting Y signal in three fields being the output of an adder 747. Here, there is a relationship $\alpha<\beta$.

The output of the second signal selecting circuit 761 is outputted from the output terminal 722 as the Y signal 212 extracted in three fields.

Figure 43:
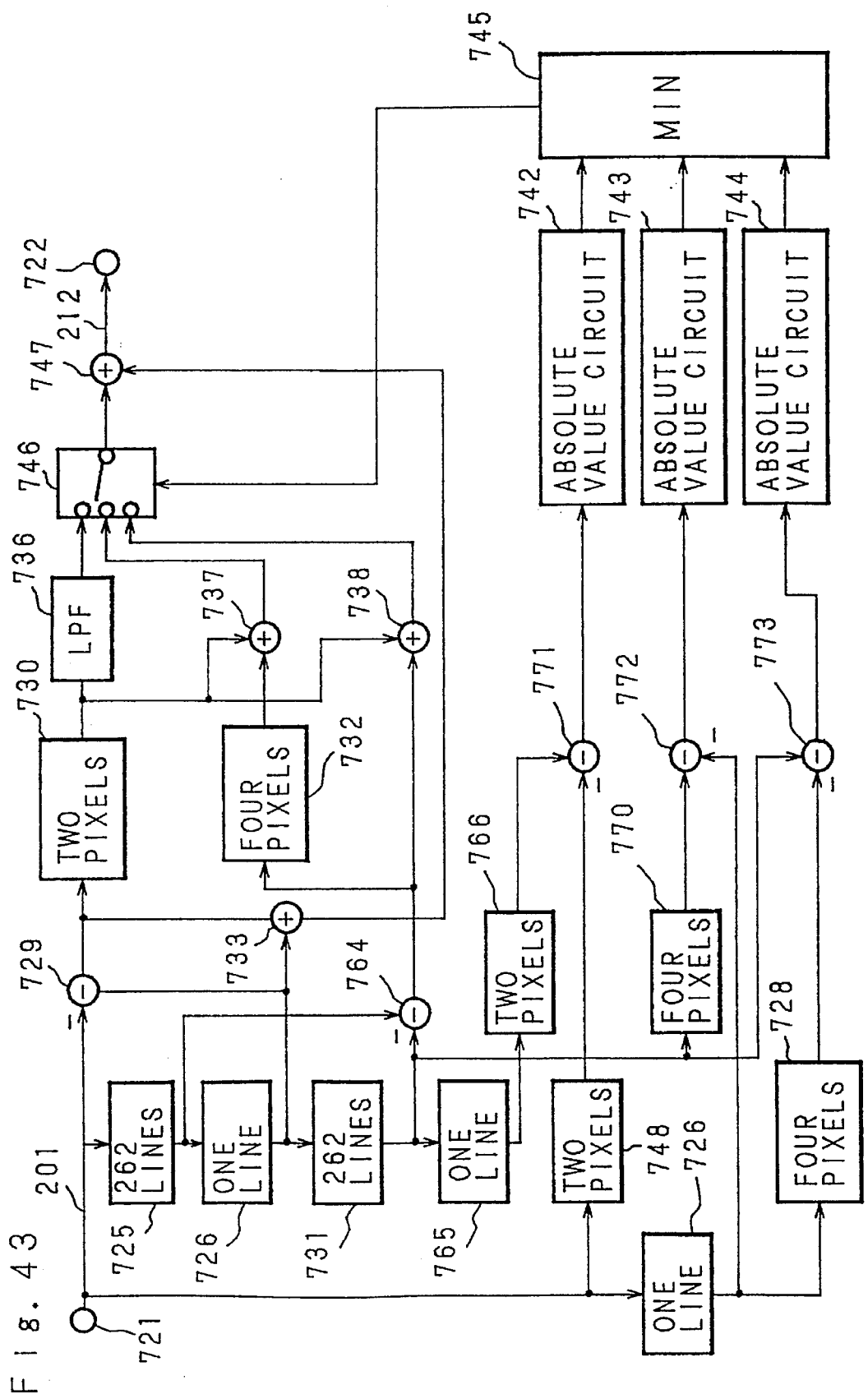
FIG. 43 is a block diagram of a third embodiment of a filter for extracting Y signal in three fields.

FIG. 43 is a detailed block diagram of a fourth embodiment of the filter 76 for extracting Y signal in three fields.

In FIG. 43, the only difference from the one shown in FIG. 33 is the method for detecting interframe correlation by calculation. Now explanation will be given only of the different points from the one shown in FIG. 33, among filters for extracting Y signal in three fields having the configuration of FIG. 43. In FIG. 43, same numerals are used on the same portions as shown in FIG. 33.

The configuration and operation of the filter A for extracting Y signal in three fields are same as the filter shown in FIG. 33.

Next, explanation will be given of the operation of the filter B for extracting Y signal in three fields.

The output of the two-pixel delay circuit 730 is the difference between the picked-up sampled point ⌊⊙⌉ and the sampled point i⌊●⌉ IV, as mentioned above. In addition, a subtracter 764 obtains a difference between the output of the 262-line delay circuit 725 which makes V signal to be delayed by 262 lines and the signal outputted from the one-line delay circuit 726 which makes the output of the delay circuit 725 to be delayed by one line then outputted from the 262 line delay circuit 731 which makes the output of the delay circuit 726 to be delayed by 262 lines. The signal of the subtracter 764 is equal to a signal obtained by delaying the output of the subtracter 729 by 262 lines.

By adding by the adder 737 the output of the two-pixel delay circuit 730 to that obtained by delaying that of the subtracter 764 by four pixels by the four-pixel delay circuit 732, same output as the filter B for extracting Y signal in three fields can be obtained.

Moreover, explanation will be given of the operation of the filter C for extracting Y signal in three fields. The output of the two pixel delay circuit 730 is the difference between the picked-up sampled point ⌊⊙⌉ and sampled point ⌊●⌉ IV. By adding the output of the two-pixel delay circuit 730 and that of the subtracter 764 by the adder 738, an output equal to that of the filter C for extracting Y signal in three fields can be obtained.

Next, explanation will be given of detecting of interframe correlation.

An output of a two-pixel delay circuit 766 is a signal of the sampled point ⌊●⌉ I shown in FIG. 11, and the output of the two-pixel delay circuit 748 is a signal of the sampled point ⌊●⌉ IV shown in FIG. 34. A subtracter obtains a difference between the outputs of the two-pixel delay circuit 766 and 748, and the difference is made to be the absolute value thereof by the absolute value circuit 742, thereby interframe correlation A with the picked-up sampled point ⌊⊙⌉ as the center can be obtained.

The output of a four-pixel delay circuit 770 is a signal of the sampled point ⌊●⌉ II shown in FIG. 11, and the output of the one-line delay circuit 726 is a signal of the sampled point ⌊●⌉ V shown in FIG. 34. The subtracter 772 obtains a difference between the outputs of the one-line delay circuit 726 and the four-pixel delay circuit 770, then the difference is made to be the absolute value thereof by the absolute value circuit 743, thereby interframe correlation B with the picked-up sampled point ⌊⊙⌉ as the center can be obtained.

The output of the 262-line delay circuit 731 is a signal of the sampled point ⌊●⌉ III shown in FIG. 11, and the output of the four-pixel delay circuit 728 is a signal of the sampled point ⌊●⌉ VI shown in FIG. 34. A subtracter 773 obtains a difference between the outputs of the 262-line delay circuit 731 and the four-pixel delay circuit 728, then the difference is made to be the absolute value thereof by the absolute value circuit 744, thereby interframe correlation C with the picked-up sampled point ⌊⊙⌉ as the center can be obtained.

The minimum value selecting circuit 745 selects the minimum output (whose amount of detected correlation is maximum) among the above mentioned three kinds of outputs of the absolute value circuits, thereby controlling the signal selecting circuit 746.

That is to say, the signal selecting circuit 746 selects the output of the LPF 736 in the case where the output of the absolute value circuit 742 is minimum, selects the output of the adder 737 in the case where the output of the absolute value circuit 743 is minimum, and selects the output of the adder 738 in the case where the output of the absolute value circuit is minimum, respectively.

The output of the signal selecting circuit 746 is added to that of the adder 733 by the adder 747, and is outputted from the output terminal 722 as an extracted Y signal in three fields.

FIG. 44 is a detailed block diagram of one embodiment of the filter 17 for extracting intraframe C signal.

The filter for extracting intraframe C signal having the configuration of FIG. 44, is characterized by using the optimum filter among three kinds of filters for extracting intraframe C signal including interfield calculation in place of the filter for extracting intrafield C signal as the motion image processing when the motion detecting unit 80 judges an image to be a motion one.

In FIG. 44, the color difference signal 204 inputted from the input terminal 723 is delayed by 263 lines by a 263-line delay circuit 788. The output of the 263-line delay circuit 788 is delayed by two pixels by the two-pixel delay circuit 774, and is delayed by 262 lines by a 262-line delay circuit 775. The output of the 262-line delay circuit 775 is inputted to a second input of a subtracter 779 and to input terminals of the four-pixel delay circuit 777 and one-line delay circuit 776.

By subtracting a color difference signal which has been delayed by two pixel by a two-pixel delay circuit 774 from the output of the 262-line delay circuit 775 by the subtracter 779, an interfield difference for the extracted interfield C signal C can be obtained.

By subtracting the color difference signal which has been delayed by two pixels by the two-pixel delay circuit 774 from the output of the four-pixel delay circuit 777 by a subtracter 769, an interfield difference for the extracted interfield C signal B can be obtained.

By subtracting the color difference signal which has been delayed by two pixels by the two-pixel delay circuit 774 from an output of a two-pixel delay circuit 778 by a subtracter 781, an interfield difference for the extracted interfield C signal A can be obtained.

Above-mentioned three kinds of interfield differences are inputted to a signal selecting circuit 786 and selected by an output of a minimum value selecting circuit 785 to be described later.

The interfield difference which is the output of the subtracter 779 is made to be the absolute value thereof by an absolute value circuit 782 and inputted to the minimum value selecting circuit 785. The absolute value circuit 782 detects the correlation of the color difference signal between the picked-up sampled point ⌊⊙⌉ and the sampled point ⌊●⌉ III shown in FIG. 11.

The interfield difference which is the output of the subtracter 769 is made to be the absolute value thereof by an absolute value circuit 783 and inputted to the minimum value selecting circuit 785. The absolute value circuit 783 detects the correlation of the color difference signal between the picked-up sampled point ⌊⊙⌉ and the sampled point ⌊●⌉ II shown in FIG. 11.

The interfield difference which is the output of the subtracter 781 is made to be the absolute value thereof by the absolute value circuit 784 and inputted to the minimum value selecting circuit 785. The absolute value circuit 784 detects the correlation of the color difference signal of the picked-up sampled point ⌊⊙⌉ and the sampled point ⌊●⌉ I shown in FIG. 11 .

The minimum value selecting circuit 785 selects the minimum output (whose amount of detected correlation is maximum) among the above-mentioned three kinds of absolute value outputs, thereby controlling the signal selecting circuit 786.

That is to say, the signal selecting circuit 786 selects the output of the subtracter 779 in the case where the output of the absolute value circuit 782 is minimum, selects the output of the subtracter 769 in the case where the output of the absolute value circuit 783 is minimum, and selects the output of the subtracter 781 in the case where the output of the absolute value circuit 784 is minimum, respectively.

Moreover, the output of the signal selecting circuit 786 is subtracted from the color difference signal by a subtracter 787, thereby low frequency component of three-dimensional frequency space in the direction in which correlation has been detected can be obtained.

In addition, in FIG. 33, 38 and 42, the interfield correlation detecting circuit is constructed so as to detect the correlation between the sampled points ⌊●⌉ IV, V and VI in n+1-th field and the picked-up sampled point ⌊⊙⌉ shown in FIG. 34, however, it is possible to detect the correlation between the sampled point ⌊●⌉ I, II and III in n-1-th field and the picked-up sampled point ⌊⊙⌉ in n-th field.

In addition, similarly to the case of FIG. 42 wherein a filter is selected from four kinds of filters including three kinds of filters for extracting Y signal in three fields with a filter for extracting intrafield Y signal juxtaposed, it is also possible in the case of FIG. 38 to select a filter from four kinds of filters including three kinds of intraframe Y signal with a filter for extracting intrafield Y signal juxtaposed. In the same way, also in the case of FIG. 43, it is possible to select a filter from four kinds of filters including three kinds of filters for extracting intraframe Y signal with a filter for extracting intrafield Y signal juxtaposed. In the same way, also in the case of FIG. 44, it is possible to select a filter from four kinds of filters including three kinds of filters for extracting intraframe C signal with a filter for extracting intrafield C signal juxtaposed.

In addition, similarly to the case of FIG. 43 wherein interframe correlation is detected and thereby selecting three kinds of filters for extracting Y signal in three fields, it is also possible in the case of FIG. 44 to detect interframe correlation, thereby selecting three kinds of filters for extracting intraframe C signal. Moreover in the case of FIG. 44, it is also possible to select a filter from four kinds of filters including three kinds of filters for extracting intraframe C signal, by detecting interframe correlation as mentioned above and with a filter for extracting intrafield C signal juxtaposed.

In addition, in FIG. 32, a circuit for the motion adaptive processing of the color signal comprising of the filter 17 for extracting intraframe C signal, the filter 10 for extracting interframe C signal and the chrominance signal mixing circuit 15 makes the two kinds of time-divisionally multiplexed color difference signal 204 as its input signal, however, it is also possible to juxtapose further the same configuration of the filter 17 for extracting intraframe C signal, the filter 10 for extracting interframe C signal, and the chrominance signal mixing circuit 15, thereby to construct two kinds of color difference signals to motion adaptably process independently from each other.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A filter for motion adaptive Y/C separation for taking out Y signal and C signal independently from V signal of interlace scanning in which C signal is frequency-multiplexed in high frequency band of Y signal, comprising:

a motion detecting unit for detecting motion of images partially by utilizing interframe correlation;

a filter for extracting interframe Y signal for outputting Y signal by interframe Y/C separation, by carrying out separation utilizing interframe correlation when said motion detecting unit detects static image;

a filter for extracting intraframe Y signal for outputting Y signal by intraframe Y/C separation, by carrying out separation utilizing interfield correlation when said motion detecting unit detects motion images;

a Y signal mixing circuit for outputting Y signal by motion adaptive Y/C separation, by mixing said Y signal by interframe Y/C separation with said Y signal by intraframe Y/C separation on the basis of the output of said motion detecting unit;

a color demodulator for color-demodulating a signal from V signal to color difference signal;

a filter for extracting interframe C signal for outputting C signal by interframe Y/C separation, by carrying out separation utilizing interframe correlation when said motion detecting unit detects static images;

a filter for extracting intraframe C signal for outputting C signal by intraframe Y/C separation, by carrying out separation utilizing interfield correlation when said motion detecting unit detects motion images; and a C signal mixing circuit for outputting C signal by motion adaptive Y/C separation, by mixing said C signal by interframe Y/C separation with said C signal by intraframe Y/C separation according to output of said motion detecting unit.

2. A filter for motion adaptive Y/C separation for taking out Y signal and C signal independently from interlaced V signal of interlace scanning in which C signal is frequency-multiplexed in high frequency band of Y signal, is provided with:

a motion detecting unit for detecting motion of images partially by utilizing interframe correlation;

a filter for extracting interframe Y signal for outputting Y signal by interframe Y/C separation, by carrying out separation utilizing interframe correlation when said motion detecting unit detects static image;

a filter for extracting intraframe Y signal for outputting Y signal by intraframe Y/C separation, when said motion detecting unit detects motion images, by partially detecting correlation according to horizontal low frequency component of a difference between points whose phases of color sub carrier are inverted to each other inter-field, and according to the detection result, by adaptively switching a plurality of intraframe processings including frequency band limitation of Y signal according to interfield calculation and intrafield calculation;

a Y signal mixing circuit for outputting Y signal by motion adaptive Y/C separation, by mixing said Y signal by interframe Y/C separation with said Y signal by intraframe Y/C separation;

a color demodulator for color-demodulating a signal from V signal to color difference signal;

a filter for extracting interframe C signal for outputting C signal by interframe Y/C separation by carrying out separation utilizing interframe correlation when said motion detecting unit detects static image;

a filter for extracting intraframe C signal for outputting C signal by intraframe Y/C separation, when said motion detecting unit detects motion images, by partially detecting correlation according to a difference between points whose phases of color sub carrier of V signal are inverted to each other interfield, and according to the detection result, by adaptively switching a plurality of intraframe processings including band limitation of C signal according to interfield calculation and intrafield calculation; and a C signal mixing circuit for outputting C signal by motion adaptive Y/C separation by mixing said C signal by interframe Y/C separation with said C signal by intraframe Y/C separation.

3. A filter for motion adaptive Y/C separation as set forth in claim 1, wherein said filter for extracting intraframe Y signal outputs Y signal by intraframe Y/C separation, by partially detecting correlation according to horizontal low frequency component of a difference between points whose phases of color sub carrier wave are same to each other interfield and to a high frequency component of a sum of points whose phases are inverted to each other, when said motion detecting unit detects motion images, and according to the detection result, by adaptively switching a plurality of intraframe processings including band limitation of Y signal according to interfield calculation and intrafield calculation; and said filter for extracting intraframe C signal outputs C signal by intraframe Y/C separation by partially detecting correlation according to a difference between points whose phases of color sub carrier of V signal are inverted to each other interfield when said motion detecting unit detects motion images, and according to the detection result, by adaptively switching a plurality of intraframe processings including band limitation of C signal according to interfield calculation and intrafield calculation.

4. A filter for motion adaptive Y/C separation as set forth in claim 1, wherein said filter for extracting intraframe Y signal outputs Y signal by intraframe Y/C separation, by detecting correlation partially according to a difference between points whose phases in color sub carrier in frames are same when said motion detecting unit detects motion images and according to the detection result, by adaptively switching a plurality of intraframe processings including band limitation of Y signal according to interfield calculation and intrafield calculation.

5. A filter for motion adaptive Y/C separation as set forth in claim 1, wherein said filter for extracting intraframe C signal outputs C signal by intraframe Y/C separation, by detecting correlation partially according to a difference of color difference signal between points whose phases in color sub carrier of V signal in frames are same when said motion detecting unit detects motion images and according to the detection result, by adaptively switching a plurality of intraframe processings including band limitation of Y signal according to interfield calculation and intrafield calculation.

6. A filter used for motion adaptive luminance/ chrominance separation of a video image for independently removing a luminance signal and a chrominance signal from a composite video signal of interlace scanning in which the chrominance signal is frequency-multiplexed in high frequency band of the luminance signal, comprising:

motion detecting means, monitoring the video image for detecting motion of images partially by utilizing interframe correlation;

first interframe filter means, receiving said composite video signal, for outputting a first signal produced by interframe luminance/chrominance separation when said motion detecting means detects static images;

first intraframe filter means, receiving said video image, for outputting a second signal produced by intraframe luminance/ chrominance separation when said motion detecting means detects motion in the images;

first mixing means for mixing said first signal with said second signal based on a ratio output from said motion detecting means;

color demodulator means for color-demodulating the composite video signal to develop a color difference signal;

second interframe filter means for outputting a third signal produced by an interframe luminance/chrominance separation upon the color difference signal when said motion detecting means detects static images;

second intraframe filter means for outputting a fourth signal produced by an intraframe luminance/chrominance separation upon the color difference signal when said motion detecting means detects motion in the images; and second mixing means for mixing said third signal with said fourth signal according to a ratio output of said motion detecting means.

7. The filter as claimed in claim 6 wherein said first intraframe filter means extracts said second signal by partially detecting correlation according to a horizontal low frequency component of a difference between points whose phases of color sub carriers are inverted to each other inter-field, and according to the detection result, by adaptively switching a plurality of intraframe processings including frequency band limitation of the luminance signal according to interfield calculation and intrafield calculation; and said second intraframe filter means extracting said fourth signal by partially detecting correlation according to a difference between points whose phases of color sub carrier of the composite video signal are inverted to each other interfield, and according to the detection result, by adaptively switching a plurality of intraframe processings including band limitation of the chrominance signal according to interfield calculation and intrafield calculation.

8. The filter as claimed in claim 6 wherein said first intraframe filter means extracts said second signal by partially detecting correlation according to a horizontal low frequency component of a difference between points whose phases of color sub carrier wave are same to each other interfield and to a horizontal high frequency component of a sum of points whose phases are inverted to each other, when said motion detecting means detects motion in the images, and according to the detection result, by adaptively switching a plurality of intraframe processings including band limitation of the luminance signal according to interfield calculation and intrafield calculation;

said second intraframe filter means extracting said fourth signal by partially detecting correlation according to a difference between points whose phases of color sub carrier of the composite video signal are inverted to each other interfield when said motion detecting means detects motion in the images, and according to the detection result, by adaptively switching a plurality of intraframe processings including band limitation of the chrominance signal according to interfield calculation and intrafield calculation.

9. The filter as claimed in claim 6, wherein said first intraframe filter means extracts said second signal by detecting correlation partially according to a difference between points whose phases in color sub carrier in frames are same when said motion detecting means detects motion in the images and according to the detection result, by adaptively switching a plurality of intraframe processings including band limitation of the luminance signal according to interfield calculation and intrafield calculation.

10. The filter as claimed in claim 6, wherein said second intraframe filter means extracts said fourth signal by detecting correlation partially according to a difference of color difference signal between phases of points whose phases in color sub carrier of the composite color signal in frames are same when said motion detecting means detects motion in the images and according to the detection result, by adaptively switching a plurality of intraframe processings including band limitation of the chrominance signal according to interfield calculation and intrafield calculation.

11. A device for separating a luminance signal from a composite color signal, comprising:

interfield processing means for interfield processing the composite color signal to produce interfield processed luminance signals;

correlation means for determining which interfield processed luminance signal corresponds to a direction having a lowest correlation value for an individual object sample point and for producing a control signal conveying the determination; and processing means, operatively connected to said interfield processing means and said correlation means and responsive to said control signal, for intrafield processing one of the interfield processed luminance signal according to said control signal to produce the separated luminance signal.

12. The device as claimed in claim 11 wherein said processing means intrafield processes the interfield processed luminance signal when the correlation value is the lowest for the interfield process, performed by said interfield processing means, that is carried out between a first field and a second field, said second field directly preceding said first field in time.

13. The device as claimed in claim 12 wherein said correlation means calculates a difference signal among sample points in which chrominance subcarriers are in phase between frames and spaced apart from one another by one frame and for determining a direction of the sample points, located proximate to an object sample point, which has a highest correlation value and said direction which has said lowest correlation value.

14. The device as claimed in claim 13, wherein:

said processing means intrafield processes one of said composite color signal and an output from said interfield processing means, and includes, selecting means for selecting either said composite color signal or said output from said interfield processing means; and said correlation means including,
threshold means for determining when the lowest correlation value is below a first threshold value and the highest correlation value is above a second threshold value;

said selecting means outputting said composite color signal when said threshold means determines that the lowest correlation value is below the first threshold value and the highest correlation value is above the second threshold value;

said selecting means outputting said output from said interfield processing means when said threshold means determines that the lowest correlation value is not below the first threshold value and the highest correlation value is not above the second threshold value.

15. A device for separating a luminance signal from a composite color signal, comprising:

interfield processing means for interfield processing the composite color signal to produce interfield processed luminance signals;

correlation means for determining which interfield processed luminance signal corresponds to a direction having a highest correlation value and for producing a control signal conveying the determination; and processing means, operatively connected to said interfield processing means and said correlation means and responsive to said control signal, for intrafield processing the interfield processed luminance signal corresponding to the highest correlation value to produce the separated luminance signal.

16. The device as claimed in claim 15 wherein said processing means intrafield processes the interfield processed luminance signal when the correlation value is the highest for the interfield process performed by said interfield processing means that is carried out between a first field and a second field, said second field directly preceding said first field in time.

17. A device for separating a luminance signal from a composite color signal, comprising:

interfield processing means for interfield processing the composite color signal to produce three interfield processed luminance signals;

selecting means for selecting one of the three interfield processed luminance signals having a highest correlation value for an individual sampling point associated therewith; and intrafield processing means for intrafield processing the selected signal to produce the luminance signal.

18. The device as claimed in claim 17 wherein said intrafield processing means includes a two-dimensional filter.

19. The device as claimed in claim 18 wherein said two-dimensional filter comprises:

delay means for delaying the selected signal;

first means for outputting a first signal representing a difference between the selected signal and the delayed selected signal;

second means for outputting a second signal representing a sum between the selected signal and the delayed selected signal, a low pass filter to filter said first signal;

third means for outputting a third signal representing a sum between the filtered signal and said second signal;

fourth means for outputting a fourth signal representing a difference between the selected signal and the composite color signal; and fifth means for outputting the luminance signal which represents a sum between said third signal and said fourth signal.

20. The device as claimed in claim 17 wherein said correlation means calculates a difference signal among sample points in which chrominance subcarriers are in phase between frames and spaced apart from one another by one frame and for determining a direction of the sample points, located proximate to an object sample point, which has said highest correlation value and said direction which has a lowest correlation value.

21. The device as claimed in claim 20, wherein:

said selecting means selects one of said three interfield processed luminance signals and said composite color signal, and includes, threshold means for determining when the lowest correlation value is below a first threshold value and the highest correlation value is above a second threshold value;

said selecting means outputting said composite color signal when said threshold means determines that the lowest correlation value is below the first threshold value and the highest correlation value is above the second threshold value;

said selecting means outputting output from said interfield processing means to said intrafield processing means when said threshold means determines that the lowest correlation value is not below the first threshold value and the highest correlation value is not above the second threshold value.

22. A device for separating a luminance signal from a composite color signal, comprising:

interfield processing means for interfield processing the composite color signal to produce three interfield processed luminance signals;

selecting means for selecting one of the three interfield processed luminance signals based on a one of said three interfield processed luminance signals having a lowest correlation value for an individual sampling point associated therewith; and first intrafield processing means for intrafield processing the selected signal to produce the luminance signal.

23. The device as claimed in claim 22 wherein said first intrafield processing means includes a two-dimensional filter.

24. The device as claimed in claim 22 wherein said first intrafield processing means comprises:

a two-dimensional filter which includes, delay means for delaying the selected signal, first means for outputting a first signal representing a difference between the selected signal and the delayed selected signal, second means for outputting a second signal representing a sum between the selected signal and the delayed selected signal, a low pass filter to filter said first signal, and third means for outputting a third signal representing a sum between the filtered signal and said second signal;

fourth means for outputting a fourth signal representing a difference between the selected signal and the composite color signal; and fifth means for outputting the luminance signal which represents a sum between said third signal and said fourth signal.

25. The device as claimed in claim 22, wherein said selecting means calculates a difference signal among sample points in which chrominance subcarriers are in phase between frames and spaced apart from one another by one frame and for determining a direction of the sample points, located proximate to an object sample point, which has a highest correlation value and said direction which has said lowest correlation value.

26. The device as claimed in claim 25, wherein:

said selecting means selects one of the three interfield processed luminance signals and said composite color signal, and includes, threshold means for determining when the lowest correlation value is below a first threshold value and the highest correlation value is above a second threshold value;

said selecting means outputting said composite color signal when said threshold means determines that the lowest correlation value is below the first threshold value and the highest correlation value is above the second threshold value;

said selecting means outputting output from said interfield processing means to said intrafield processing means when said threshold means determines that the lowest correlation value is not below the first threshold value and the highest correlation value is not above the second threshold value.

27. A device for separating a chrominance signal from a composite color signal comprising:

interfield processing means for interfield processing the composite color signal to produce three interfield processed chrominance signals;

intrafield processing means for intrafield processing the composite color signal to produce an intrafield processed chrominance signal; and selecting means for selecting either one of the three interfield processed chrominance signals or the intrafield processed chrominance signal based on a correlative relationship between the three interfield processed chrominance signals at each individual sampling point, thereby providing the selected signal as the separated chrominance signal.

28. The device as claimed in claim 27 wherein said selecting means calculates a difference signal among sample points in which chrominance subcarriers are in phase between frames and spaced apart from one another by one frame and determining a direction of the sample points, located proximate to an object sample point, which has a highest correlation value and said direction which has a lowest correlation value.

29. The device as claimed in claim 28 wherein said selecting means includes, threshold means for determining when the lowest correlation value is below a first threshold value and the highest correlation value is above a second threshold value;

said selecting means outputting an output from said intrafield processing means when said threshold means determines that the lowest correlation value is below the first threshold value and the highest correlation value is above the second threshold value;

said selecting means outputting an output from said interfield processing means when said threshold means determines that the lowest correlation value is not below the first threshold value and the highest correlation value is not above the second threshold value.

30. A method for separating a luminance signal from a composite color signal, comprising the steps of:

(a) interfield processing the composite color signal to produce interfield processed luminance signals;

(b) determining which interfield processed luminance signal corresponds to a direction having a lowest correlation value for an individual object sampling point and for producing a control signal conveying the determination; and (c) intrafield processing one of the interfield processed luminance signals according to the control signal to produce the separated luminance signal.

31. The method as claimed in claim 30 wherein said step (a) of interfield processing interfield processes between a first field and a second field directly preceding the first field in time;

said step (c) intrafield processing the interfield processed luminance signal when the correlation value is the lowest.

32. The method as claimed in claim 31 wherein said step (b) calculates a difference signal among sample points in which chrominance subcarriers are in phase between frames and spaced apart from one another by one frame and for determining a direction of the sample points, located proximate to an object sample point, which has a highest correlation value and said direction which has said lowest correlation value.

33. The method as claimed in claim 32, wherein:

said step (c) intrafield processes one of said interfield processed luminance signals and said composite color signal, and includes the sub-step of, (c1) selecting either the composite color signal or the interfield processed luminance signal; and said step (b) including the sub-step of, (b1) determining when the lowest correlation value is below a first threshold value and the highest correlation value is above a second threshold value;

said step (c1) selects the composite color signal when said step (b1) determines that the lowest correlation value is below the first threshold value and the highest correlation value is above the second threshold value; and said step (c1) selects the interfield processed luminance signal when said step (b1) determines that the lowest correlation value is not below the first threshold value and the highest correlation value is not above the second threshold value.

34. A method for separating a luminance signal from a composite color signal, comprising the steps of:

(a) interfield processing the composite color signal to produce interfield processed luminance signals;

(b) determining which interfield processed luminance signal corresponds to a direction having a highest correlation value and for producing a control signal conveying the determination; and (c) intrafield processing or one of the interfield processed luminance signals according to the control signal to produce the separated luminance signal.

35. The method as claimed in claim 34 wherein said step (a) of interfield processing interfield processes between a first field and a second field directly preceding the first field in time;

said step (c) intrafield processing the interfield processed luminance signal when the correlation value is the highest.

36. A method for separating a luminance signal from a composite color signal, comprising the steps of:

(a) interfield processing the composite color signal to produce three interfield processed luminance signals;

(b) selecting one of the three interfield processed luminance signals having a highest correlation value associated therewith; and (c) intrafield processing the selected signal to produce the luminance signal.

37. The device as claimed in claim 36 wherein said step (c) comprises the sub-steps of:

(c1) delaying the selected signal;

(c2) outputting a first signal representing a difference between the selected signal and the delayed selected signal;

(c3) outputting a second signal representing a sum between the selected signal and the delayed selected signal;

(c4) outputting a third signal representing a difference between the selected signal and the composite color signal;

(c5) low pass filtering the first signal;

(c6) outputting a fourth signal representing a sum between the filtered signal and the second signal; and (c7) outputting the luminance signal which represents a sum between the third signal and the fourth signal.

38. A method for separating a luminance signal from a composite color signal, comprising the steps of:

(a) interfield processing the composite color signal to produce three interfield processed luminance signals;

(b) selecting one of the three interfield processed luminance signals having a lowest correlation value associated therewith; and (c) intrafield processing the selected signal to produce the luminance signal.

39. A method for separating a chrominance signal from a composite color signal comprising the steps of:

(a) interfield processing the composite color signal to produce three interfield processed chrominance signals;

(b) intrafield processing the composite color signal to produce an intrafield processed chrominance signal; and (c) selecting either one of the three interfield processed chrominance signals or the intrafield processed chrominance signal based on a correlative relationship between the three interfield processed chrominance signals, thereby providing the selected signal as the separated chrominance signal.

40. The device as claimed in claim 11, wherein said processing means intrafield processes one of the interfield processed luminance signals and said composite color signal according to said control signal.

41. The device as claimed in claim 15, wherein said processing means intrafield processes one of the interfield processed luminance signals and said composite color signal according to said control signal.

42. The method as claimed in claim 30, wherein said step (c) intrafield processes one of said interfield processed luminance signals and said composite signal according to said control signal.

43. The method as claimed in claim 34, wherein said step (c) intrafield processes one of said interfield processed luminance signals and said composite signal according to said control signal.

* * * * *